United States Patent
Shibazaki et al.

(10) Patent No.: US 9,693,036 B2
(45) Date of Patent: Jun. 27, 2017

(54) IMAGING APPARATUS, IMAGE PROCESSING DEVICE, COMPUTER-READABLE MEDIUM HAVING STORED THEREON AN IMAGING APPARATUS CONTROLLING PROGRAM, AND COMPUTER-READABLE MEDIUM HAVING STORED THEREON AN IMAGE PROCESSING PROGRAM

(71) Applicant: NIKON CORPORATION, Tokyo (JP)

(72) Inventors: Kiyoshige Shibazaki, Higashimurayama (JP); Muneki Hamashima, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/694,482

(22) Filed: Apr. 23, 2015

(65) Prior Publication Data
US 2015/0245011 A1    Aug. 27, 2015

Related U.S. Application Data

(63) Continuation of application No. PCT/JP2013/006360, filed on Oct. 28, 2013.

(30) Foreign Application Priority Data

Oct. 26, 2012  (JP) .................................. 2012-236192
Oct. 26, 2012  (JP) .................................. 2012-236193

(51) Int. Cl.
*H04N 13/02* (2006.01)
*G03B 35/08* (2006.01)
(Continued)

(52) U.S. Cl.
CPC ......... *H04N 13/0207* (2013.01); *G03B 35/08* (2013.01); *G06T 15/205* (2013.01);
(Continued)

(58) Field of Classification Search
None
See application file for complete search history.

(56) References Cited

U.S. PATENT DOCUMENTS

2011/0292183 A1    12/2011  Tajiri et al.
2012/0140100 A1*    6/2012  Shibazaki ......... H01L 27/14621
                                                 348/281
(Continued)

FOREIGN PATENT DOCUMENTS

CN    102263967 A    11/2011
JP    H0847001 A     2/1996
(Continued)

OTHER PUBLICATIONS

Apr. 28, 2015 International Preliminary Report on Patentiblity issued in International Application No. PCT/JP2013/006380.
(Continued)

*Primary Examiner* — James Hannett
(74) *Attorney, Agent, or Firm* — Oliff PLC

(57) ABSTRACT

Provided is an imaging apparatus including an imaging section that generates, from a single scene, captured image data including reference image data, first parallax image data having a first parallax in one direction relative to a subject of the reference image data, and second parallax image data having a second parallax in another direction that is opposite the one direction; an adjustment condition acquiring section that acquires an adjustment condition relating to parallax amount adjustment; and an image processing device that processes the reference image data, the first parallax image data, and the second parallax image data, based on the adjustment condition, to generate third parallax image data having a third parallax that is in the one direction and different from the first parallax and fourth parallax image
(Continued)

data having a fourth parallax that is in the other direction and different from the second parallax.

31 Claims, 30 Drawing Sheets

(51) Int. Cl.
*H04N 13/00* (2006.01)
*G06T 15/20* (2011.01)
(52) U.S. Cl.
CPC ..... *H04N 13/0022* (2013.01); *H04N 13/0217* (2013.01); *H04N 13/0257* (2013.01); *H04N 13/0296* (2013.01); *H04N 2013/0077* (2013.01); *H04N 2013/0081* (2013.01)

(56) References Cited

U.S. PATENT DOCUMENTS

| | | | | |
|---|---|---|---|---|
| 2012/0154551 | A1* | 6/2012 | Inoue | H04N 13/0022 348/49 |
| 2012/0327191 | A1* | 12/2012 | Yamashita | G03B 21/56 348/46 |
| 2014/0036043 | A1 | 2/2014 | Shibazaki et al. | |

FOREIGN PATENT DOCUMENTS

| | | |
|---|---|---|
| JP | 2002-245451 A | 8/2002 |
| JP | 2004-221700 A | 8/2004 |
| JP | 2011-248693 A | 12/2011 |
| JP | 2012-142922 A | 7/2012 |
| WO | 2011/108276 A1 | 9/2011 |
| WO | 2012/073491 A1 | 6/2012 |
| WO | 2012/140917 A1 | 10/2012 |

OTHER PUBLICATIONS

Nov. 26, 2013 International Search Report issued in PCT/JP2013/006360.

May 4, 2016 Office Action issued in Chinese Application No. 201380055906.7.

Apr. 26, 2016 Office Action issued in Japanese Application No. 2014-543159.

* cited by examiner

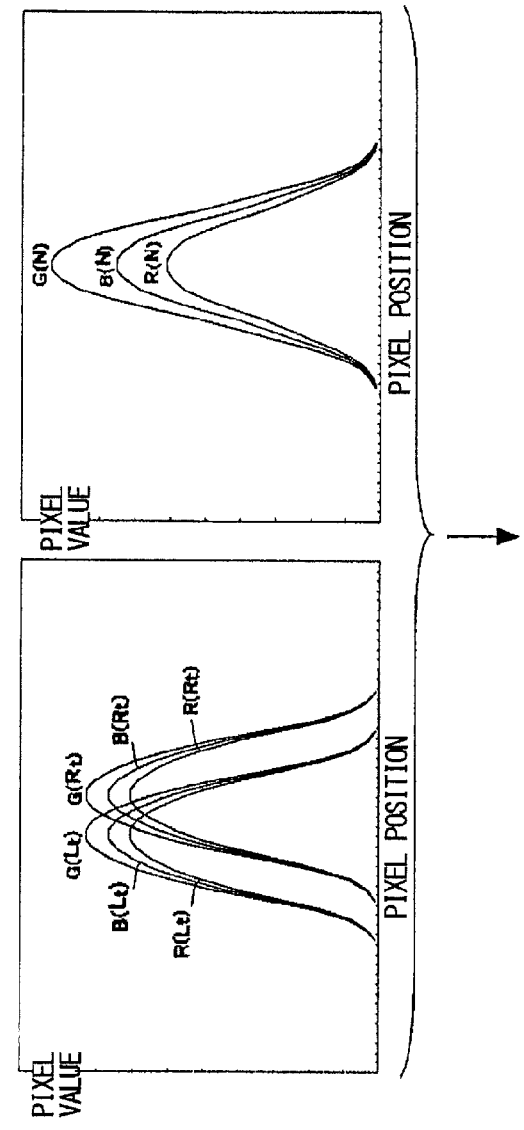
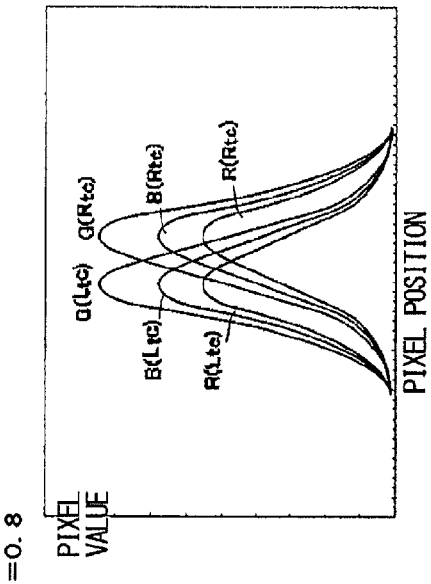

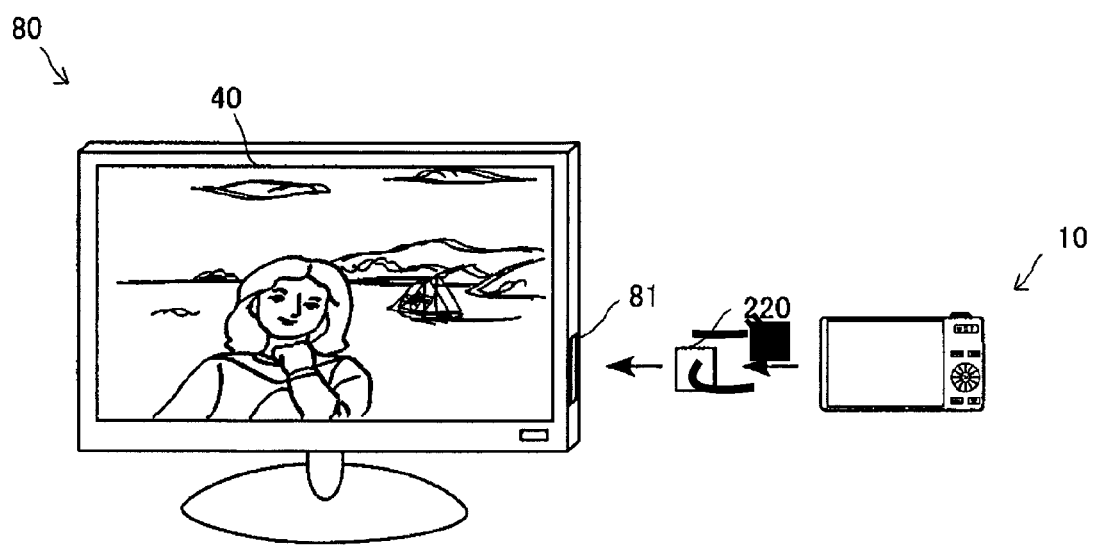
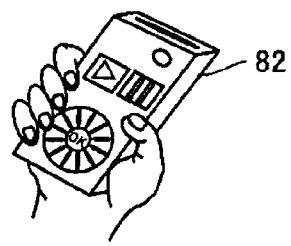
FIG. 31

IMAGING APPARATUS, IMAGE PROCESSING DEVICE, COMPUTER-READABLE MEDIUM HAVING STORED THEREON AN IMAGING APPARATUS CONTROLLING PROGRAM, AND COMPUTER-READABLE MEDIUM HAVING STORED THEREON AN IMAGE PROCESSING PROGRAM

The contents of the following Japanese and PCT patent applications are incorporated herein by reference:
NO. 2012-236192 filed on Oct. 26, 2012,
NO. 2012-236193 filed on Oct. 26, 2012, and
NO. PCT/JP2013/006360 filed on Oct. 28, 2013.

BACKGROUND

1. Technical Field

The present invention relates to an imaging apparatus, an image processing device, a program for controlling an imaging apparatus, and a program for controlling an image processing device.

2. Related Art

A stereo imaging apparatus is known in which two imaging optical systems are used to acquire a stereo image formed by an image for a right eye and an image for a left eye.

Patent Document 1: Japanese Patent Application Publication No. H8-47001

There are cases where raw stereo image data that is captured through imaging by a stereo imaging device exhibits an extreme parallax between the left and right images due to the conditions at the time of imaging, the arrangement of subjects in the scene, or the like, and the viewer experiences a feeling of unnaturalness or eye strain when viewing the image.

SUMMARY

According to a first aspect of the present invention, provided is an imaging apparatus comprising an imaging section that generates, from a single scene, captured image data including reference image data, first parallax image data having a first parallax in one direction relative to a subject of the reference image data, and second parallax image data having a second parallax in another direction that is opposite the one direction; an adjustment condition acquiring section that acquires an adjustment condition relating to parallax amount adjustment; and an image processing device that processes the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax.

According to a second aspect of the present invention, provided is an imaging apparatus comprising an imaging section that generates, from a single scene, captured image data including reference image data, first parallax image data having a first parallax in one direction relative to a subject of the reference image data, and second parallax image data having a second parallax in another direction that is opposite the one direction; an adjustment condition acquiring section that acquires an adjustment condition relating to parallax amount adjustment for generating adjusted parallax image data having a parallax that is different from the first parallax and the second parallax; and an output section that outputs the adjustment condition in association with the captured image data.

According to a third aspect of the present invention, provided is an image processing device comprising an obtaining section that obtains captured image data including reference image data, first parallax image data having a first parallax in one direction relative to a subject of the reference image data, and second parallax image data having a second parallax in another direction that is opposite the one direction, and an adjustment condition relating to a parallax amount adjustment associated with the captured image data; and an image processing device that processes the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax.

According to a fourth aspect of the present invention, provided is a control program for an imaging apparatus that causes a computer to generate, from a single scene, captured image data including reference image data, first parallax image data having a first parallax in one direction relative to a subject of the reference image data, and second parallax image data having a second parallax in another direction that is opposite the one direction; acquire an adjustment condition relating to parallax amount adjustment; and process the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax.

According to a fifth aspect of the present invention, provided is a control program for an imaging apparatus that causes a computer to generate, from a single scene, captured image data including reference image data, first parallax image data having a first parallax in one direction relative to a subject of the reference image data, and second parallax image data having a second parallax in another direction that is opposite the one direction; acquire an adjustment condition relating to parallax amount adjustment for generating adjusted parallax image data having a parallax that is different from the first parallax and the second parallax; and output the adjustment condition in association with the captured image data.

According to a sixth aspect of the present invention, provided is a control program for an image processing device that causes a computer to obtain captured image data including reference image data, first parallax image data having a first parallax in one direction relative to a subject of the reference image data, and second parallax image data having a second parallax in another direction that is opposite the one direction, and an adjustment condition relating to a parallax amount adjustment associated with the captured image data; and process the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax.

According to a seventh aspect of the present invention, provided is an imaging apparatus comprising a detecting section that detects a subject distribution in a depth direction for a scene; a determining section that determines a change condition relating to a parallax amount, based on the subject distribution; and a control section that generates captured image data including first parallax image data and second parallax image data having a parallax therebetween, based on the change condition.

According to an eighth aspect of the present invention, provided is a control program for an imaging apparatus causing a computer to detect a subject distribution in a depth direction for a scene; determine a change condition relating to a parallax amount, based on the subject distribution; and generate captured image data including first parallax image data and second parallax image data having a parallax therebetween, based on the change condition.

The summary clause does not necessarily describe all necessary features of the embodiments of the present invention. The present invention may also be a sub-combination of the features described above.

BRIEF DESCRIPTION OF THE DRAWINGS

FIG. 4-B is used to describe the basics of defocus.

FIG. 4-C is used to describe the basics of defocus.

FIG. 4-D is used to describe the basics of defocus.

FIG. 8-A is used to describe change in RGB pixel value distributions.

FIG. 8-B is used to describe change in RGB pixel value distributions.

FIG. 8-C is used to describe change in RGB pixel value distributions.

FIG. 10-B schematically shows the relationship between the diaphragm value, the contrast indicating the image sharpness, the distance of the subject, and the parallax amount.

FIG. 10-C schematically shows the relationship between the diaphragm value, the contrast indicating the image sharpness, the distance of the subject, and the parallax amount.

FIG. 12-B shows the basics of the parallax amount adjustment.

FIG. 12-C shows the basics of the parallax amount adjustment.

FIG. 21-B schematically shows the relationship between the subject distribution and the parallax amount.

FIG. 21-C schematically shows the relationship between the subject distribution and the parallax amount.

FIG. 22-B schematically shows the relationship between the diaphragm value and the parallax amount.

FIG. 22-C schematically shows the relationship between the diaphragm value and the parallax amount.

FIG. 24-B shows the basics of a parallax amount adjustment using a stereo adjustment parameter.

FIG. 24-C shows the basics of a parallax amount adjustment using a stereo adjustment parameter.

FIG. 26-B is used to describe subject designation.

FIG. 31 is used to describe the connection between the digital camera and a TV monitor.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

First Embodiment

A digital camera according to an embodiment of the present invention, which is an embodiment of an imaging apparatus, is configured in a manner to be able to generate an image of a single scene having a plurality of viewpoints, through a single occurrence of imaging. Each image having a different viewpoint from another image is referred to as a parallax image. The present embodiment describes a particular example of generating a right parallax image and a left parallax image according to two viewpoints that correspond to a right eye and a left eye. The digital camera of the present invention can generate both a parallax image and a non-parallax image that has no parallax from a central viewpoint.

Figure 1:
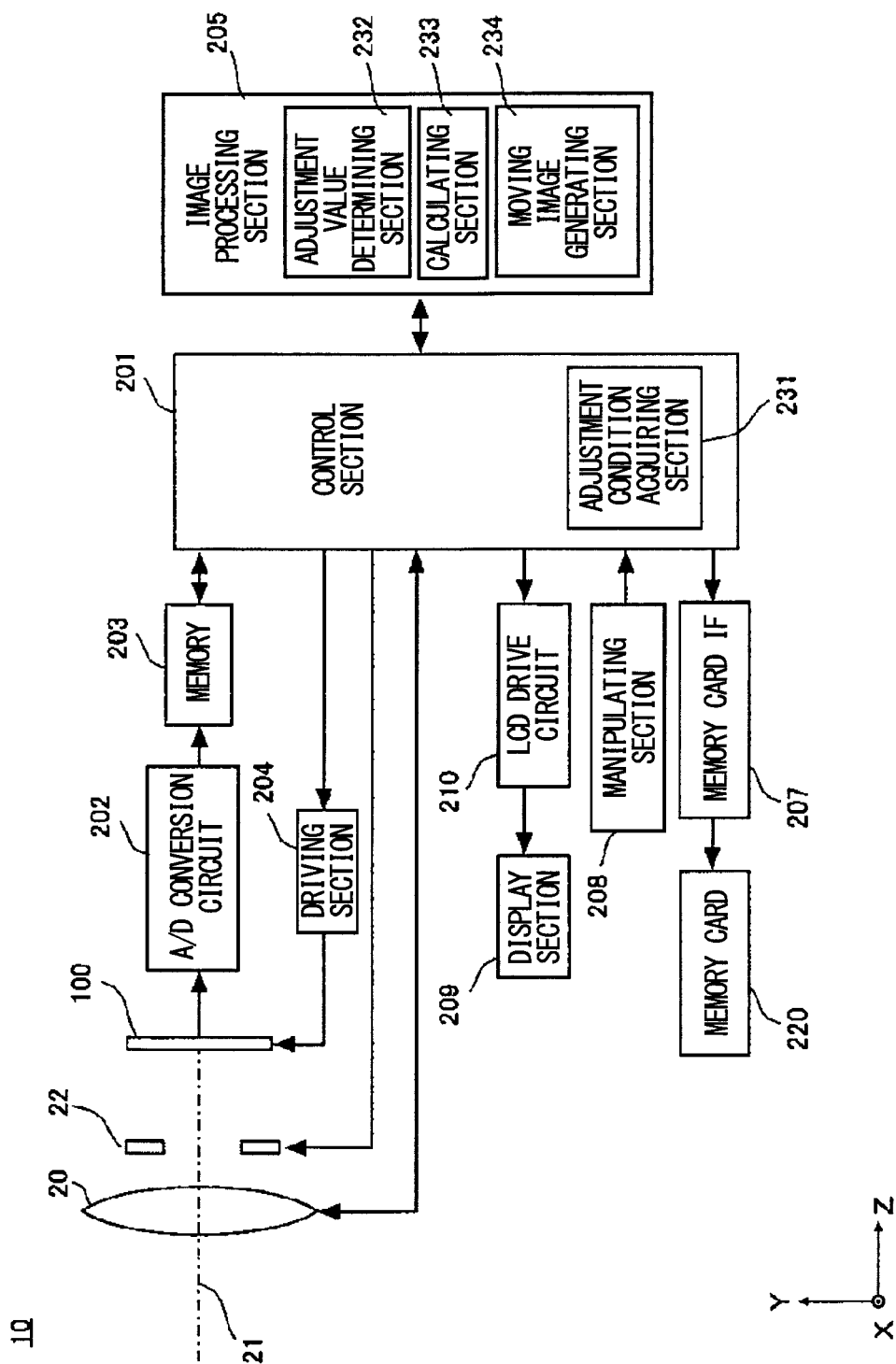
FIG. 1 shows a structure of the digital camera 10 according to the present embodiment.

FIG. 1 shows a structure of the digital camera 10 according to the present embodiment. The digital camera 10 includes an imaging lens 20 serving as an imaging optical system, and guides subject light that is incident thereto along an optical axis 21 to the image capturing element 100. The imaging lens 20 may be an exchangeable lens that can be attached to and detached from the digital camera 10. The digital camera 10 includes an image capturing element 100, a control section 201, an A/D conversion circuit 202, a memory 203, a driving section 204, an image processing device 205, a memory card IF 207, a manipulating section 208, a display section 209, and an LCD drive circuit 210.

As shown in the drawing, a direction parallel to the optical axis 21 and pointing toward the image capturing element 100 is defined as the positive direction on the Z axis, a direction pointing toward the reader from the plane of the drawing in a plane orthogonal to the Z axis is defined as the positive direction on the X axis, and a direction pointing toward the top of the drawing in the plane orthogonal to the Z axis is defined as the positive direction on the Y axis. In several of the following drawings, the coordinate axes of FIG. 1 are used as the reference to display the orientation of each drawing.

The imaging lens 20 is formed from a plurality of optical lenses, and focuses subject light from a scene at a position near a focal plane. For ease of description, FIG. 1 shows a single virtual lens arranged near the pupil to represent the imaging lens 20. Furthermore, a diaphragm 22 that limits incident light is arranged near the pupil in a manner to be concentric around the optical axis 21.

The image capturing element 100 is arranged near the focal plane of the imaging lens 20. The image capturing element 100 is an image sensor such as a CCD or CMOS sensor, in which a plurality of photoelectric converting elements are arranged two-dimensionally. The image capturing element 100 experiences timing control from the driving section 204, to convert a subject image formed on a light receiving surface into an image signal and to output this image signal to the A/D conversion circuit 202.

The A/D conversion circuit 202 converts the image signal output by the image capturing element 100 into a digital image signal and outputs this digital image signal to the memory 203. The image processing device 205 applies various types of image processing with the memory 203 as a work space, to generate captured image data. The captured image data includes reference image data that is generated from the output of non-parallax pixels of the image capturing element 100 and parallax image data that is generated from the output of parallax pixels of the image capturing element 100, as described further below. In a case where the processing section used up to the point of generating the captured image data is the imaging section, the imaging section includes the image capturing element 100, the A/D conversion circuit 202, the memory 203, the control section 201, and the image processing device 205.

The control section 201 performs overall control of the digital camera 10. For example, the control section 201 adjusts the opening of the diaphragm 22 according to a set diaphragm value, and causes the imaging lens 20 to move back and forth in the direction of the optical axis according to an AF evaluation value. Furthermore, the control section 201 detects the position of the imaging lens 20 and is aware of the focus lens position and the focal distance of the imaging lens 20. Yet further, the control section 201 transmits a timing control signal to the driving section 204 and manages the sequences up to the point when the image signal output from the image capturing element 100 is processed into the captured image data by the image processing device 205.

The control section 201 includes an adjustment condition acquiring section 231. The adjustment condition acquiring section 231 acquires various adjustment conditions for determining stereo adjustment parameters, which are described further below. Although described in greater detail below, one example includes sequentially acquiring the focal distance and the diaphragm value used as the imaging conditions when the captured image data was generated, as the adjustment conditions.

The image processing device 205 includes an adjustment value determining section 232, a calculating section 233, and a moving image generating section 234. The adjustment value determining section 232 determines the value of the stereo adjustment parameter from the adjustment condition acquired by the adjustment condition acquiring section 231. The calculating section 233 uses the determined stereo adjustment parameter to generate new parallax image data from the captured image data. The moving image generating section 234 connects the new parallax image data generated by the calculating section to generate a 3D moving image file.

The image processing device 205 also fulfills general image processing functions, such as adjusting image data according to other selected image formats. The generated captured image data is converted into a display signal by the LCD drive circuit 210 and displayed in the display section 209. The generated captured image data is also recorded in a memory card 220 provided to the memory card IF 207.

Figure 2:
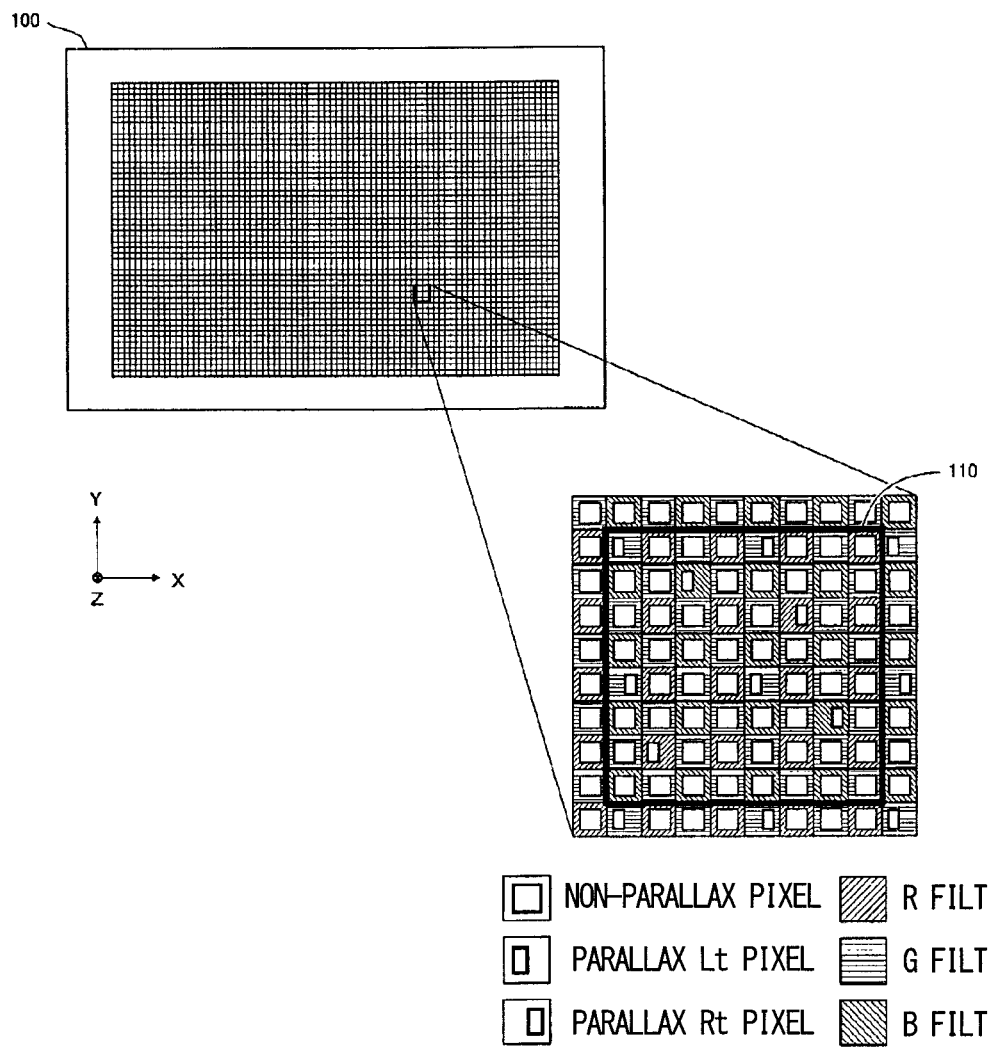
FIG. 2 is a perspective view showing the state of an enlarged portion of the image capturing element.

FIG. 2 is a perspective view showing the state of an enlarged portion of the image capturing element 100. At least 20 million pixels are arranged in a matrix formation in the pixel region. In the present embodiment, a set of 64 pixels containing 8×8 adjacent pixels forms one basic grid 110. Each basic grid 110 includes Bayer arrangements, in which four pixels are arranged in a 2×2 formation as a reference unit, and these Bayer arrangements are in a 4 (4 arrangement in the X and Y directions. As shown in the drawing, in each Bayer arrangement, green filters (G filter) are arranged on the upper left pixel and lower right pixel, a blue filter (B filter) is arranged on the bottom left pixel, and a red filter (R filter) is arranged on the upper right filter.

The basic grid 110 includes parallax pixels and non-parallax pixels. The parallax pixels are pixels that receive partial light, from among the incident light passed through the imaging lens 20, that has been shifted relative to the optical axis of the imaging lens 20. The parallax pixels are provided with an aperture mask having a shifted aperture that is shifted from the center of the pixel, such that only this partial light passes therethrough. The aperture mask is stacked on the color filter, for example. In the present embodiment, the aperture mask creates two types of pixels, which are a parallax Lt pixel that is set such that the partial light reaches the left side relative to the center of the pixel and a parallax Rt pixel that is set such that the partial light reaches the right side relative to the center of the pixel. On the other hand, the non-parallax pixels are not provided with an aperture mask, and are pixels that receive the entirety of the incident light passed through the imaging lens 20.

The parallax pixels can adopt a variety of configurations for receiving the partial light shifted from the optical axis, such as a shifted photodiode region or a selectively reflective film in which a light receiving region and a reflective region are separated, and are not limited to using the aperture mask. In other words, the parallax pixels need only be configured to enable reception of the partial light shifted from the optical axis from among the incident light passed by the imaging lens 20.

The pixels within the basic grid 110 are represented as $P_{IJ}$. For example, the top left pixel is $P_{11}$ and the top right pixel is $P_{81}$. As shown in the drawing, the parallax pixels are arranged in the following manner.

$P_{11}$: Parallax Lt pixel+G filter (=G(Lt))
$P_{51}$: Parallax Rt pixel+G filter (=G(Rt))
$P_{32}$: Parallax Lt pixel+B filter (=B(Lt))
$P_{63}$: Parallax Rt pixel+R filter (=R(Rt))
$P_{15}$: Parallax Rt pixel+G filter (=G(Rt))
$P_{55}$: Parallax Lt pixel+G filter (=G(Lt))
$P_{76}$: Parallax Rt pixel+B filter (=B(Rt))
$P_{27}$: Parallax Lt pixel+R filter (=R(Lt))

The other pixels are non-parallax pixels, and are each one of a non-parallax pixel+R filter, a non-parallax pixel+G filter, and a non-parallax pixel+B filter.

When considering the overall image capturing element 100, the parallax pixels are divided into a first group having the G filters, a second group having the R filters, and a third group having the B filters, and each basic grid 110 includes at least one of a parallax Lt pixel and a parallax Rt pixel associated with each of these groups. As shown in the example in the drawing, the parallax pixels and non-parallax pixels may be arranged randomly within the basic grid 110. By arranging the pixels randomly, the RGB color information can be acquired as the output of the parallax pixels without causing a skew in the spatial resolution for each color component, and therefore high-quality parallax image data can be acquired.

Figure 3:
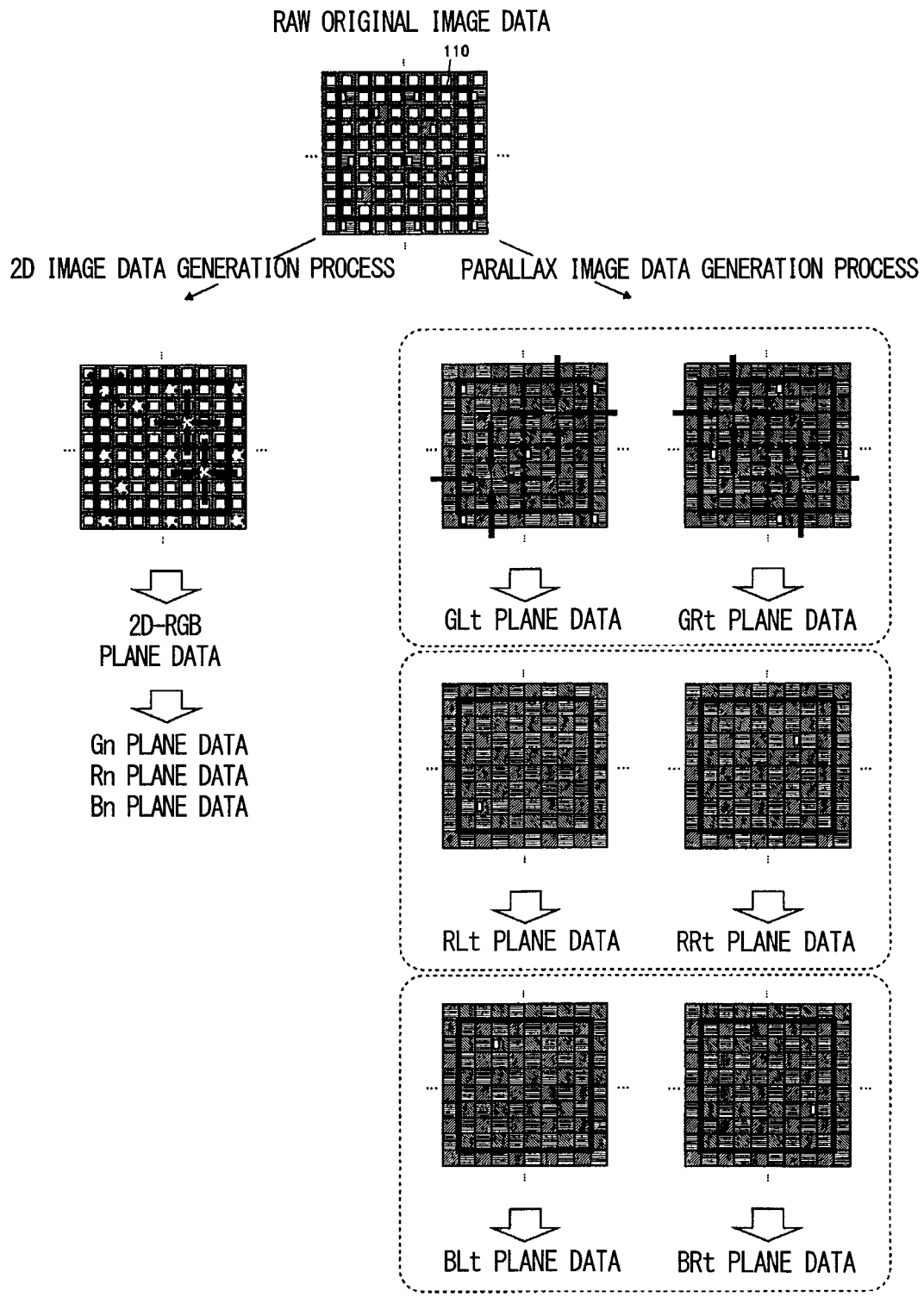
FIG. 3 is used to describe an example of the process for generating the parallax image data and the 2D image data.

The following describes the basics of the process for generating the parallax image data and the 2D image data from the captured image data output from the image capturing element 100. FIG. 3 is used to describe an example of the process for generating the parallax image data and the 2D image data.

As understood from the arrangement of parallax pixels and non-parallax pixels in the basic grid 110, even when the output of the image capturing element 100 is compiled in a manner matching the pixel arrangement, this will not result in image data expressing a specified image. The pixel output of the image capturing element 100 is gathered together according to pixel groups obtained by separating the pixels into groups with the same characteristic, and then image data representing one image corresponding to this characteristic is formed. For example, when each of the left and right parallax pixels are gathered together, left parallax image data and right parallax image data having a parallax therebetween is obtained. In this way, the pixels are divided into pixel groups each having the same characteristic and gathered together into image data, which is referred to as plane data.

The image processing device 205 receives RAW image data in which the output values (pixel values) are compiled in an order corresponding to the pixel arrangement of the image capturing element 100, and a plane separation process is performed to separate the RAW image data into a plurality of pieces of plane data. The left column in the drawing shows an example of a process for generating 2D-RGB plane data as the 2D image data.

When generating the 2D-RGB plane data, the image processing device 205 first deletes the pixel values of the parallax pixels to create empty pixels. The pixel values for these empty pixels are calculated according to an interpolation process using pixel values of surrounding pixels. For example, the pixel value of the empty pixel $P_{11}$ is calculated by averaging the pixel values of $P_{-1-1}$, $P_{2-1}$, $P_{-12}$, and $P_{22}$, which are the pixel values of the G filter pixels diagonally adjacent to the empty pixel $P_{11}$. As another example, the pixel value of the empty pixel $P_{63}$ is calculated by averaging the pixel values of $P_{43}$, $P_{61}$, $P_{83}$, and $P_{65}$, which are the pixel values of the R filter pixels separated by one pixel from the empty pixel $P_{63}$ in the horizontal and vertical directions. In the same manner, the pixel value of the empty pixel $P_{76}$ is calculated by averaging the pixel values of $P_{56}$, $P_{74}$, $P_{96}$, and $P_{78}$, which are the pixel values of the B filter pixels separated by one pixel from the empty pixel $P_{76}$ in the horizontal and vertical directions.

The 2D-RGB plane data interpolated in this way is the same as the output of a normal image capturing element having a Bayer arrangement, and therefore various types of processing can be performed with 2D image data after this. In other words, the widely known Bayer interpolation is performed to generate color image data in which RGB data is complete for each pixel. The image processing device 205 performs image processing for a general 2D image according to a predetermined format, such as JPEG in a case where still image data is being generated or MPEG in a case where moving image data is being generated.

In the present embodiment, the image processing device 205 further divides the 2D-RGB plane data according to color and applies the interpolation process described above to generate each type of plane data as the reference image data. In other words, the image processing device 205 generates three types of plane data including Gn plane data as the green reference image plane data, Rn plane data as the red reference image plane data, and Bn plane data as the blue reference image plane data.

The right column in the drawing shows an example of the process for generating two pieces of G plane data, two pieces of R plane data, and two pieces of B plane data as the parallax pixel data. The two pieces of G plane data include GLt plane data as the left parallax image data and GRt plane data as the right parallax image data, the two pieces of R plane data include RLt plane data as the left parallax image data and RRt plane data as the right parallax image data, and the two pieces of B plane data include BLt plane data as the left parallax image data and BRt plane data as the right parallax image data.

When generating the GLt plane data, the image processing device 205 deletes the pixel values other than the pixel values of the G(Lt) pixels from among all output values of the image capturing element 100, thereby creating empty pixels. Accordingly, the two pixel values of $P_{11}$ and $P_{55}$ remain in the basic grid 110. The basic grid 110 is divided horizontally and vertically into four equal portions, with the portion of 16 pixels in the top left being represented by the output value of $P_{11}$ and the portion of 16 pixels in the bottom right being represented by the output value of $P_{55}$. The portion of 16 pixels in the top right and the portion of 16 pixels in the bottom left are interpolated by averaging the representative values on the sides adjacent thereto vertically and horizontally. In other words, the GLt plane data has one value per unit of 16 pixels.

In the same manner, when generating the GRt plane data, the image processing device 205 deletes the pixel values other than the pixel values of the G(Rt) pixels from among all output values of the image capturing element 100, thereby creating empty pixels. Accordingly, the two pixel values of $P_{51}$ and $P_{15}$ remain in the basic grid 110. The basic grid 110 is divided horizontally and vertically into four equal portions, with the portion of 16 pixels in the top right being represented by the output value of $P_{51}$ and the portion of 16 pixels in the bottom left being represented by the output value of $P_{15}$. The portion of 16 pixels in the top left and the portion of 16 pixels in the bottom right are interpolated by averaging the representative values on the sides adjacent thereto vertically and horizontally. In other words, the GRt plane data has one value per unit of 16 pixels. In this way, it is possible to generate GLt plane data and GRt plane data having lower resolution than the 2D-RGB plane data.

When generating the RLt plane data, the image processing device 205 deletes the pixel values other than the pixel values of the R(Lt) pixels from among all output values of the image capturing element 100, thereby creating empty pixels. Accordingly, the pixel value of $P_{27}$ remains in the basic grid 110. This pixel value is the representative value for the 64-pixel portion of the basic grid 110. In the same manner, when generating the RRt plane data, the image processing device 205 deletes the pixel values other than the pixel values of the R(Rt) pixels from among all output values of the image capturing element 100, thereby creating empty pixels. Accordingly, the pixel value of $P_{63}$ remains in the basic grid 110. This pixel value is the representative value for the 64-pixel portion of the basic grid 110. In this way, RLt plane data and RRt plane data having lower resolution than the 2D-RGB plane data is generated. In this case, the resolution of the RLt plane data and the RRt plane data is lower than the resolution of the GLt plane data and the GRt plane data.

When generating the BLt plane data, the image processing device 205 deletes the pixel values other than the pixel values of the B(Lt) pixels from among all output values of the image capturing element 100, thereby creating empty pixels. Accordingly, the pixel value of $P_{32}$ remains in the basic grid 110. This pixel value is the representative value for the 64-pixel portion of the basic grid 110. In the same manner, when generating the BRt plane data, the image processing device 205 deletes the pixel values other than the pixel values of the R(Rt) pixels from among all output values of the image capturing element 100, thereby creating empty pixels. Accordingly, the pixel value of $P_{76}$ remains in the basic grid 110. This pixel value is the representative value for the 64-pixel portion of the basic grid 110. In this way, BLt plane data and BRt plane data having lower resolution than the 2D-RGB plane data is generated. In this case, the resolution of the BLt plane data and the BRt plane data is lower than the resolution of the GLt plane data and the GRt plane data, and is equal to the resolution of the RLt plane data and the RRt plane data.

In the present embodiment, there are cases where image processing is applied to the output image data such that the parallax amount between the generated images becomes a target parallax amount. In such a case, the image processing device 205 uses these pieces of plane data to generate color image data of a left side viewpoint and color image data of a right side viewpoint. In particular, by adopting the stereo adjustment parameter, the image processing device 205 generates color image data in which the parallax amount for a 3D image is adjusted while maintaining the blur amount of the 2D color image. Before describing the specific process, the basic principles of this generation will be described.

Figure 4:
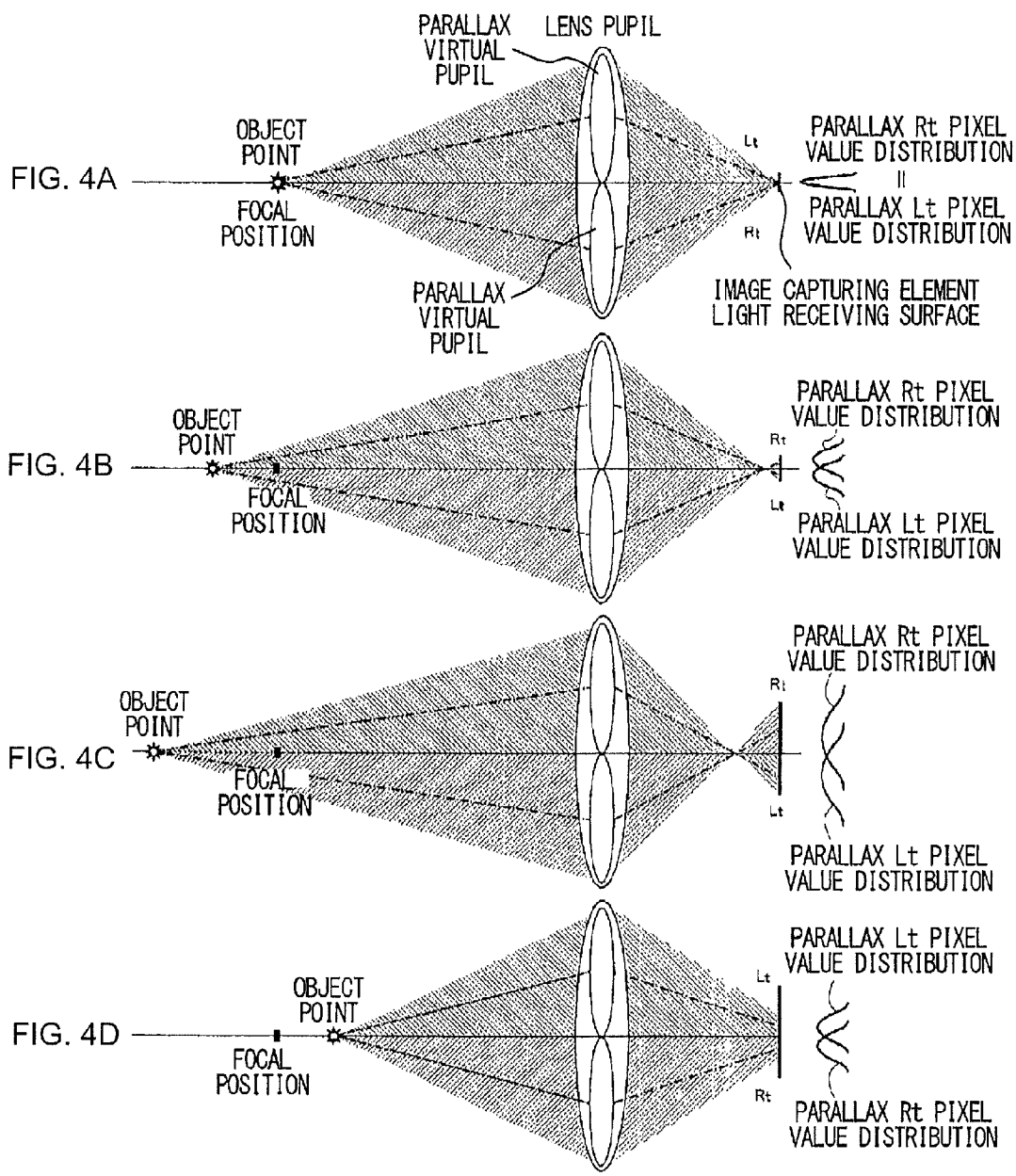
FIG. 4-A is used to describe the basics of defocus.

FIGS. 4-A to 4-D are used to describe the basics of defocus. The parallax Lt pixels and the parallax Rt pixels receive subject light that has passed through one of two parallax virtual pupils set symmetrically to the optical axis, as partial regions of a lens pupil. In the optical system of the present embodiment, the actual subject light passes through the entirety of the lens pupil and therefore, until reaching the parallax pixels, there is no difference between the optical intensity distributions of the right and left parallax virtual pupils. However, due to the operation of the aperture mask of each parallax pixel, the parallax pixels output image signals obtained by photoelectrically converting only the partial light that has passed through the parallax virtual pupils. Accordingly, the pixel value distributions indicated by the output of the parallax pixels may be thought of as having a proportional relationship with respect to the optical intensity distribution of the partial light that has passed through the corresponding parallax virtual pupil.

As shown in FIG. 4-A, when an object point that is the subject is present at the focal position, the output of each parallax pixel exhibits a steep pixel value distribution centered on the corresponding imaging point pixel, regardless of which of the parallax virtual pupils the subject light has passed through. If the parallax Lt pixel is arranged near the imaging point, the output value of the pixel corresponding to the imaging point is highest and the output values of the surrounding pixels drop sharply. Also, if the parallax Rt pixel is arranged near the imaging point, the output value of the pixel corresponding to the imaging point is highest and the output values of the surrounding pixels drop sharply. In other words, whichever of the parallax virtual pupils the subject light passes through, both distributions match in that the output value of the pixel corresponding to the imaging point is highest and the output values of the surrounding pixels drop sharply.

On the other hand, as shown in FIG. 4-B, when the object point is shifted from the focal position, in contrast to a case in which the object point is at the focal position, the peak of the pixel value distribution exhibited by the parallax Lt pixels occurs at a position that is at a distance in one direction from the pixel corresponding to the imaging point, and the output value at this peak decreases. Furthermore, the width of pixels having an output value increases. The peak of the pixel value distribution exhibited by the parallax Rt pixels occurs at a position that is at a distance equal to the shift distance of the peak of the parallax Lt pixels from the pixel corresponding to the imaging point, but in a direction opposite the shift direction occurring with the parallax Lt pixels, and the output value at this peak decreases in the same manner. Also in the same manner, the width of pixels having an output value increases. In other words, the same pixel distributions occur equidistant from the focal position, but have a milder slope compared to a case in which the object point is at the focal position. As shown in FIG. 4-C, when the object point is shifted farther from the focal position, identical distributions occur farther from the focal position and with even milder slopes compared to the state seen in FIG. 4-B. Essentially, it can be said that as the object point is shifted farther from the focal position, the blur amount and the parallax amount increase. In other words, the blur amount and parallax amount change in conjunction with each other, according to the defocus. Specifically, the blur amount and the parallax amount have a one-to-one correspondence.

FIGS. 4-B and 4-C show cases in which the object point is shifted from the focal position in a direction to be father away, but in a case where the object point is shifted from the focal point in a direction to be closer, as shown in FIG. 4-D, the relative positional relationship between the pixel value distribution exhibited by the parallax Lt pixels and the pixel value distribution exhibited by the parallax Rt pixels becomes inverted relative to the cases shown in FIGS. 4-B and 4-C. With this defocus relationship, a viewer who is viewing the parallax images perceives a subject that is present behind the focal position as being farther away and perceives a subject that is present in front of the focal position as being closer.

Figure 5:
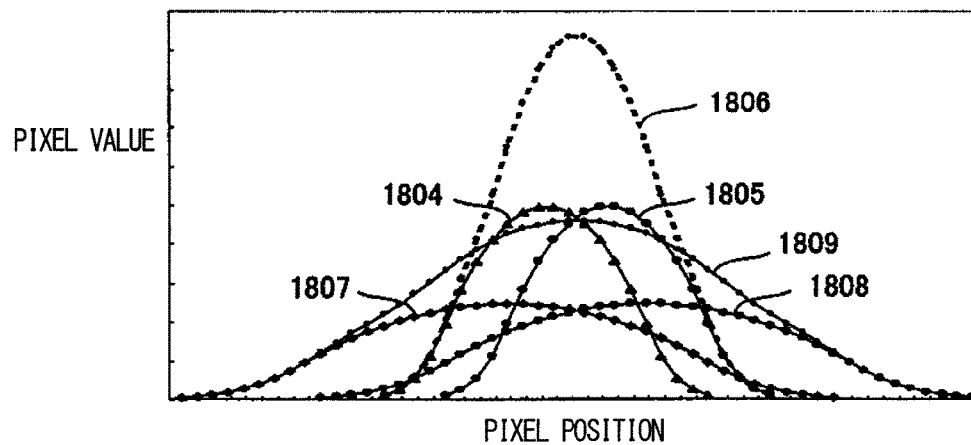
FIG. 5 shows an optical intensity distribution output by the parallax pixels.

FIG. 5 shows a result obtained by graphing the changes of each pixel value distribution described in FIGS. 4-B and 4-C. In the drawing, the horizontal axis indicates the pixel position, and the center position is the pixel position corresponding to the imaging point. The vertical axis indicates the output value (pixel value) of each pixel. The output value is substantially proportional to the optical intensity, as described above.

The distribution curve 1804 and the distribution curve 1805 respectively indicate the pixel value distribution of the parallax Lt pixels and the pixel value distribution of the parallax Rt pixels in FIG. 4-B. As understood from the drawing, these distributions are linearly symmetrical with respect to the center position. Furthermore, the combined distribution curve 1806 formed by adding together these distributions exhibits substantially the same shape as the pixel value distribution of the non-parallax pixels for the state shown in FIG. 4-B, i.e. the pixel value distribution in a case where all of the subject light is received.

The distribution curve 1807 and the distribution curve 1808 respectively indicate the pixel value distribution of the parallax Lt pixels and the pixel value distribution of the parallax Rt pixels in FIG. 4-C. As understood from the drawing, these distributions are also linearly symmetrical with respect to the center position. Furthermore, the combined distribution curve 1809 formed by adding together these distributions exhibits substantially the same shape as the pixel value distribution of the non-parallax pixels for the state shown in FIG. 4-C.

Figure 6:
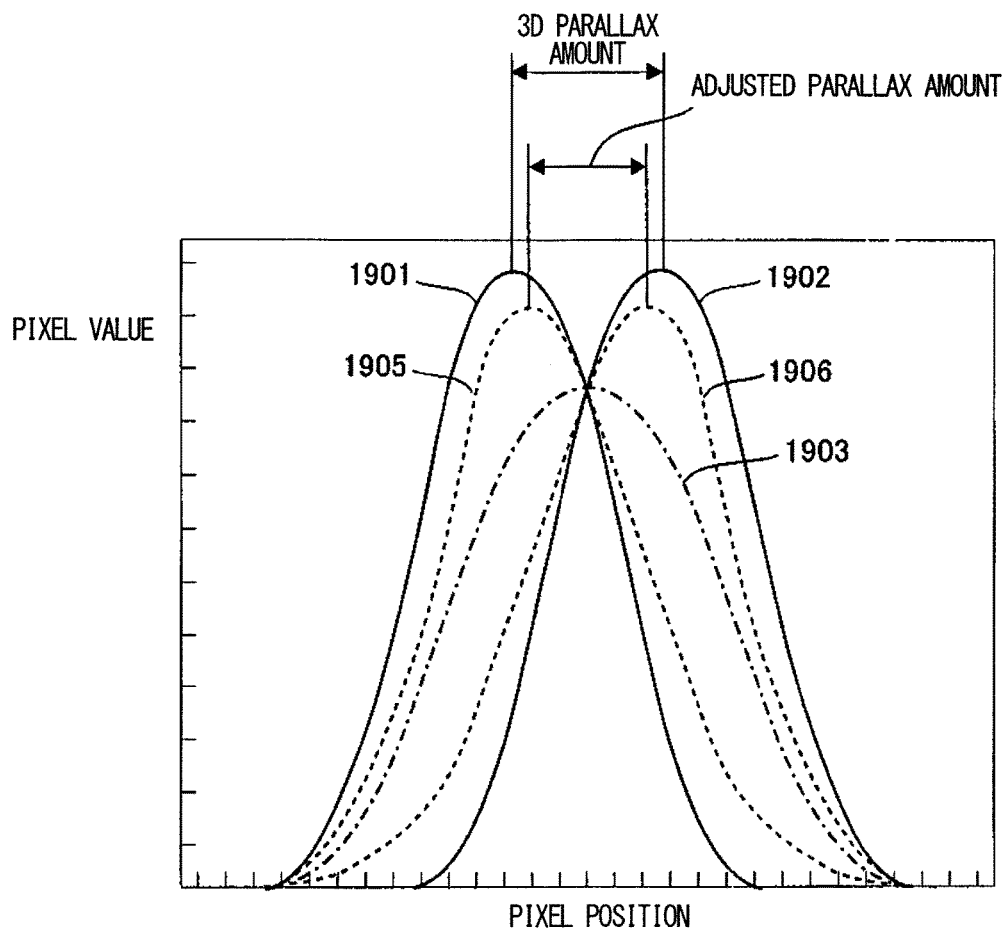
FIG. 6 shows a pixel value distribution for describing the basics of the adjusted parallax amount.

In the present embodiment, when performing image processing using the stereo adjustment parameter, a virtual pixel value distribution is actually created using the pixel values of the parallax Lt pixels and the pixel values of the parallax Rt pixels in a pixel distribution obtained by acquiring the output values of the image capturing element 100 and performing the interpolation process to fill in the empty pixels. At this time, the parallax amount expressed as the space between the peaks is adjusted while approximately maintaining the blur amount expressed as the spread of the pixel value distributions. In other words, the image processing device 205 of the present embodiment generates an image that has a parallax amount adjusted between a 2D image generated from the non-parallax pixels and a 3D image generated from the parallax pixels, while maintaining the blur amount of the 2D image in a practically unaltered state. FIG. 6 shows the pixel value distributions for describing the basics of the adjusted parallax amount.

The Lt distribution curve 1901 and the Rt distribution curve 1902 shown by solid lines in the drawing are distribution curves obtained by plotting the actual pixel values of the Lt plane data and the Rt plane data. For example, these curves correspond to the distribution curves 1804 and 1805 in FIG. 5. Furthermore, the distance between the peaks of the Lt distribution curve 1901 and the Rt distribution curve 1902 represents the 3D parallax amount, and when this distance is larger the stereoscopic feeling when playing the image is stronger.

The 2D distribution curve 1903 is obtained by adding together 50% of the Lt distribution curve 1901 and 50% of the Rt distribution curve 1902, and has a convex shape without skewing to the right or left. The 2D distribution curve 1903 corresponds to a shape that has half the height of the combined distribution curve 1806 in FIG. 5. In other words, the image based on this distribution is a 2D image with a parallax amount of zero.

The adjusted Lt distribution curve 1905 is a curve obtained by adding together 80% of the Lt distribution curve 1901 and 20% of the Rt distribution curve 1902. The peak of the adjusted Lt distribution curve 1905 is displaced toward the center more than the peak of the Lt distribution curve 1901, by an amount corresponding to the addition of the Rt distribution curve 1902 component. In the same manner, the adjusted Rt distribution curve 1906 is a curve obtained by adding together 20% of the Lt distribution curve 1901 and 80% of the Rt distribution curve 1902. The peak of the adjusted Rt distribution curve 1906 is displaced toward the center more than the peak of the Rt distribution curve 1902, by an amount corresponding to the addition of the Lt distribution curve 1901 component.

Accordingly, the adjusted parallax amount expressed by the distance between the peaks of the adjusted Lt distribution curve 1905 and the adjusted Rt distribution curve 1906 is smaller than the 3D parallax amount. Therefore, the stereoscopic feeling when playing the image is weakened. On the other hand, the spread of the distribution of the adjusted Lt distribution curve 1905 and the distribution of the adjusted Rt distribution curve 1906 is equal to the spread of the 2D distribution curve 1903, and therefore it can be said that the blur amount is equal to that of the 2D image.

In other words, it is possible to control the adjusted parallax amount according to what percentages of the Lt distribution curve 1901 and the Rt distribution curve 1902 are added together. By applying this adjusted pixel value distribution to each plane of the color image data generated from the non-parallax pixels, it is possible to generate color image data of a left side viewpoint and color image data of a right side viewpoint that provide a stereoscopic feeling different from that of the parallax image data generated from the parallax pixels.

In the present embodiment, the color image data of the left side viewpoint and the color image data of the right side viewpoint are generated from the nine pieces of plane data described using FIG. 3. The color image data of the left side viewpoint is formed by three pieces of color parallax plane data including the $RLt_c$ plane data that is red plane data corresponding to the left side viewpoint, the $GLt_c$ plane data that is green plane data corresponding to the left side viewpoint, and the $BLt_c$ plane data that is blue plane data corresponding to the left side viewpoint. In the same manner, the color image data of the right side viewpoint is formed by three pieces of color parallax plane data including the $RRt_c$ plane data that is red plane data corresponding to the right side viewpoint, the $GRt_c$ plane data that is green plane data corresponding to the right side viewpoint, and the $BRt_c$ plane data that is blue plane data corresponding to the right side viewpoint.

Figure 7:
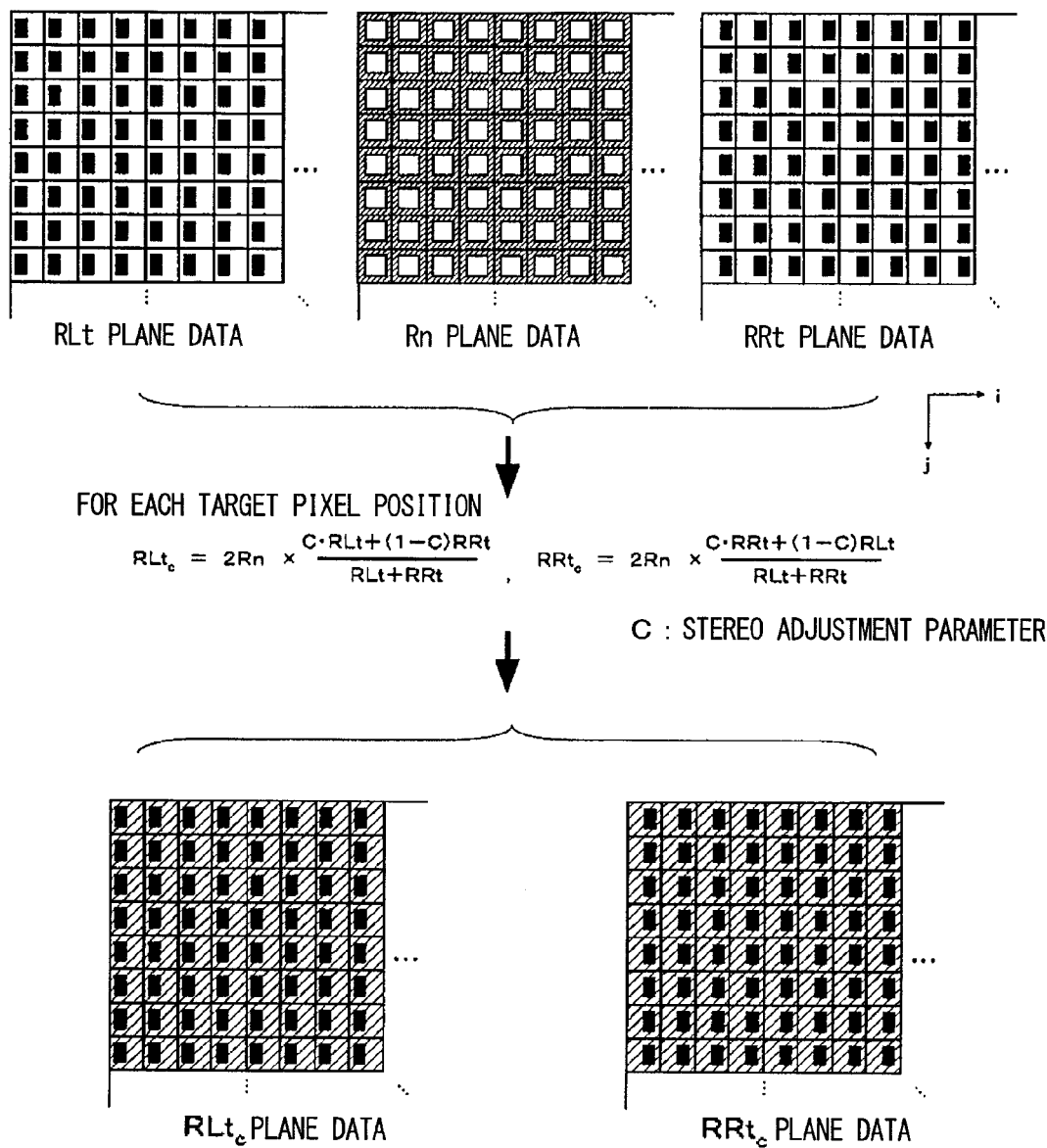
FIG. 7 is used to describe the process for generating color parallax plane data.

FIG. 7 is used to describe the process for generating color parallax plane data. In particular, FIG. 7 shows the process for generating the $RLt_c$ plane data and the $RRt_c$ plane data, which are for the red parallax plane among the color parallax planes.

The red parallax plane is generated using the pixel values of the RLt plane data, the pixel values of the RRt plane data, and the pixel values of the Rn plane data described using FIG. 3. As a specific example, when calculating the pixel value $RLt_{mn}$ of a target pixel position $(i_m, j_n)$ in the $RLt_c$ plane data, the calculating section 233 of the image processing device 205 first extracts the pixel value $RLt_{mn}$ from the same pixel position $(i_m, j_n)$ of the Rn plane data. Next, the calculating section 233 extracts the pixel value $RLt_{mn}$ from the same pixel position $(i_n, k_n)$ of the RLt plane data and extracts the pixel value $RRt_{mn}$ from the same pixel position $(i_m, j_n)$ of the RRt plane data. The calculating section 233 then multiplies the pixel value $Rn_{mn}$ by a value obtained by distributing the pixel values $RLt_{mn}$ and $RRt_{mn}$ according to the stereo adjustment parameter C, thereby calculating the pixel value $RLt_{cmn}$. Specifically, the calculation is performed according to Expression 1 shown below. Here, the stereo adjustment parameter is set in a range of $0.5 < C < 1$.

Expression 1

$$RLt_{cmn} = 2Rn_{mn} \times \frac{C \times RLt_{mn} + (1-C) \times RRt_{mn}}{RLt_{mn} + RRt_{mn}} \quad (1)$$

In the same manner, when calculating the pixel value $RRt_{cmn}$ of a target pixel position $(i_m, j_n)$ in the $RRt_c$ plane data, the calculating section 233 multiplies the extracted pixel value $Rn_{mn}$ by a value obtained by distributing the pixel value $RLt_{mn}$ and the pixel value $RRt_{mn}$ according to the stereo adjustment parameter C, thereby calculating the pixel value $RRt_{cmn}$. Specifically, the calculation is performed according to Expression 2 shown below.

Expression 2

$$RRt_{cmn} = 2Rn_{mn} \times \frac{(1-C) \times RLt_{mn} + C \times RRt_{mn}}{RLt_{mn} + RRt_{mn}} \quad (2)$$

The calculating section 233 sequentially performs this type of process from the pixel (1, 1) at the top left edge to the pixel $(i_0, j_0)$ at the bottom right edge.

Upon finishing the process for generating the $RLt_c$ plane data and the $RRt_c$ plane data, which is the red parallax plane, the process for generating the $GLt_c$ plane data and the $GRt_c$ plane data, which is the green parallax plane, is then performed. Specifically, instead of extracting the pixel value $Rn_{mn}$ from the same pixel position $(i_m, j_n)$ of the Rn plane data as described above, the pixel value $Gn_{mn}$ is extracted from the same pixel position $(i_m, j_n)$ of the Gn plane data. Furthermore, instead of extracting the pixel value $RLt_{mn}$ from the same pixel position $(i_m, j_n)$ of the RLt plane data, the pixel value $GLt_{mn}$ is extracted from the same pixel position $(i_m, j_n)$ of the GLt plane data. In the same manner, instead of extracting the pixel value $RRt_{mn}$ from the same pixel position $(i_m, j_n)$ of the RRt plane data, the pixel value $GRt_{mn}$ is extracted from the same pixel position $(i_m, j_n)$ of the GRt plane data. Processing is performed in the same manner, except that the parameters of Expression 1 and Expression 2 are altered as desired.

Furthermore, upon finishing the process for generating the $GLt_c$ plane data and the $GRt_c$ plane data, which is the green parallax plane, the process for generating the $BLt_c$ plane data and the $BRt_c$ plane data, which is the blue parallax plane, is then performed. Specifically, instead of extracting the pixel value $Rn_{mn}$ from the same pixel position $(i_m, j_n)$ of the Rn plane data as described above, the pixel value $Bn_{mn}$ is extracted from the same pixel position $(i_m, j_n)$ of the Bn plane data. Furthermore, instead of extracting the pixel value $RLt_{mn}$ from the same pixel position $(i_m, j_n)$ of the RLt plane data, the pixel value $BLt_{mn}$ is extracted from the same pixel position $(i_m, j_n)$ of the BLt plane data. In the same manner, instead of extracting the pixel value $RRt_{mn}$ from the same pixel position $(i_m, j_n)$ of the RRt plane data, the pixel value $BRt_{mn}$ is extracted from the same pixel position $(i_m, j_n)$ of the BRt plane data. Processing is performed in the same manner, except that the parameters of Expression 1 and Expression 2 are altered as desired.

With the process described above, color image data of the left side viewpoint (the $RLt_c$ plane data, $GLt_c$ plane data, and $BLt_c$ plane data) and color image data of the right side viewpoint (the $RRt_c$ plane data, $GRt_c$ plane data, and $BRt_c$ plane data) are generated. In other words, color image data of the right side viewpoint and of the left side viewpoint can be generated with a relatively simple process, as virtual output that does not depend on the actual pixels of the image capturing element 100.

Furthermore, since the stereo adjustment parameter can be changed in a range of $0.5 < C < 1$, the magnitude of the parallax amount can be adjusted for a 3D image, while maintaining the blur amount of the 2D color image resulting from the non-parallax pixels. Accordingly, when these types of image data are played by a playing device adapted for 3D images, the viewer of the stereo image display panel can view a 3D image adjusted to have a suitable stereoscopic feeling as a color image. In particular, since the processing is simple, the image data can be generated quickly and can therefore be used for moving images as well.

The following describes the above processing from a perspective considering color and pixel value distribution. FIGS. 8-A to 8-C are used to describe the change in the RGB pixel value distributions. FIG. 8-A is a graph in which are arranged the output values for each of the G(Lt) pixels, the G(Rt) pixels, the R(Lt) pixels, the R(Rt) pixels, the B(Lt) pixels, the B(Rt) pixels, in a case where white subject light is received from a position shifted by a prescribed amount from the focal position.

FIG. 8-B is a graph in which are arranged the output values for each of the R(N) pixels, the G(N) pixels, and the B(N) pixels, which are non-parallax pixels, in a case where white subject light is received from the object point in FIG. 8-A. This graph can also be said to represent the pixel value distribution of each color.

When the above process is applied to each corresponding pixel while C=0.8, the pixel value distributions shown in the graph of FIG. 8-C are obtained. As understood from the drawing, a distribution is obtained corresponding to the pixel values of each RGB color.

Figure 9:
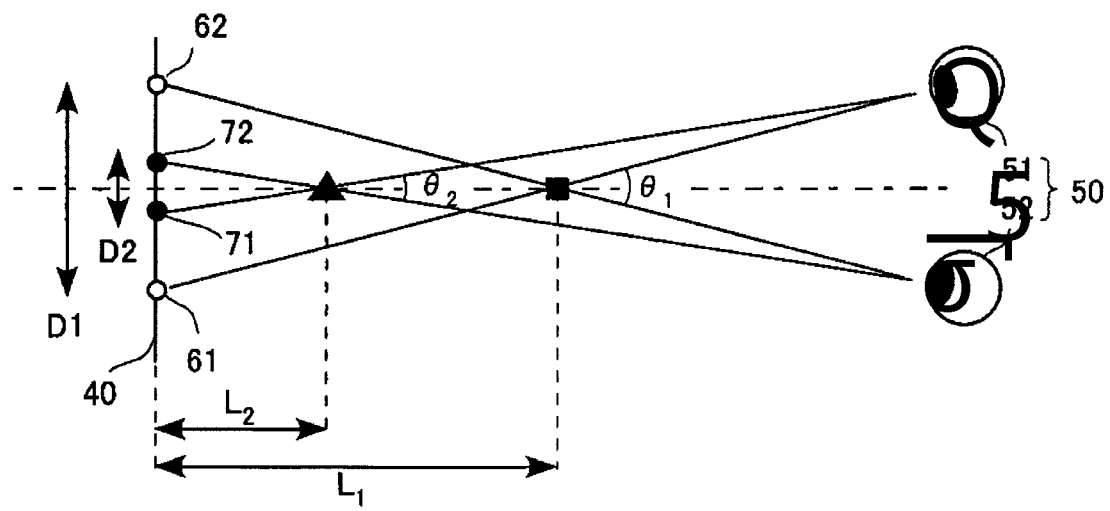
FIG. 9 shows the relationship between the parallax amount and the angle of convergence of the viewer.

The following describes the relationship between the viewer and the video, in a case where 3D image data is played by a playing apparatus. FIG. 9 shows the relationship between the angle of convergence of the viewer and the parallax amount. The eyes 50 represents the eyes of the viewer, and are represented by a right eye 51 and a left eye 52 distanced from each other in the drawing.

Unadjusted image data, for which the parallax amount has not been adjusted, is played in the display section 40, thereby displaying a subject 61 of a right eye image and a subject 62 of a left eye image. The subject 61 and the subject 62 are the same subject and are present at the same position shifted from the focal point during imaging, and therefore the subject 61 and the subject 62 are displayed in the display section 40 with a parallax amount $D_1$ therebetween.

The eyes 50 attempt to view the subject 61 and the subject 62 as matching images, and therefore the viewer perceives the subject as being at a position with a floating distance L1 (indicated by a square in the drawing) where the straight line connecting the right eye 51 to the subject 61 intersects with the straight line connecting the left eye 52 to the subject 62.

The angle of convergence at this time is $\theta_1$, as shown in the drawing. In general, when the angle of convergence is larger, a sense of unnaturalness is perceived in the video, and this causes eye strain. Therefore, when performing image processing using the stereo adjustment parameter according to the present embodiment, adjusted image data is played in which the parallax amount has been adjusted according to the stereo adjustment parameter as described above. The drawing shows a state in which the adjusted image data is played overlapping the unadjusted image data.

The subject 71 of the right eye image and the subject 72 of the left eye image of the adjusted image data are displayed in the display section 40. The subject 71 and the subject 72 are the same subject, and are also the same subject as the subjects 61 and 62. The subject 71 and the subject 72 are displayed in the display section 40 with a parallax amount $D_2$ therebetween. The viewer perceives the subject as being at a position with a floating distance L2 (indicated by a triangle in the drawing) where the straight line connecting the right eye 51 to the subject 71 intersects with the straight line connecting the left eye 52 to the subject 72.

The angle of convergence at this time is $\theta_2$, which is smaller than $\theta_1$. Accordingly, the viewer does not experience a sense of floating at the edges and the accumulation of eye strain can be reduced. The parallax amount is suitably adjusted as described further below, and therefore the viewer can view the video while perceiving a comfortable sense of floating (and a sense of the stereoscopic nature of the video when combined with a perception of sinking when the defocus relationship is inverted).

The parallax amount used in the description of FIG. 9 is expressed as a separation distance in the display section 40, but the parallax amount can be defined in various ways. For example, the parallax amount may be defined by pixel units in the captured image data or by the width of the shift relative to the horizontal width of the images.

Figure 10A:
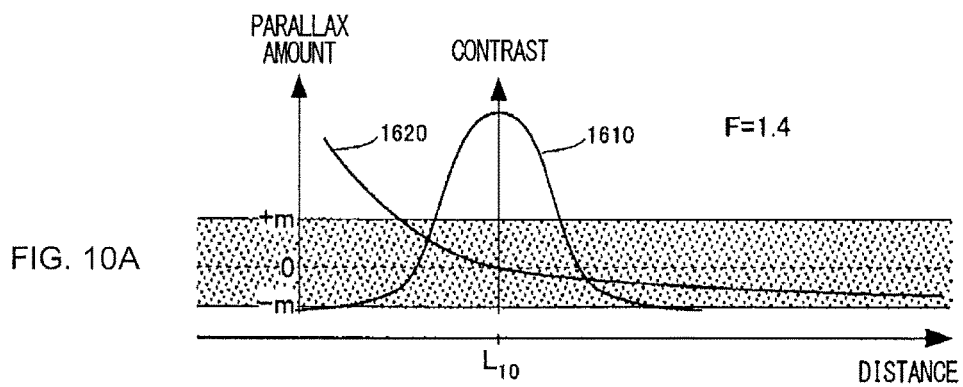
FIG. 10-A schematically shows the relationship between the diaphragm value, the contrast indicating the image sharpness, the distance of the subject, and the parallax amount.
Figure 10B:
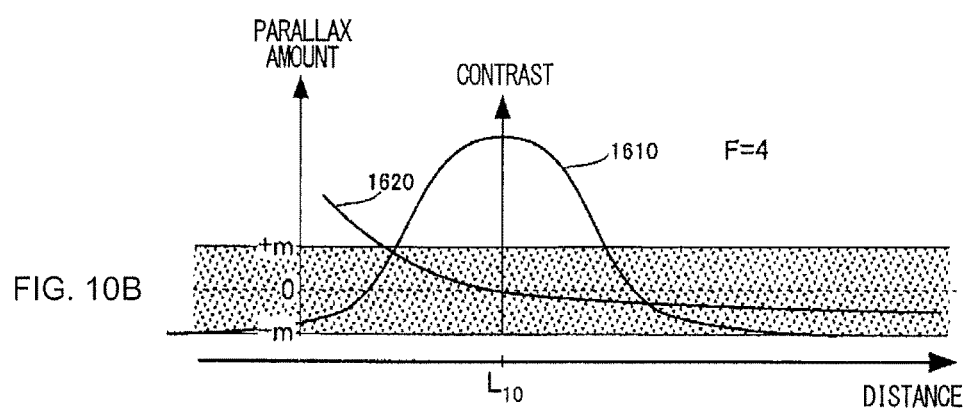
Figure 10C:
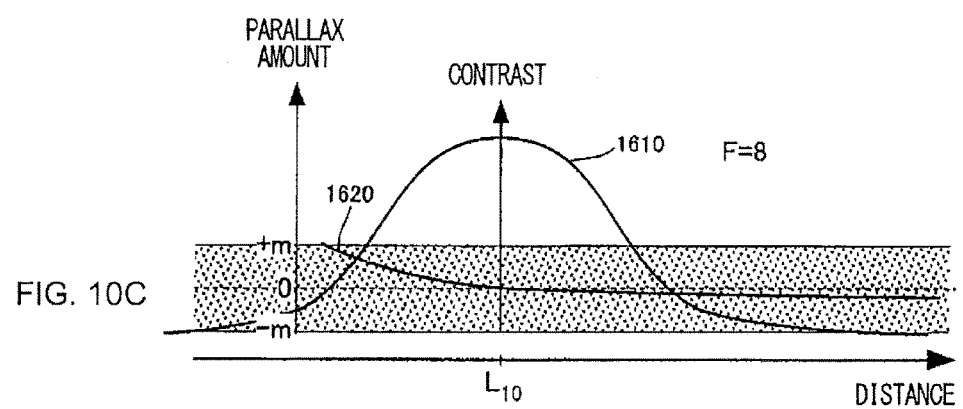

FIGS. 10-A to 10-C schematically show the relationship between the diaphragm value of the digital camera 10, the contrast indicating the image sharpness, the distance of the subject, and the parallax amount. The horizontal axes represent the distance from the digital camera 10 and the vertical axes represent the parallax amount and contrast. FIG. 10-A shows a state in which the diaphragm value is F1.4, FIG. 10-B shows a state in which the diaphragm value is F4, and FIG. 10-C shows a state in which the diaphragm value is F8. The focal distance of the imaging lens 20 is the same in each of these states, and the digital camera 10 aligns the focal point with the main subject positioned at a distance $L_{10}$.

The contrast curve 1610 is highest at the distance $L_{10}$, which is the distance to the focal position in each of the states. On the other hand, when the diaphragm value is larger, the contrast is relatively high in front of and behind the focal distance. In other words, an image captured in a state where the diaphragm 22 is more constricted exhibits greater depth of field.

The parallax amount curve 1620 indicates a parallax amount of zero at the distance $L_{10}$, and has a curve in which the slope is greater when closer to the digital camera 10 from the distance $L_{10}$. In other words, the parallax amount curve 1620 exhibits a positive value when closer than the distance $L_{10}$, and indicates that closer subjects appear to be floating to a greater degree.

On the other hand, the parallax amount curve 1620 has a curve in which the slope is smaller when farther from the digital camera 10 than the distance $L_{10}$. In other words, the parallax amount curve 1620 exhibits a negative value when farther than the distance $L_{10}$, and indicates that farther subjects appear to be slowly sinking to a greater degree.

Furthermore, the change in the parallax amount curve 1620 becomes more gradual when the diaphragm value becomes greater. In other words, compared to a case in which the diaphragm value is F1.4, the transition to F4 and F8 results in the parallax amount in front of the focal position and the parallax amount behind the focal position both becoming smaller.

If the viewer does not experience a sense of unnaturalness or eye strain when the parallax amount is within a range from −m to +m, then the parallax amount curve 1620 is within this range if the diaphragm value is F8, and therefore the viewer can comfortably view 3D video no matter what distance the subject is at.

On the other hand, when the diaphragm value is F1.4 or F4, +m is exceeded on the near-distance side of the parallax amount curve 1620. Accordingly, if the subject is at a distance closer than +m, the viewer experiences a sense of unnaturalness and eye strain. Therefore, the image processing device 205 of the present embodiment generates adjusted image data in which the parallax amount is adjusted by the stereo adjustment parameter to be between a set minimum value and a set maximum value.

Figure 11:
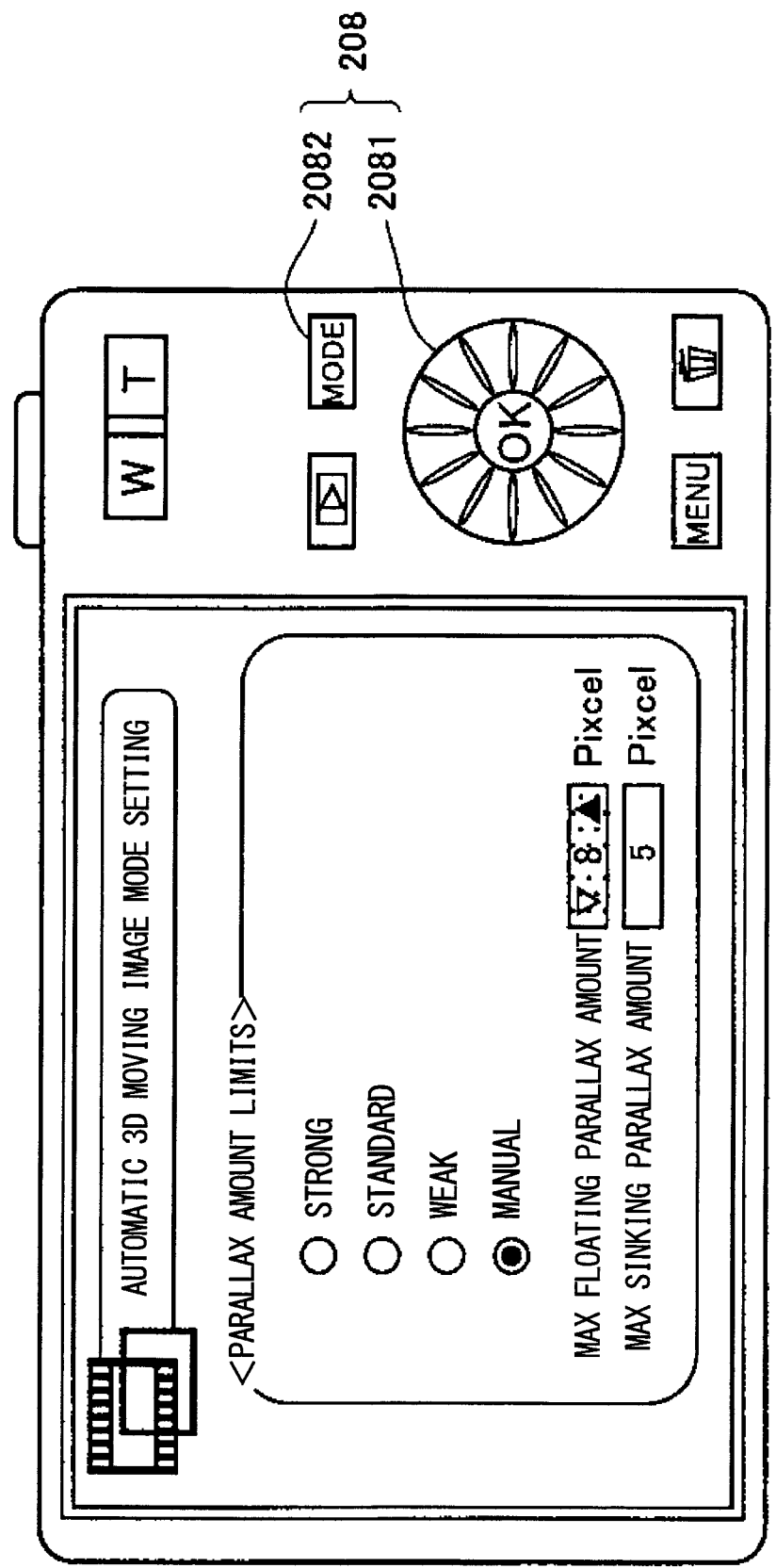
FIG. 11 is a back surface view of the digital camera displaying a menu screen for limiting the parallax amount.

First, the limits on the parallax amount will be described. FIG. 11 is a back surface view of the digital camera 10 displaying a menu screen for limiting the parallax amount.

The parallax amount limitations are set as a minimum value −m and a maximum value +m, as described above. The minimum value and the maximum value may have different absolute values. Here, the parallax amount is represented in pixel units of the parallax image in the adjusted parallax image data.

The parallax amount at which a viewer experiences a sense of unnaturalness and eye strain differs for each viewer. Accordingly, the digital camera 10 is preferably configured such that the settings for the parallax amount limitations can be changed by the image capturer, who is the user of the digital camera 10, during image capturing.

The digital camera 10 is provided with four selections such as shown in the drawing, for example, as the parallax amount limitation menu. Specifically, these four options include "standard," where a range in which a viewer can usually view images comfortably is preset, "strong," where a range that is wider than the standard range is preset to allow for a greater parallax amount, "weak," where a range that is narrower than the standard range is preset to allow for only a small parallax amount, and "manual," where the image capturer inputs numerical values for the minimum value and maximum value. When "manual" is selected, the image capturer can sequentially set, in pixel units, the "maximum floating amount" as the maximum value and the "maximum sinking amount" as the minimum value. By manipulating the dial button 2081, which is a portion of the manipulating section 208, the image capturer can designate one of these selections.

When the allowable parallax amount range is set as the parallax amount limitation in this manner, the image processing device 205 generates the adjusted parallax image data in which the parallax amount is adjusted to be within this range. The parallax amount adjustment process of the present embodiment does not require a complex process such as seen in the conventional art, where each subject object is cut out and moved horizontally in object units while using a depth map. Accordingly, calculation can be performed more quickly than in the conventional art, and therefore the image processing device 205 can be easily adapted to output adjusted parallax image data in real time, even for moving images in which the state of the subject changes over time.

The digital camera 10 of the present embodiment has, as one type of moving image capturing mode, an automatic 3D moving image mode to continuously generate parallax image data adjusted to have a comfortable parallax amount and connect these pieces of data to generate a moving image file. Prior to image capturing, the image capturer selects this automatic 3D moving image mode by manipulating the mode button 2082, which is a portion of the manipulating section 208.

Whether all of the subjects forming a single scene fall within the set parallax amount range depends on a variety of conditions, as is understood from the descriptions of FIGS. 10-A to 10-C. These conditions, including the set parallax amount range as well, are set as adjustment conditions relating to the parallax amount adjustment.

The following further describes the adjustment conditions. The adjustment condition acquiring section 231 acquires various adjustment conditions and passes these adjustment conditions to the adjustment value determining section 232 as appropriate. As described above, the adjustment condition acquiring section 231 acquires, as an adjustment condition, the parallax amount range input via the menu screen and the manipulating section 208.

FIGS. 10-A to 10-C describe a case in which the focal distance of the imaging lens 20 is fixed, but when capturing images of a single subject, the parallax amount changes according to the focal distance of the imaging lens 20. In other words, the focal distance, which is a setting condition of the imaging lens 20 serving as the optical system, can become an adjustment condition that affects the parallax amount. Accordingly, the adjustment condition acquiring section 231 acquires focal distance information, i.e. zoom information, that is acquired by the control section 201 from the imaging lens 20, as an adjustment condition.

As described using FIGS. 10-A to 10-C, the slope of the parallax amount curve 1620 changes according to the change in the diaphragm value. In other words, the diaphragm value when acquiring the captured image data, i.e. during image capturing, can become an adjustment condition that affects the parallax amount, as a setting condition of the optical system. Accordingly, the adjustment condition acquiring section 231 acquires, as an adjustment condition, the diaphragm value acquired by the control section 201 from the imaging lens 20.

As described using FIGS. 10-A to 10-C, the parallax amount is zero for a subject aligned with the focal point, and takes on a positive or negative value in front of or behind the focal point. In other words, the focus lens position, which is a setting condition of the imaging lens 20 serving as the optical system, can become an adjustment condition affecting the parallax amount. Accordingly, the adjustment condition acquiring section 231 acquires, as an adjustment condition, the focus lens position, i.e. the focus information, that is acquired by the control section 201 from the imaging lens 20.

In FIGS. 10-A to 10-C, it is assumed that the main subject is present at the distance $L_{10}$, which is the focal position, but in a case where other subjects are distributed at different depths, these other subjects appear to float or sink. In other words, the subject distribution in the depth direction can become an adjustment condition that affects the parallax amount, as a subject state. Accordingly, the adjustment condition acquiring section 231 acquires the subject distribution in the depth direction as an adjustment condition. Specifically, the control section 201 uses the defocus information used for the autofocus to detect the subject distribution, from the defocus amount in each of a plurality of divided regions. The defocus information may utilize the output of a phase difference sensor provided especially for this purpose or the output of the parallax pixels of the image capturing element 100. When using the output of the parallax pixels, the parallax image data processed by the image processing device 205 can be used.

Figure 12A:
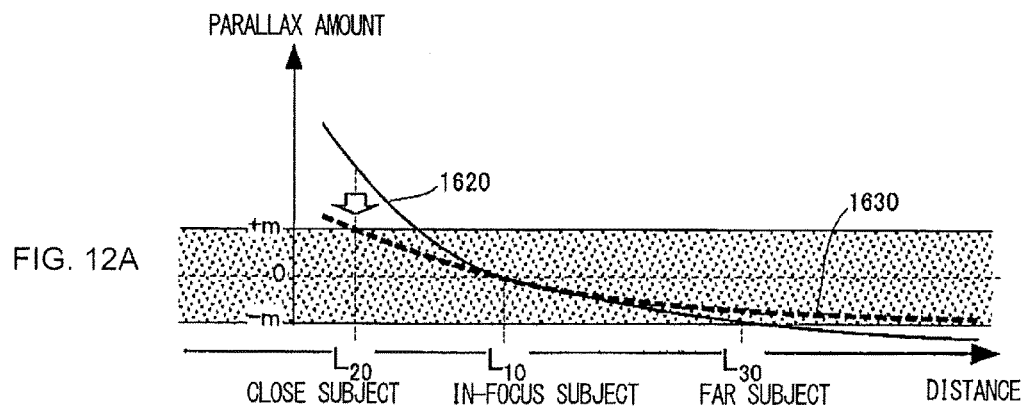
FIG. 12-A shows the basics of the parallax amount adjustment.
Figure 12B:
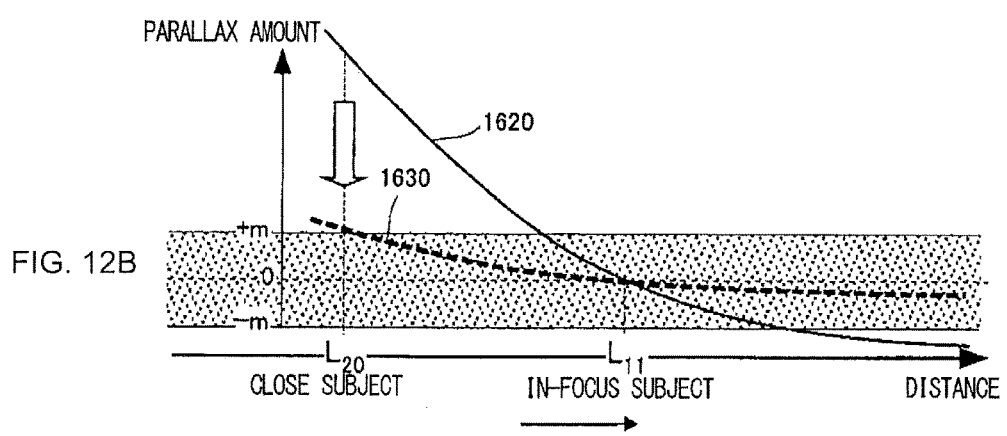
Figure 12C:
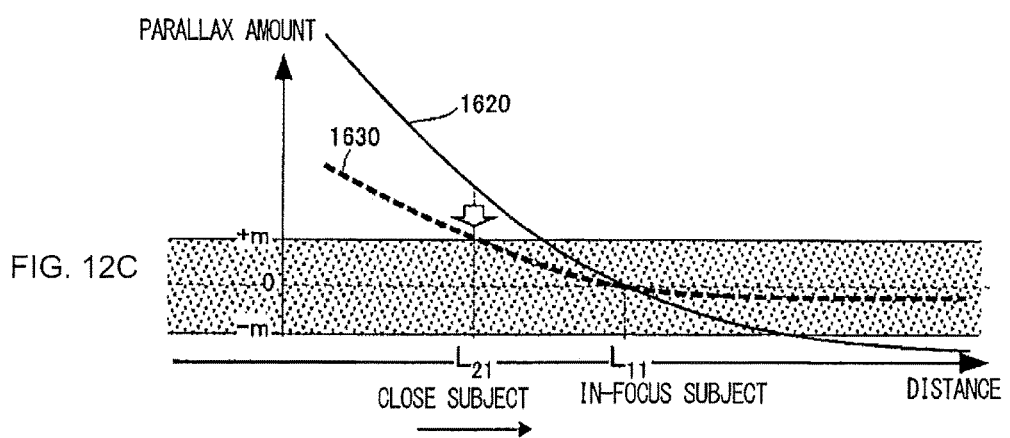

The following describes the adjustment of the parallax amount using a stereo adjustment parameter whose value is determined according to the adjustment conditions. FIGS. 12-A to 12-C show the basics of the parallax amount adjustment.

FIG. 12-A corresponds to a view obtained by removing the contrast curve 1610 from FIG. 10-A. Here, in addition to the in-focus subject serving as the main subject, which is the target image aligned with the focal point, it is assumed that there are also a close subject that is in front of the focal point, i.e. on the digital camera 10 side, and a far subject that is behind the focal point, i.e. on the opposite side. In FIG. 10-A the in-focus subject is at the distance $L_{10}$, the close subject is at the distance $L_{20}$, and the far subject is at the distance $L_{30}$.

When the parallax amount range is set from −m to +m as an adjustment condition, the value of the parallax amount curve 1620 at the distance $L_{30}$ where the far subject is located is within this parallax amount range, and therefore the parallax amount need not be adjusted on the far subject side. However, the value of the parallax amount curve 1620 at the distance $L_{20}$ where the close subject is located exceeds +m, and therefore the overall parallax amount is adjusted such that the parallax amount of the image of the close subject becomes +m.

In other words, the parallax amount curve is adjusted such that the parallax amount of the image of the subject located farthest forward from the in-focus subject, i.e. the close subject, and the parallax amount of the image of the subject located farthest backward from the in-focus subject, i.e. the far subject, are both within the set parallax amount range. More specifically, the parallax amount curve should be adjusted such that the parallax amount of the subject image that is furthest outside of the set parallax amount range becomes a limit value of the parallax amount range. In FIG. 12-A, the adjusted parallax amount curve 1630 is the result of adjusting the parallax amount curve in this manner. By performing this adjustment, the images of all subjects included in the same scene fall within the set parallax amount range.

FIG. 12-B shows the basics of the parallax amount adjustment in a case where the in-focus subject is moved deeper from the distance $L_{10}$ to the distance $L_{11}$, from the subject state shown in FIG. 12-A. In this case, the focal position is at the distance $L_{11}$, and therefore the parallax amount for the image of the close subject at the distance $L_{20}$, which has not moved, becomes significantly greater than in FIG. 12-A, as shown by the parallax amount curve 1620. In this case as well, in the same manner as described in FIG. 12-A, the overall parallax amount is adjusted such that the parallax amount of the image of the close subject becomes +m. It should be noted that the adjustment amount is greater than the adjustment amount used in the case of FIG. 12-A.

As a result, the slope of the adjusted parallax amount curve 1630 becomes closer to being horizontal, and therefore the parallax amount of the image on the far subject side is more restricted.

FIG. 12-C shows the basics of the parallax amount adjustment in a case where the close subject is moved deeper from the distance $L_{20}$ to the distance $L_{21}$, from the subject state shown in FIG. 12-B. In this case, the focal position remains at the distance $L_{11}$, and therefore the parallax amount curve 1620 remains the same, but since the close subject has been shifted deeper, the adjustment amount is less than the adjustment amount used in the case of FIG. 12-B.

In the manner described above, the adjustment amount is uniquely determined if the adjustment conditions described above can be acquired. The adjustment amount has a one-to-one relationship with the stereo adjustment parameter C, and therefore the adjustment value determining section 232 can determine the value of the stereo adjustment parameter C if the adjustment conditions are received from the adjustment condition acquiring section 231. Specifically, a look-up table corresponding to FIGS. 12-A to 12-C is prepared in advance, and when each value for the adjustment conditions is input and the look-up table is referenced, the adjustment value determining section 232 can extract and determine the value of the stereo adjustment parameter C for this input. The look-up table is constructed using the results of actual experimentation or a simulation performed in advance, for example. As another example, instead of using a look-up table format, a multivariable function in which each value of the adjustment conditions serves as a variable may be prepared in advance.

The adjustment conditions need not include all of the conditions described above, and may adopt a portion of these conditions. For example, by using only the focal distance of the imaging lens 20 as an adjustment condition and setting a one-to-one relationship between the focal distance and the value of the stereo adjustment parameter C, the sense of unnaturalness and eye strain experienced by the viewer can be decreased by some degree.

Figure 13:
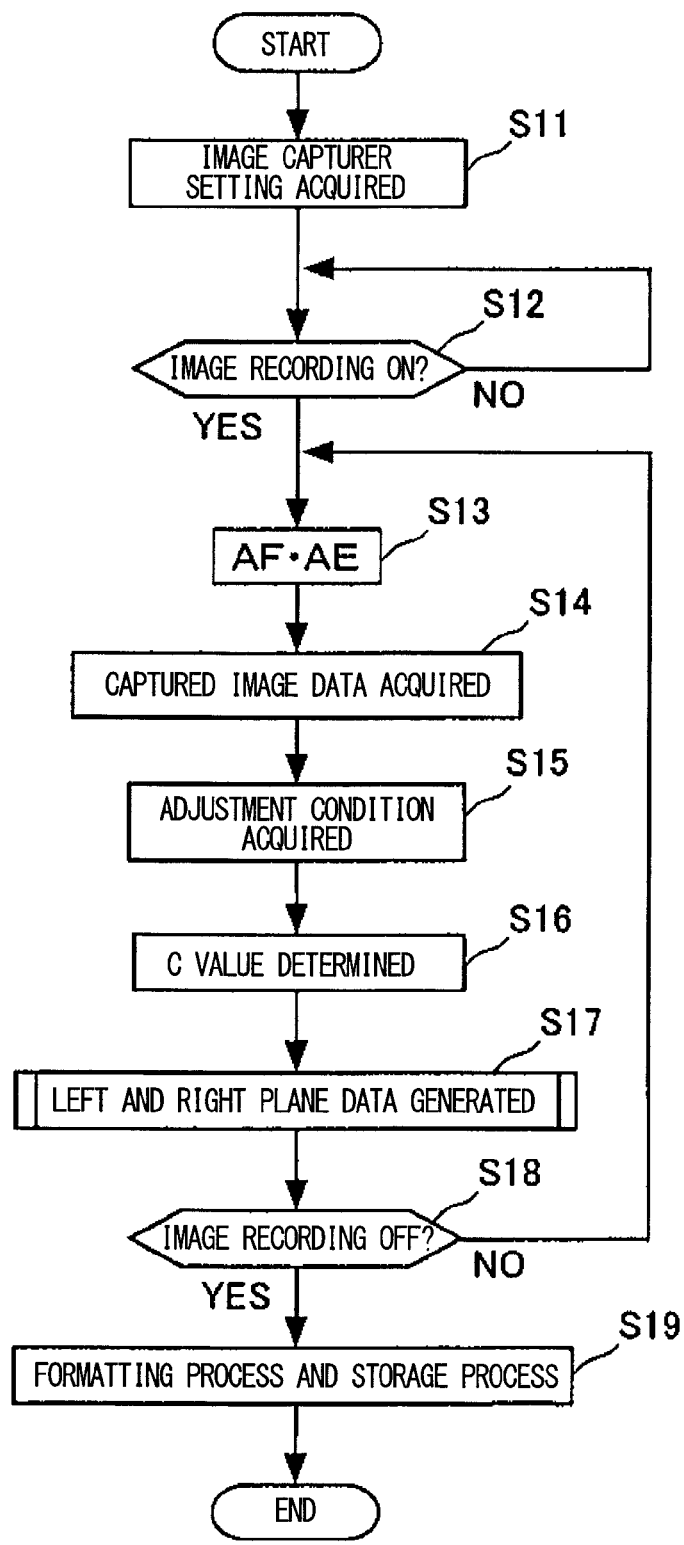
FIG. 13 is a process flow when capturing a moving image.

The following describes a series of process flows of the digital camera 10. FIG. 13 shows a process flow performed when capturing a moving image. The process flow in the drawing begins at the time when the mode button 2082 is manipulated by the image capturer to initiate the automatic 3D moving image mode. The parallax amount range is set earlier by the image capturer.

When the automatic 3D moving image mode begins, at step S11, the adjustment condition acquiring section 231 acquires the parallax amount range set by the image capturer from the system memory. If instructions other than the parallax amount range are received from the image capturer as adjustment conditions, these adjustment conditions are also acquired.

At step S12, the control section 201 waits for recording start instructions made by the image capturer pressing down the recording start button. When the recording start instructions are detected (YES in step S12), the control section 201 proceeds to step S13 and performs AF and AE. Then, at step S14, the control section 201 performs charge accumulation of the image capturing element 100 via the driving section 204 and performs reading, to acquire the captured image data of one frame. During this time, the control section 201 may continue driving the diaphragm 22 and driving the focus lens, according to the detection results of step S13.

At step S15, the adjustment condition acquiring section 231 acquires the adjustment conditions in conjunction with acquiring the captured image data of step S14. Depending on the type of adjustment conditions, this acquisition may be performed before step S14 or in parallel with step S14.

The process then proceeds to step S16, where the adjustment condition acquiring section 231 passes the acquired adjustment conditions to the adjustment value determining section 232 and the adjustment value determining section 232 references the look-up table, with the received adjustment conditions as arguments, to determine the stereo adjustment parameter C.

At step S17, the calculating section 233 receives the captured image data and the stereo adjustment parameter C determined by the adjustment value determining section 232, and generates the color image data of the left side viewpoint (the $RLt_c$ plane data, the $GLt_c$ plane data, and the $BLt_c$ plane data) and the color image data of the right side viewpoint (the $RRt_c$ plane data, the $GRt_c$ plane data, and the $BRt_c$ plane data). The details of this process are described further below.

At step S18, when it is determined that recording stop instructions have not been received from the image capturer, the control section 201 returns to step S13 and performs processing on the next frame. When it is determined that recording stop instructions have been received, the process moves to step S19.

At step S19, the moving image generating section 234 connects the continuously generated pieces of color image data for the left side viewpoint and color image data for the right side viewpoint, and performs a formatting process according to a 3D-compatible moving image format such as Blu-ray(registered trademark) 3D to generate the moving image file. The control section 201 then records the generated moving image file to the memory card 220 via the memory card IF 207, and this process flow is finished. The recording to the memory card 220 may be performed sequentially in synchronization with the generation of the color image data for the left side viewpoint and color image data for the right side viewpoint, and an end-of-file process may be performed in synchronization with the recording stop instructions. Furthermore, the control section 201 is not limited to recording on the memory card 220, and may be configured to output data to an external device via a LAN, for example.

Figure 14:
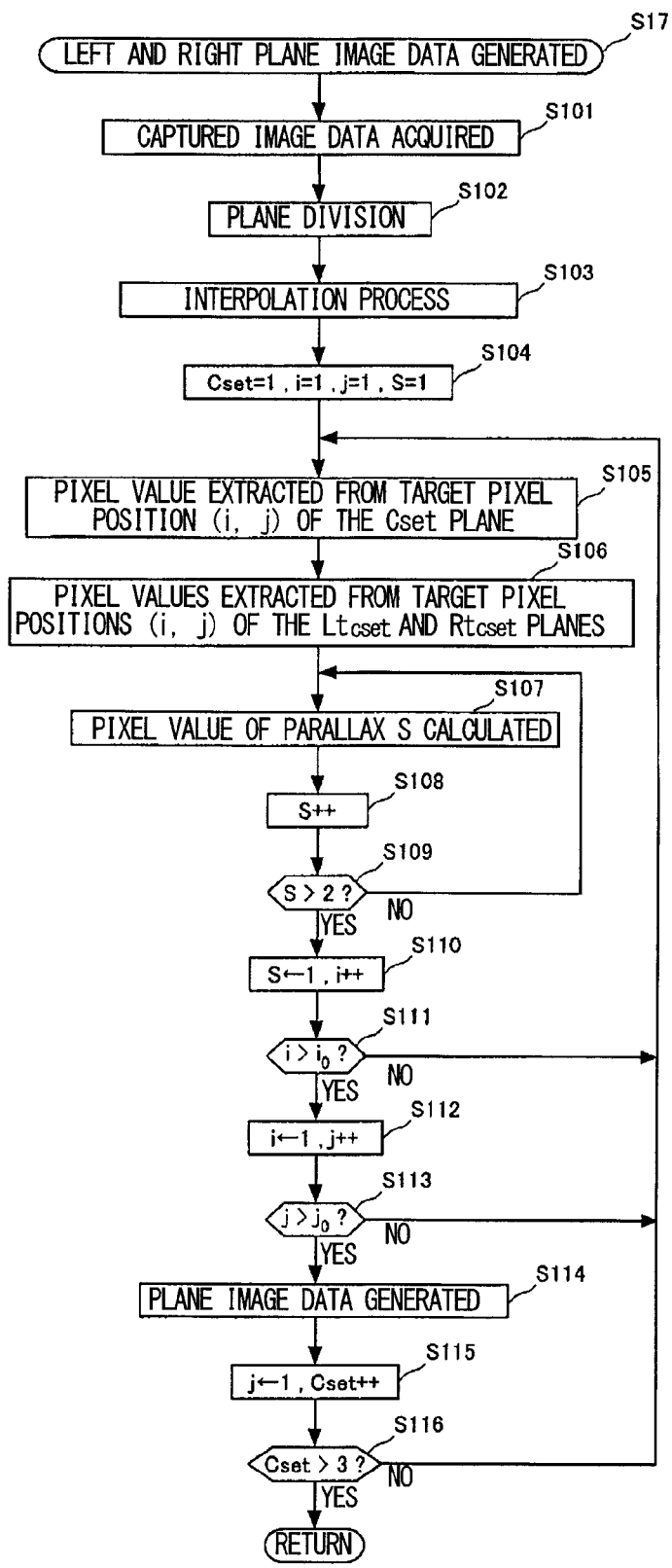
FIG. 14 is a process flow up to the generation of the parallax color image data.

The following provides a detailed description of the process performed at step S17 of FIG. 13. FIG. 14 shows the process flow of step S17, up to the point of generating the parallax color image data, which is the color image data of the left side viewpoint and the color image data of the right side viewpoint.

At step S101, the calculating section 233 acquires the captured image data. Then, at step S102, as described using FIG. 3, the captured image data is divided into planes of the non-parallax image data and the parallax image data. At step S103, as described using FIG. 3, the calculating section 233 performs the interpolation process to interpolate the empty pixels in each piece of plane data resulting from the division.

At step S104, the calculating section 233 initializes each of the variables. Specifically, first, the color variable Cset is set to 1. The color variable Cset is such that 1=red, 2=green, and 3=blue. Furthermore, the coordinate variables i and j are both set to 1. Yet further, the parallax variable S is set to 1. The parallax variable S is such that 1=left and 2=right.

At step S105, the calculating section 233 extracts the pixel value from the target pixel position (i, j) of the Cset plane. For example, when Cset=1 and the target pixel position is (1, 1), the extracted pixel value is $Rn_{11}$. Furthermore, at step S106, the calculating section 233 extracts the pixel values from the target pixel position (i, j) of the $Lt_{Cset}$ plane data and the $Rt_{Cset}$ plane data. For example, when the target pixel position is (1, 1), the extracted pixel values are $Lt_{Cset11}$ and $Rt_{Cset11}$.

At step S107, the calculating section calculates the pixel value for the target pixel position (i, j) corresponding to the parallax variable S. For example, when Cset=1, S=1, and the target pixel position is (1, 1), $RLt_{C11}$ is calculated. As a specific example, the calculation may be performed according to Expression 1 shown above. Here, the stereo adjustment parameter C is the value determined at step S16.

At step S108, the calculating section 233 increments the parallax variable S. Then, at step S109, it is determined whether the parallax variable S has exceeded 2. If the parallax variable S has not exceeded 2, the process returns to step S107. If the parallax variable S has exceeded 2, the process moves to step S110.

At step S110, the calculating section 233 sets the parallax variable S to 1 and increments the coordinate variable i. Then, at step S111, it is determined whether the coordinate variable i has exceeded $i_0$. If the coordinate variable i has not exceeded $i_0$, the process returns to step S105. If the coordinate variable i has exceeded $i_0$, the process moves to step S112.

At step S112, the calculating section 233 sets the coordinate variable i to 1 and increments the coordinate variable j. Then, at step S113, it is determined whether the coordinate variable j has exceeded $j_0$. If the coordinate variable j has not exceeded $j_0$, the process returns to step S105. If the coordinate variable j has exceeded $j_0$, the process moves to step S114.

Upon reaching step S114, all of the pixel values on the right and left for this Cset have been handled, and therefore the calculating section 233 arranges these pixel values to generate the plane image data. For example, when Cset=1, the $RLt_c$ plane data and $RRt_c$ plane data are generated.

The process moves to step S115, and the calculating section 233 sets the coordinate variable j to 1 and increments the color variable Cset. Then, at step S116, it is determined whether the color variable Cset exceeds 3. If the color variable Cset does not exceed 3, the process returns to step S105. If the color variable Cset exceeds 3, then all of the color image data of the left side viewpoint (the $RLt_c$ plane data, the $GLt_c$ plane data, and the $BLt_c$ plane data) and the color image data of the right side viewpoint (the $RRt_c$ plane data, the $GRt_c$ plane data, and the $BRt_c$ plane data) has been collected, and the flow returns to FIG. 13.

Figure 15:
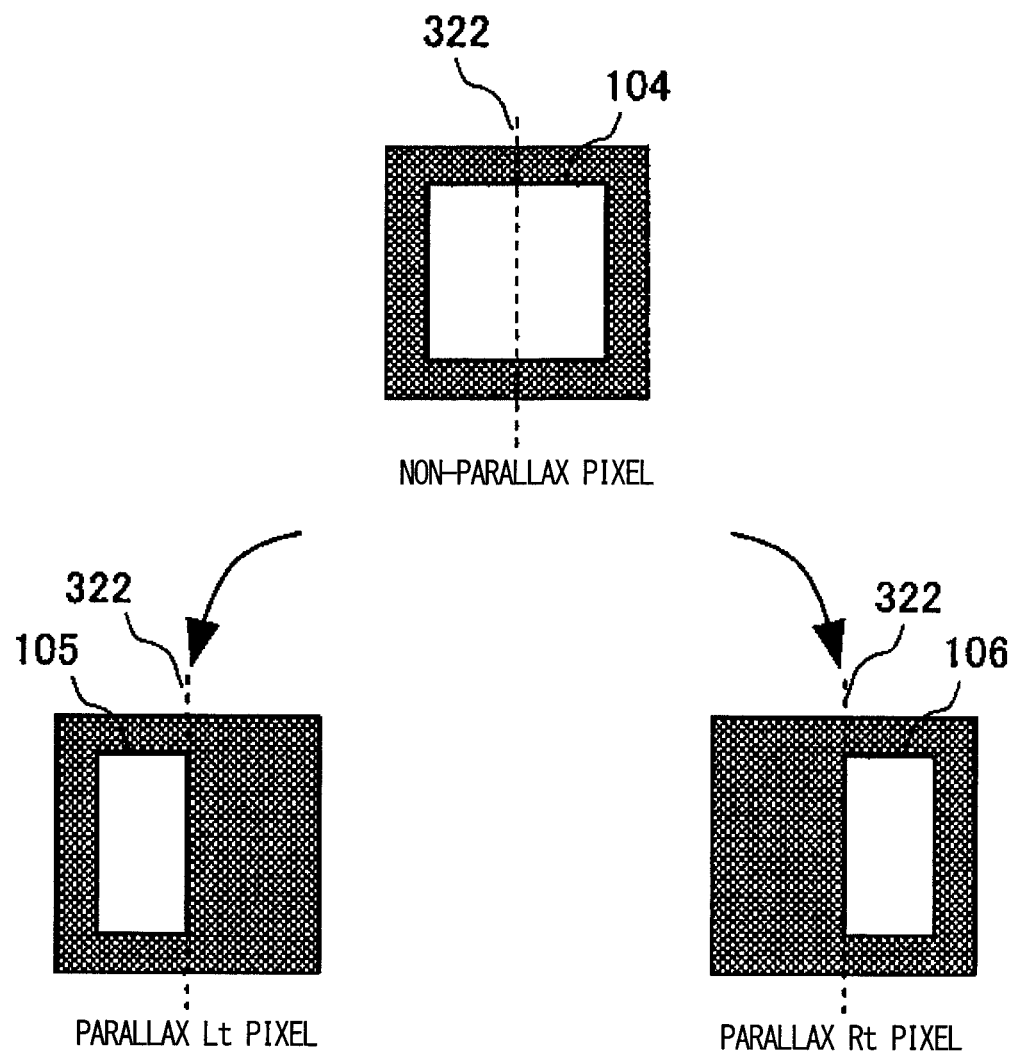
FIG. 15 is used to describe preferable aperture shapes.

The following describes desirable shapes for the apertures of the aperture mask described using FIG. 2. FIG. 15 shows desirable aperture shapes.

The aperture section 105 of the parallax Lt pixel and the aperture section 106 of the parallax Rt pixel are preferably shifted in opposite directions from each other and include the centers of the corresponding pixels. Specifically, the aperture section 105 and the aperture section 106 preferably each contact a virtual center line 322 that passes through the center of the pixel or straddles this center line 322.

In particular, as shown in the drawing, the shape of the aperture section 105 and the shape of the aperture section 106 are preferably respectively identical to a shape obtained by dividing the shape of the aperture section 104 of the non-parallax pixel along the center line 322. In other words, the shape of the aperture section 104 is preferably equivalent to a shape obtained by placing the shape of the aperture section 105 and the shape of the aperture section 106 adjacent to each other.

In the above description, the arithmetic expressions used by the calculating section 233 are Expressions 1 and 2, which use a weighted arithmetic mean, but the arithmetic expressions are not limited to this and various other expressions can be used. For example, when using a weighted geometric mean, Expressions 3 and 4 shown below and expressed in the same manner as Expressions 1 and 2 can be used.

Expression 3

$$RLt_{cmn} = Rn_{mn} \times \left(\frac{RLt_{mn}}{RRt_{mn}}\right)^{(C-0.5)} \quad (3)$$

Expression 4

$$RRt_{cmn} = Rn_{mn} \times \left(\frac{RRt_{mn}}{RLt_{mn}}\right)^{(C-0.5)} \quad (4)$$

In this case, the maintained blur amount is not the blur amount found in the output of the non-parallax pixels, but is instead the blur amount found in the output of the parallax pixels.

Furthermore, as other examples of arithmetic expressions, Expressions 5 and 6 shown below and expressed in the same manner as Expressions 1 and 2 can be used.

Expression 5

$$RLt_{cmn} = Rn_{mn} \times \sqrt[3]{2 \times \frac{C \times RLt_{mn} + (1-C) \times RRt_{mn}}{RLt_{mn} + RRt_{mn}}} \times \sqrt[3]{2 \times \frac{C \times GLt_{mn} + (1-C) \times GRt_{mn}}{GLt_{mn} + GRt_{mn}}} \times \sqrt[3]{2 \times \frac{C \times BLt_{mn} + (1-C) \times BRt_{mn}}{BLt_{mn} + BRt_{mn}}} \quad (5)$$

Expression 6

$$RRt_{cmn} = Rn_{mn} \times \sqrt[3]{2 \times \frac{(1-C) \times RLt_{mn} + C \times RRt_{mn}}{RLt_{mn} + RRt_{mn}}} \times \sqrt[3]{2 \times \frac{(1-C) \times GLt_{mn} + C \times GRt_{mn}}{GLt_{mn} + GRt_{mn}}} \times \sqrt[3]{2 \times \frac{(1-C) \times BLt_{mn} + C \times BRt_{mn}}{BLt_{mn} + BRt_{mn}}} \quad (6)$$

In this case, the terms of the cube root do not change when calculating each of $GLt_{cmn}$, $GRt_{cmn}$, $BLt_{cmn}$, and $BRt_{cmn}$.

Yet further, Expressions 7 and 8 may be adopted.

Expression 7

$$RLt_{cmn} = Rn_{mn} \times \left(\frac{RLt_{mn}}{RRt_{mn}}\right)^{\frac{(C-0.5)}{3}} \times \left(\frac{GLt_{mn}}{GRt_{mn}}\right)^{\frac{(C-0.5)}{3}} \times \left(\frac{BLt_{mn}}{BRt_{mn}}\right)^{\frac{(C-0.5)}{3}} \quad (7)$$

Expression 8

$$RLt_{cmn} = Rn_{mn} \times \left(\frac{RRt_{mn}}{RLt_{mn}}\right)^{\frac{(C-0.5)}{3}} \times \left(\frac{GRt_{mn}}{GLt_{mn}}\right)^{\frac{(C-0.5)}{3}} \times \left(\frac{BRt_{mn}}{BLt_{mn}}\right)^{\frac{(C-0.5)}{3}} \quad (8)$$

In this case as well, the terms of the cube root do not change when calculating each of $GLt_{cmn}$, $GRt_{cmn}$, $BLt_{cmn}$, and $BRt_{cmn}$.

Figure 16:
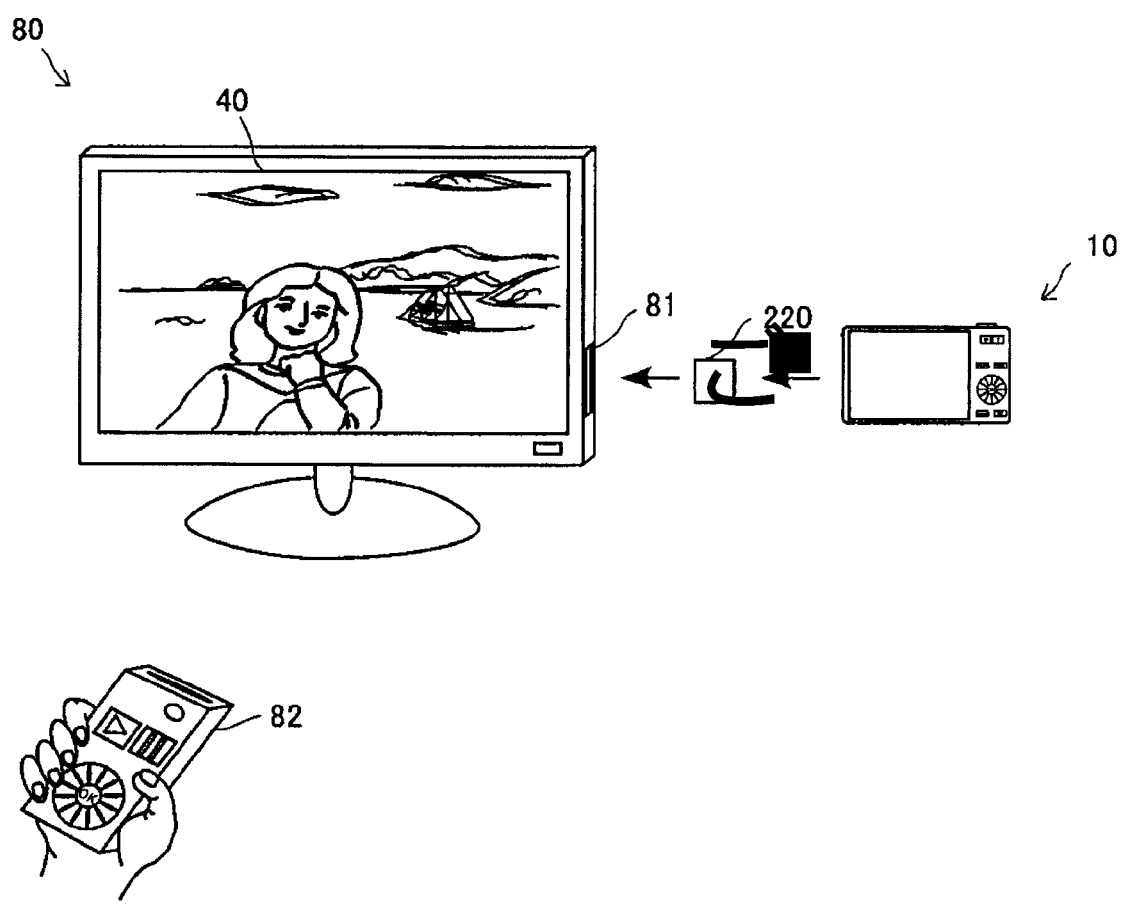
FIG. 16 is used to describe the connection between the digital camera and a TV monitor.

The following describes the connection with the display apparatus. FIG. 16 is used to describe the connection between the digital camera 10 and a TV monitor 80. The TV monitor 80 is formed by the display section 40 made from liquid crystal, a memory card IF 81 that receives the memory card 220 that is removed from the digital camera 10, and a remote control 82 that is manipulated by a hand of the user, for example. The TV monitor 80 is adapted to display a 3D image. The display format of the 3D image is not particularly limited. For example, the right eye image and the left eye image may be displayed at separate times, or an interlaced format may be used in which the right and left eye images are formed as thin vertical or horizontal stripes. As another example, the right and left eye images may be arranged in a side by side manner on one side and another side of the screen.

The TV monitor 80 decodes the moving image file formatted to include the color image data of the left side viewpoint and the color image data of the right side viewpoint, and displays the 3D image in the display section 40. In this case, the TV monitor 80 fulfills the functions of a general display apparatus that displays a standardized moving image file. However, the TV monitor 80 can also function as an image processing device that realizes at least a portion of the functions of the control section 201 described using FIG. 1 and at least a portion of the functions of the image processing device 205. Specifically, the adjustment condition acquiring section 231 described in FIG. 1 and the image processing device including the adjustment value determining section 232, the calculating section 233, and the moving image generating section 234 may be incorporated in the TV monitor 80. With this configuration, it is possible to realize functional roles other than the functional roles realized by the combination of the digital camera 10 of the present embodiment described above and the TV monitor 80. The following describes such a modification.

In the present modification, the process for generating the adjusted image data in which the parallax amount is adjusted according to the stereo adjustment parameter is handled on the TV monitor 80 side instead of on the digital camera 10 side. Accordingly, the digital camera 10 need not include the adjustment value determining section 232 and the calculating section 233 of the configuration shown in FIG. 1. Instead, the adjustment condition acquiring section 231 passes the acquired adjustment conditions to the moving image generating section 234, and the moving image generating section 234 associates the received adjustment conditions with the corresponding frame while creating the moving image file from the captured image data generated by the image processing device 205. This association may include recording tag information in the moving image file or generating an association file in which the adjustment conditions are recorded and recording link information to the associated file in the moving image file.

Figure 17:
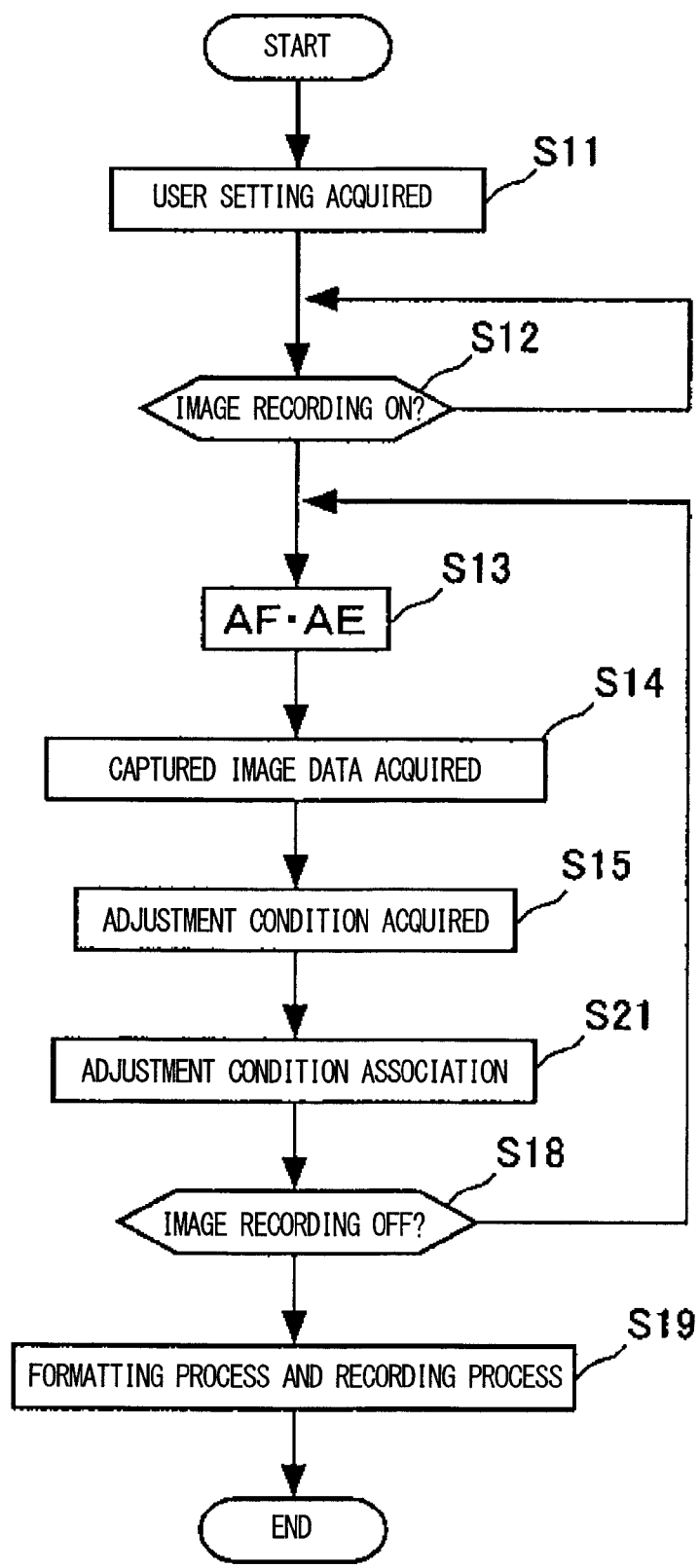
FIG. 17 shows a process flow performed when the digital camera captures a moving image according to the present modification.

The following describes a detailed operational process of the digital camera 10 according to the present modification. FIG. 17 shows a process flow performed when the digital camera 10 captures a moving image according to the present modification. Processes related to the processes shown in the process flow of FIG. 13 are given the same step numbers, such that different processes and additional processes are described while redundant descriptions are omitted.

At step S21, the adjustment condition acquiring section 231 passes the acquired adjustment conditions to the moving image generating section 234, and the moving image generating section 234 associates these adjustment conditions with the captured image data generated at step S14.

At step S19 the moving image file is created by connecting the pieces of captured image data that are continuously generated and are respectively associated with the adjustment conditions. The moving image file may be data at any one of the stages described using FIG. 3, as long as the moving image file includes the parallax image data of the left and right viewpoints and the reference image data as the captured image data of the continuous frames. In other words, the separation process, the interpolation process, and the plane data process may be performed at step S14 as processes of the digital camera 10, or some or all of these processes may be performed by the TV monitor 80 serving as the image processing device. The control section 201 outputs the generated moving image file to the memory card 220, and the series of processes is finished.

Figure 18:
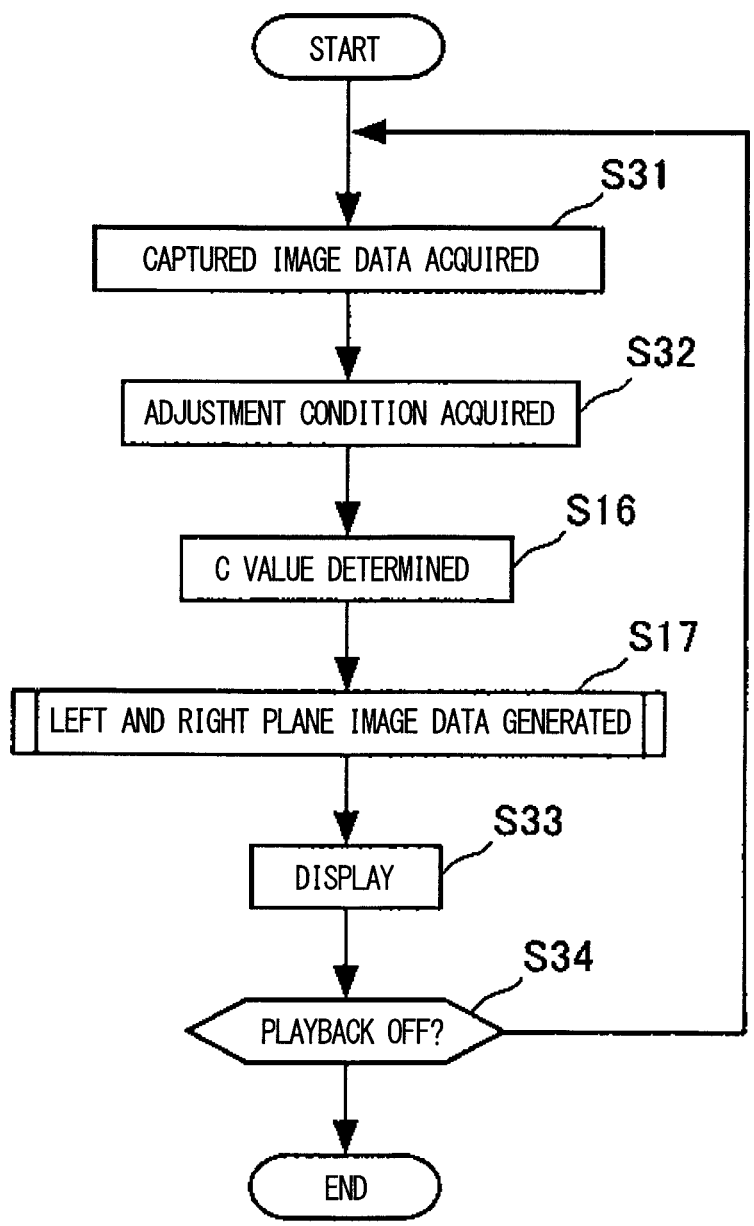
FIG. 18 shows a process flow for moving image playback by the TV monitor according to the present modification.

The following describes the processing operation of the TV monitor 80 in the present modification. FIG. 18 shows a process flow for moving image playback by the TV monitor 80 according to the present modification. Processes related to the processes shown in the process flow of FIG. 13 are given the same step numbers, such that different processes and additional processes are described while redundant descriptions are omitted. It should be noted that the TV monitor 80 includes the control section having the adjustment condition acquiring section 231 and the image processing device having the adjustment value determining section 232, the calculating section 233, and the moving image generating section 234. The control section corresponds to the control section 201 described using FIG. 1, and the image processing device corresponds to the image processing device 205 described using FIG. 1.

Upon detecting 3D image playback instructions, at step S31, the control section decodes the moving image file acquired via the memory card IF 81 and acquires each piece of plane data from the captured image data. Next, at step S32, the adjustment conditions associated with each piece of captured image data are read and acquired. The process for acquiring each piece of plane data at step S31 and the process for acquiring the adjustment conditions at step S32 may be performed one after the other or in parallel.

At step S16, the adjustment value determining section 232 determines the value of the stereo adjustment parameter C, and at step S17, the calculating section 233 and the moving image generating section 234 generate the left and right plane image data in which the parallax amount is adjusted.

The process moves to step S32, where the control section displays in the display section 40 the 3D image resulting from the generated left and right plane image data. Then, at step S34, the control section determines if playback stop instructions have been received from the viewer or if all of the image data to be played has been completed and, if neither of these is the case, returns to step S31 and begins the process to play the next frame. On the other hand, if playback stop instructions have been received from the viewer or if all of the image data to be played has been completed, the playback process is finished.

In the modification described above, all of the adjustment conditions are acquired by the digital camera 10 during the image capturing and associated with the captured image data, but the modification may be configured such that during playback on the TV monitor 80 the viewer can input a portion of the adjustment conditions. For example, the viewer can input the parallax amount range by manipulating the remote control 82. The adjustment condition acquiring section 231 of the TV monitor 80 acquires the input parallax amount range as an adjustment condition, and the adjustment value determining section 232 determines the value of the stereo adjustment parameter C according to this parallax amount range. With this configuration, the TV monitor 80 can display a 3D image according to the preferences of each viewer.

In the present embodiment described above, the adjustment conditions are associated with each piece of captured image data in frame units, but the association between the adjustment conditions and the captured image data is not limited to this. For example, one adjustment condition can be shared across a predetermined unit of time or by a unit of a plurality of frames. Furthermore, adjustment conditions man be shared among a plurality of pieces of captured image data while using, as a timing for changing the adjustment conditions, a timing at which the setting conditions of the optical system are changed or a timing at which the state of the subject changes, for example.

In the present embodiment described above, as described using FIGS. 12-A to 12-C, the parallax amount curve 1620 is adjusted such that the close subject and the far subject fall within the set parallax amount range, but the reference for adjusting the parallax amount is not limited to this. For example, a cumulative parallax amount may be calculated by integrating the parallax amounts of each of the pixels in the entire frame. If the cumulative parallax amount is positive, then the overall image will be projected forward, and therefore when the cumulative parallax amount is greater than a predetermined reference value, the adjusted parallax image data is generated by subtracting a parallax amount using the stereo adjustment parameter. If the cumulative parallax amount is negative, a process similar to that performed for a positive value may be performed or, since the negative value indicates a relatively small sense of unnaturalness, the parallax image data may be generated as-is without using the stereo adjustment parameter.

When performing evaluation based on the cumulative parallax amount in this manner, the image may be divided into a plurality of smaller regions and evaluation may be performed by calculating the cumulative value for each of these regions. By performing evaluation in this way, even if there is a region in which the parallax amount is particularly high, the parallax amount can be reduced.

Furthermore, the amount of change in the cumulative parallax amount can be used as a reference for evaluation. For example, the cumulative parallax amount changes suddenly when the captured scene changes, but if a reference value is provided in advance as an allowable amount of change, then the parallax amount can be decreased when the change exceeds this allowable change amount. In this case, a process may be performed to gradually increase the parallax amount until reaching a limit of the originally allowed parallax amount range.

In the present embodiment described above it is assumed that a moving image is being captured, but the configuration for outputting the parallax image data in which the parallax amount is adjusted based on the acquired adjustment conditions could obviously also be applied to still image capturing. A still image captured in this way does not cause an extreme parallax between the left and right images, and therefore does not cause a sense of unnaturalness in the viewer.

In the present embodiment described above, the TV monitor 80 is described as one example of an image processing device, but the image processing device can take on a variety of forms. For example, the image processing device may be a device that includes a display section or is connected to a display section, such as a PC, mobile telephone, or game device.

Each process flow of the present embodiment described above is performed according to a control program for controlling the control section. The control program is recorded in an internal nonvolatile memory and is expanded as needed in a work memory to perform each process. As another example, a control program recorded on a server is transmitted to each apparatus via a network and expanded in a work memory to perform each process. As yet another example, a control program recorded on a server is executed on the server and each apparatus performs the processes according to control signals transmitted thereto via a network.

The present embodiment a configuration in which the image capturing element 100 includes non-parallax pixels and the captured image data includes reference image data. However, a configuration may be used in which the image capturing element 100 does not include non-parallax pixels and thus the captured image data is formed from only the parallax image data. In this case, the adjusted parallax image data is generated from the parallax image data by subtracting a parallax amount using the stereo adjustment parameter. Furthermore, even when the image capturing element 100 includes non-parallax pixels, the adjusted parallax image data may be generated using only the parallax image data.

More specifically, the subject image of the right parallax image data has a first parallax in a first direction relative to a virtual subject image serving as a reference and the subject image of the left parallax image data has a second parallax in another direction that is opposite the first direction relative to the virtual subject image. In other words, the subject image of the right parallax image data and the subject image of the left parallax image data have a parallax therebetween equal to the sum of the first parallax and the second parallax. At this time, the image processing device generates, as the adjusted parallax image data, the right parallax image data adjusted to have a third parallax differing from the first parallax in one direction and the left parallax image data adjusted to have a fourth parallax differing from the second parallax in another direction, using the adjustment conditions.

Second Embodiment

A digital camera according to an embodiment of the present invention, which is an embodiment of an imaging apparatus, is configured in a manner to be able to generate an image of a single scene having a plurality of viewpoints, through a single occurrence of imaging. Each image having a different viewpoint from the other image is referred to as a parallax image. The present embodiment describes a particular example of generating a right parallax image and a left parallax image according to two viewpoints that correspond to a right eye and a left eye. The digital camera of the present invention can generate both a parallax image and a non-parallax image that has no parallax from a central viewpoint.

Figure 19:
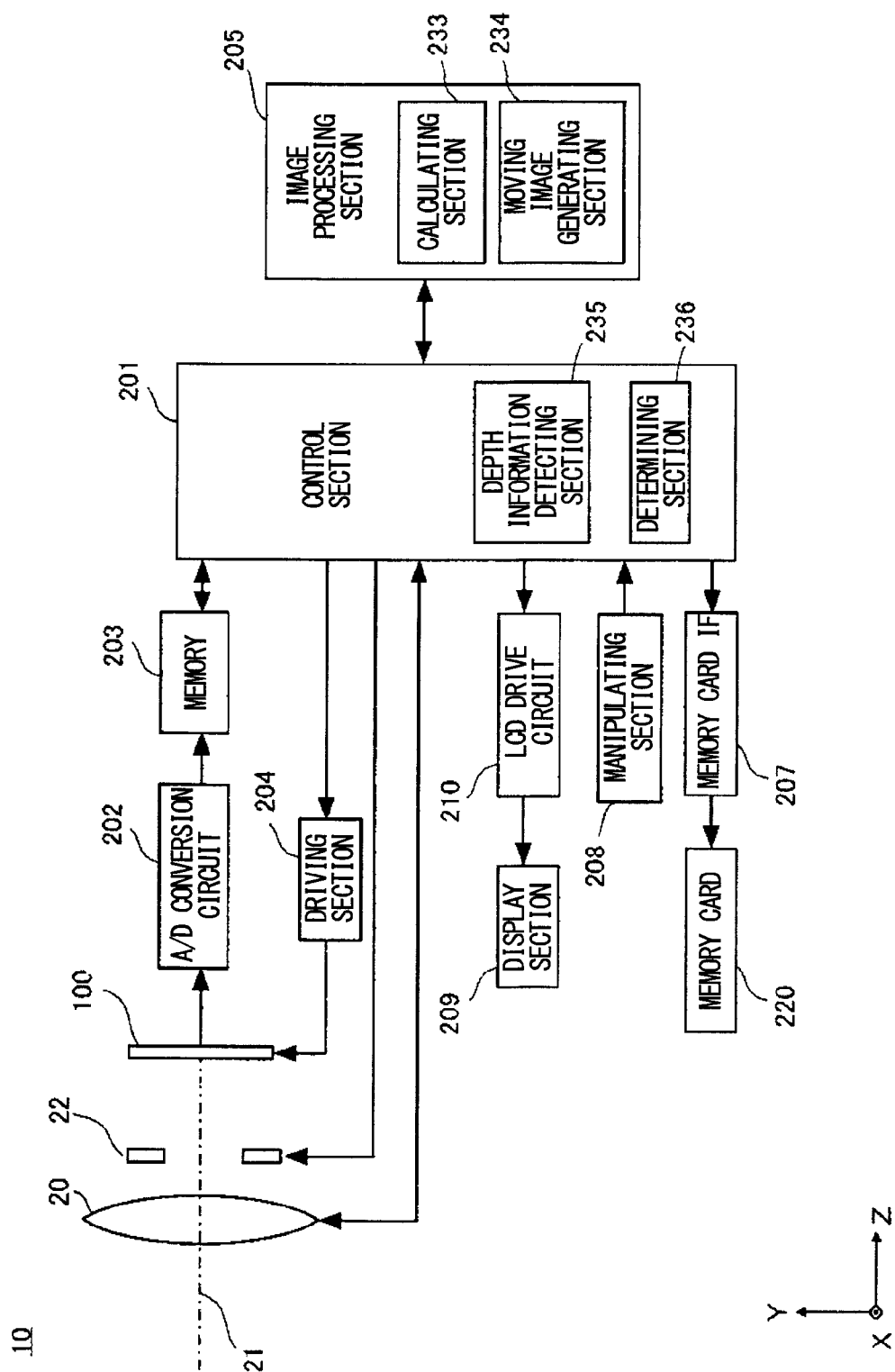
FIG. 19 shows a structure of the digital camera according to the present embodiment.

FIG. 19 shows a structure of the digital camera 10 according to the present embodiment. The digital camera 10 includes an imaging lens 20 serving as an imaging optical system, and guides subject light that is incident thereto along an optical axis 21 to the image capturing element 100. The imaging lens 20 may be an exchangeable lens that can be attached to and detached from the digital camera 10. The digital camera 10 includes an image capturing element 100, a control section 201, an A/D conversion circuit 202, a memory 203, a driving section 204, an image processing device 205, a memory card IF 207, a manipulating section 208, a display section 209, and an LCD drive circuit 210.

As shown in the drawing, a direction parallel to the optical axis 21 and pointing toward the image capturing element 100 is defined as the positive direction on the Z axis, a direction pointing toward the reader from the plane of the drawing in a plane orthogonal to the Z axis is defined as the positive direction on the X axis, and a direction pointing toward the top of the drawing in the plane orthogonal to the Z axis is defined as the positive direction on the Y axis. In several of the following drawings, the coordinate axes of FIG. 19 are used as the reference to display the orientation of each drawing.

The imaging lens 20 is formed from a plurality of optical lenses, and focuses subject light from a scene at a position near a focal plane. For ease of description, FIG. 19 shows a single virtual lens arranged near the pupil to represent the imaging lens 20. Furthermore, a diaphragm 22 that limits incident light is arranged near the pupil in a manner to be concentric around the optical axis 21.

The image capturing element 100 is arranged near the focal plane of the imaging lens 20. The image capturing element 100 is an image sensor such as a CCD or CMOS sensor, in which a plurality of photoelectric converting elements are arranged two-dimensionally. The image capturing element 100 experiences timing control from the driving section 204, to convert a subject image formed on a light receiving surface into an image signal and to output this image signal to the A/D conversion circuit 202.

The A/D conversion circuit 202 converts the image signal output by the image capturing element 100 into a digital image signal and outputs this digital image signal to the memory 203. The image processing device 205 applies various types of image processing with the memory 203 as a work space, to generate captured image data. The captured image data includes reference image data that is generated from the output of non-parallax pixels of the image capturing element 100 and parallax image data that is generated from the output of parallax pixels of the image capturing element 100, as described further below.

The control section 201 performs overall control of the digital camera 10. For example, the control section 201 adjusts the opening of the diaphragm 22 according to a set diaphragm value, and causes the imaging lens 20 to move back and forth in the direction of the optical axis according to an AF evaluation value. Furthermore, the control section 201 detects the position of the imaging lens 20 and is aware of the focus lens position and the focal distance of the imaging lens 20. Yet further, the control section 201 transmits a timing control signal to the driving section 204 and manages the imaging control up to the point when the image signal output from the image capturing element 100 is processed into the captured image data by the image processing device 205.

The control section 201 includes a depth information detecting section 235 and a determining section 236. The depth information detecting section 235 detects distribution of subjects in a depth direction in a scene. Specifically, the control section 201 uses defocus information that is used for the autofocus to detect the subject distribution from the defocus amount in each of a plurality of divided regions. The defocus information may utilize the output of a phase difference sensor provided especially for this purpose or the output of the parallax pixels of the image capturing element 100. When using the output of the parallax pixels, the parallax image data processed by the image processing device 205 can be used. As another example, instead of using the defocus information, the subject distribution can be detected by moving the focus lens back and forth and calculating the AF evaluation value based on the contrast AF method in each of the divided regions.

The determining section 236 determines a change condition relating to the parallax amount, based on the subject distribution detected by the depth information detecting section 235. A more detailed description is provided further below, but the determining section 236 determines the diaphragm value as an imaging condition, for example, such that the parallax amount between the output parallax images becomes a target parallax amount. In this case, the change condition relating to the parallax amount is a diaphragm value indicating the diaphragm 22 and how open it is.

As described above, the image processing device 205 generates the captured image data by processing the image signal output from the image capturing element 100. Furthermore, the image processing device 205 includes the calculating section 233 and the moving image generating section 234. When adjusting the parallax amount using the stereo adjustment parameter, which is described in detail further below, the calculating section 233 generates new parallax image data through image processing. The moving image generating section 234 connects the pieces of parallax image data to generate a 3D image file.

The image processing device 205 also fulfills general image processing functions, such as adjusting image data according to other selected image formats. The generated captured image data is converted into a display signal by the LCD drive circuit 210 and displayed in the display section 209. The generated captured image data is also recorded in the memory card 220 provided to the memory card IF 207.

The manipulating section 208 functions as a portion of a receiving section that is manipulated by a user to transfer instructions to the control section 201. The manipulating section 208 includes a plurality of manipulating sections, such as a shutter button that receives instructions to start image capturing.

The description of the second embodiment shares many points with the first embodiment. Specifically, the description of the second embodiment is the same as the description of the first embodiment from FIGS. 2 to 9. Accordingly, this redundant description is omitted, and only differing portions are described.

Figure 20:
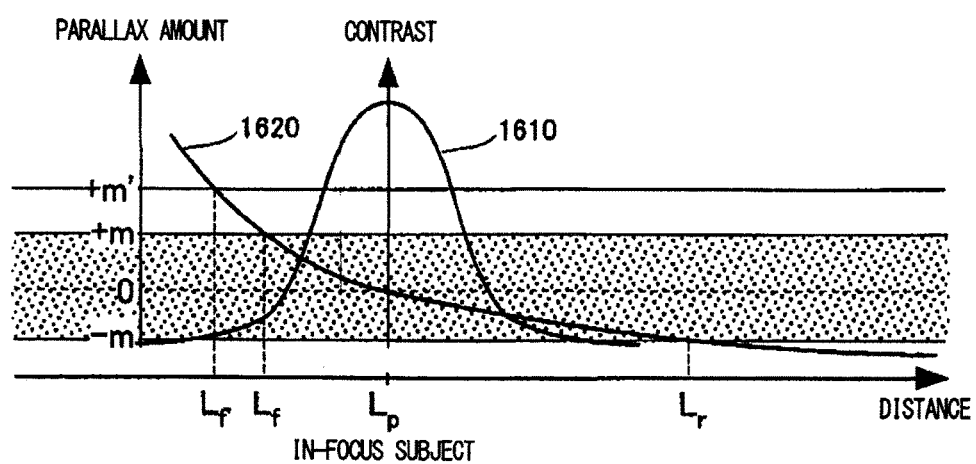
FIG. 20 schematically shows the relationship between the contrast indicating the image sharpness and the parallax amount.

FIG. 20 schematically shows the relationship between the contrast indicating the image sharpness and the parallax amount. The horizontal axis represents the distance from the digital camera 10 and the vertical axis represents the parallax amount and contrast height. The digital camera 10 aligns the focal point with the main subject positioned at a distance $L_p$.

The contrast curve 1610 is a convex curve that is at the highest at the distance $L_p$, which is the distance to the focal position. In other words, the image gradually blurs when moving away from the distance $L_p$ either forward or backward.

The parallax amount curve 1620 indicates a parallax amount of zero at the distance $L_p$, and has a curve in which the slope is greater when closer to the digital camera 10 from the distance $L_p$. In other words, the parallax amount curve 1620 exhibits a positive value when closer than the distance $L_p$, and indicates that closer subjects appear to be floating to a greater degree.

On the other hand, the parallax amount curve 1620 has a curve in which the slope is smaller when farther from the digital camera 10 than the distance $L_p$. In other words, the parallax amount curve 1620 exhibits a negative value when farther than the distance $L_p$, and indicates that farther subjects appear to be slowly sinking to a greater degree.

If the viewer does not experience a sense of unnaturalness or eye strain when the parallax amount is within a range from −m to +m, then the subjects forming the scene may be distributed between the distance $L_f$ (the parallax amount at this time being +m) and the distance $L_r$ (the parallax amount at this time being −m). In other words, if the subject closest to the digital camera 10 is located at the distance $L_f$ and the subject farthest from the digital camera 10 is located at the distance $L_r$, the viewer can comfortably view a 3D video without performing an adjustment of the parallax amount during the later image processing. On the other hand, if the close subject is located at a distance $L_f$ (the parallax amount at this time being +m') that is farther forward than the distance $L_f$, then the allowable parallax amount is exceeded and therefore the viewer experiences a sense of unnaturalness and eye strain.

Figure 21A:
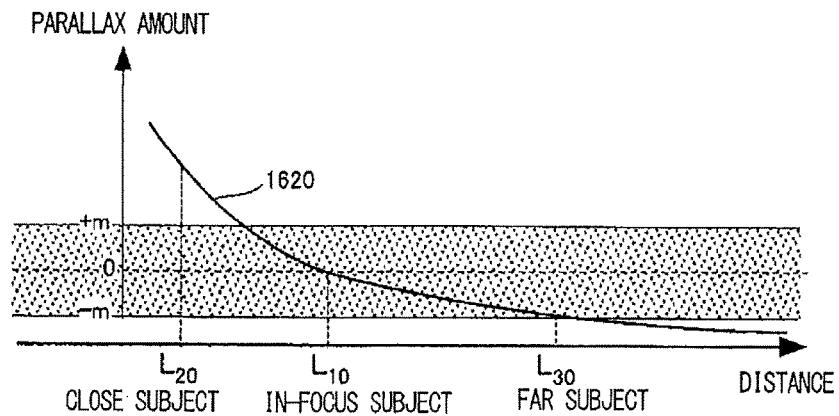
FIG. 21-A schematically shows the relationship between the subject distribution and the parallax amount.
Figure 21B:
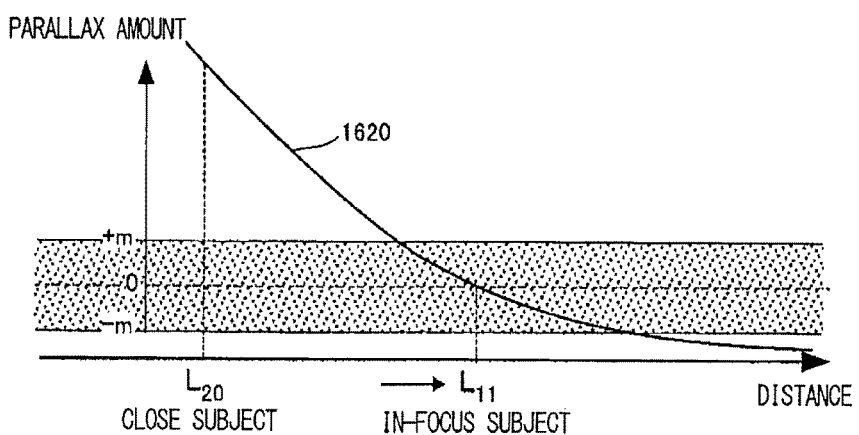
Figure 21C:
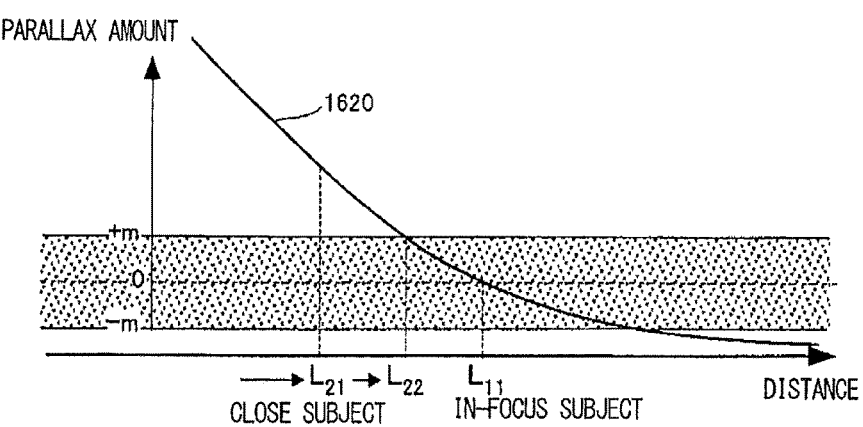

The following further describes the relationship between the subject distribution and the parallax amount. FIGS. 21-A to 21-C schematically show the relationship between the subject distribution and the parallax amount.

FIGS. 21-A to 21-C correspond to drawings obtained by removing the contrast curve 1610 from FIG. 20. Here, in addition to the in-focus subject serving as the main subject, which is the target image aligned with the focal point, it is assumed that there are also a close subject and a far subject. In FIG. 21-A the in-focus subject is at the distance $L_{10}$, the close subject is at the distance $L_{20}$, and the far subject is at the distance $L_{30}$.

When the parallax amount range is set from −m to +m as an adjustment condition, the value of the parallax amount curve 1620 at the distance $L_{30}$ where the far subject is located is within this parallax amount range. However, the value of the parallax amount curve 1620 at the distance $L_{20}$ where the close subject is located exceeds +m.

FIG. 21-B shows the basics of the parallax amount adjustment in a case where the in-focus subject is moved deeper from the distance $L_{10}$ to the distance $L_{11}$, from the subject state shown in FIG. 21-A. In this case, the focal position is at the distance $L_{11}$, and therefore the parallax amount for the image of the close subject at the distance $L_{20}$, which has not moved, becomes greater than in FIG. 21-A, as shown by the parallax amount curve 1620. In other words, the amount extending beyond the allowable range is increased.

FIG. 21-C shows the basics of the parallax amount adjustment in a case where the close subject is moved deeper from the distance $L_{20}$ to the distance $L_{21}$, and then farther to the distance $L_{22}$, from the subject state shown in FIG. 21-B. The focal position remains at the distance $L_{11}$, and therefore the parallax amount curve 1620 remains the same as in FIG. 21-B, but since the close subject has been shifted deeper, the parallax amount at the time when the close subject is at the distance $L_{21}$ extends beyond the allowable range, but the amount of this extension is less than the extension amount in FIG. 21-B. When the close subject moves farther to the distance $L_{22}$, the parallax amount falls within the allowable range.

In other words, the subject distribution in the depth direction for a scene and the position of the subject aligned with the focal point can be said to be parameters for determining whether the parallax amount is within the set allowable range.

Figure 22A:
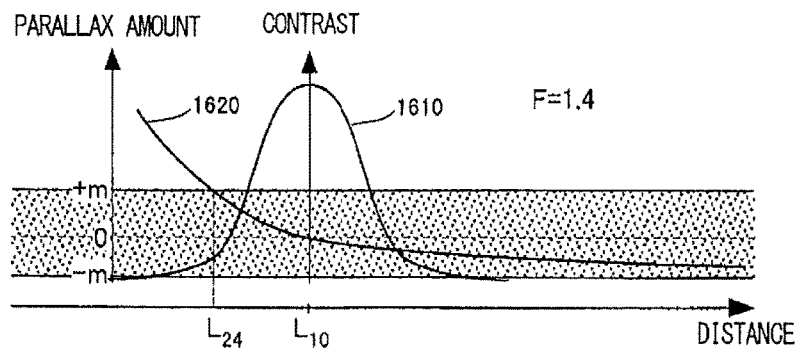
FIG. 22-A schematically shows the relationship between the diaphragm value and the parallax amount.
Figure 22B:
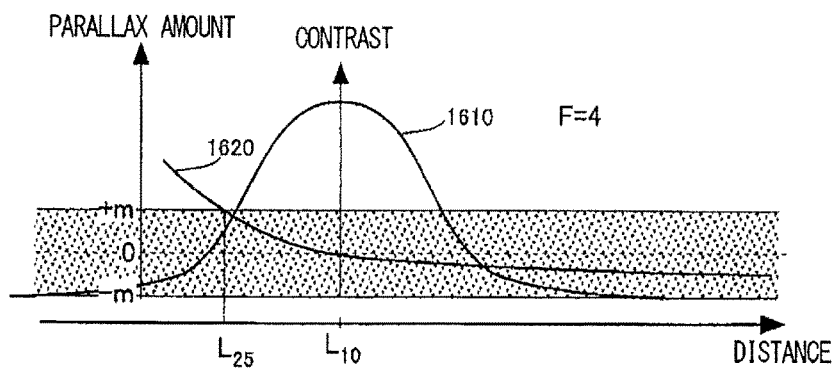
Figure 22C:
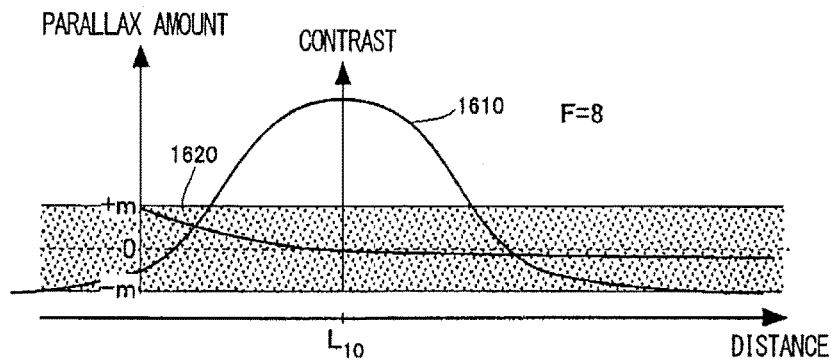

The following describes the relationship between the diaphragm value and the parallax amount. FIGS. 22A to 22C schematically show the relationship between the diaphragm value and the parallax amount. In the same manner as in FIG. 20, the horizontal axes represent the distance from the digital camera 10 and the vertical axes represent the parallax amount and contrast height. FIG. 22-A shows a state in which the diaphragm value is F1.4, FIG. 22-B shows a state in which the diaphragm value is F4, and FIG. 22-C shows a state in which the diaphragm value is F8. The focal distance of the imaging lens 20 is the same in each of these states, and the digital camera 10 aligns the focal point with the main subject positioned at a distance $L_{10}$.

The contrast curve 1610 is highest at the distance $L_{10}$, which is the distance to the focal position in each of the states. On the other hand, when the diaphragm 22 is further constricted, i.e. when the diaphragm value is greater, the contrast curve 1610 exhibits a relatively high value in front of and behind the focal distance. In other words, an image captured when the diaphragm 22 is in a constricted state has a greater depth of field. The parallax amount curve 1620 indicates a parallax amount of zero at the distance $L_{10}$, and has a curve in which the slope is greater when closer to the digital camera 10 from the distance $L_{10}$. On the other hand, the parallax amount curve 1620 has a curve in which the slope is smaller when farther from the digital camera 10 than the distance $L_{10}$.

Furthermore, the change in the parallax amount curve 1620 becomes more gradual when the diaphragm value becomes greater. In other words, compared to a case in which the diaphragm value is F1.4, the transition to F4 and F8 results in the parallax amount in front of the focal position and the parallax amount behind the focal position both becoming smaller. If the viewer does not experience a sense of unnaturalness or eye strain when the parallax amount is within a range from −m to +m, then the parallax amount curve 1620 is within this range if the diaphragm value is F8, and therefore the viewer can comfortably view 3D video no matter what distance the subject is at.

On the other hand, when the diaphragm value is F1.4 or F4, the parallax amount exceeds +m on the near-distance side of the parallax amount curve 1620. Specifically, in the case of F1.4, +m is exceeded in the region closer than the distance $L_{24}$, and in the case of F4, +m is exceeded in the region closer than the distance $L_{25}$. In this case, the slope of the parallax amount curve 1620 for F4 is less steep than the slope of the parallax amount curve 1620 for F1.4 and therefore the relationship of $L_{25} < L_{24}$ is established. With these diaphragm values, if a subject is closer than the distance $L_{24}$ or the distance $L_{25}$, then the viewer will experience a sense of unnaturalness and eye strain when viewing the captured 3D video.

Therefore, in the present embodiment, the imaging conditions that affect the parallax amount are changed or the stereo adjustment parameters used in the image processing are changed such that the parallax amount between the generated images becomes a target parallax amount that is within an allowable parallax amount range of ±m.

First, the changing of the imaging conditions will be described. As described using FIGS. 22-A to 22-C the diaphragm value affects the parallax amount, and therefore the diaphragm value may be changed according to the detected subject distribution, such that the parallax amount between output parallax images falls within an allowable parallax amount range. For example, in the state shown in FIG. 22-A where the initial diaphragm value is F1.4 and the in-focus subject is at the distance $L_{10}$, when the close subject is at the distance $L_{25}$, the parallax amount thereof exceeds +m. The determining section 236 changes the diaphragm value from F1.4 to F4, which is a diaphragm value at which the parallax amount for the subject at the distance $L_{25}$ is +m.

Changing of the diaphragm value to a larger value is not limited to a case in which the close subject extends beyond the allowable parallax amount range, and may also be performed in a case where the far subject extends beyond the allowable parallax amount range. In a case where the parallax amounts of both the close subject and the far subject have some leeway with respect to the allowable parallax amount, the diaphragm value may be changed to be smaller, i.e. the diaphragm 22 may be opened further. In this case, the shutter speed can be made faster and the ISO sensitivity can be lowered.

The relationship between the parallax amount curve 1620 and the in-focus subject distance for each diaphragm value is prepared in advance in a look-up table. If the subject distribution and allowable parallax amount are used as input values and the look-up table is referenced, the determining section 236 can extract and determine the diaphragm value to be changed to.

Figure 23:
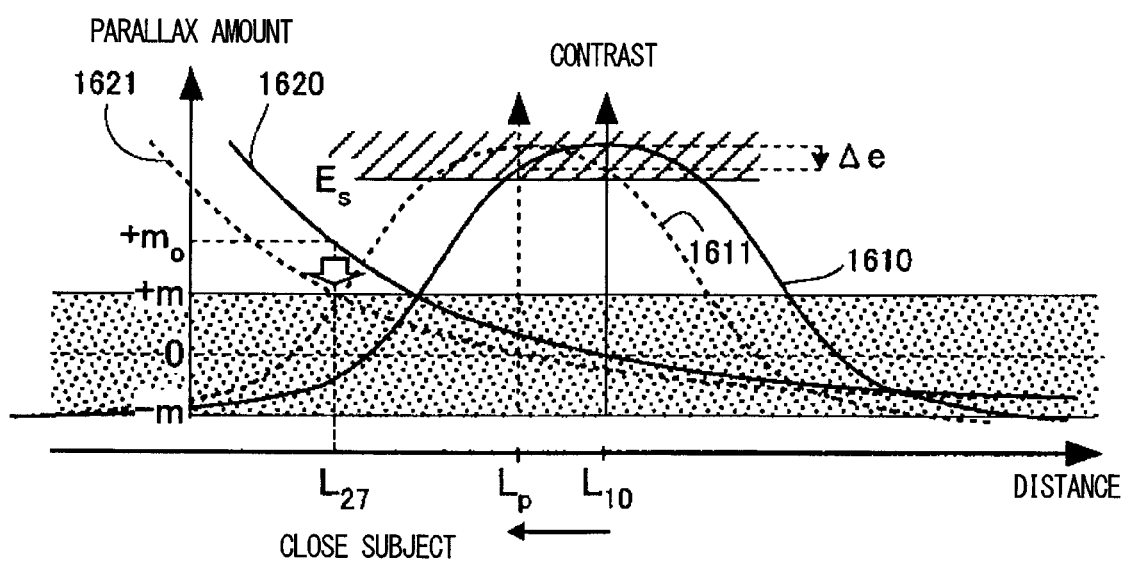
FIG. 23 schematically shows the basics of a focus shift.

In addition to changing the diaphragm value, the changing of the imaging conditions can include a focus shift technique for changing the focus position. FIG. 23 schematically shows the basics of a focus shift. The horizontal and vertical axes are the same as in FIG. 20.

The contrast curve 1610 and the parallax amount curve 1620 represent a contrast curve and a parallax amount curve occurring when the in-focus subject is at the distance $L_{10}$ and the focus lens is moved to align the focal point with the subject. In this case, the peak value of the contrast curve 1610 exceeds a focus threshold value $E_s$ for evaluating the focus.

When the close subject is positioned at the distance $L_{27}$, the parallax amount thereof is +$m_0$ according to the parallax amount curve 1620, which exceeds the allowable parallax amount of +m. Therefore, with the focus shift, the focus lens position is corrected in a range beyond the focus threshold value $E_s$, such that the parallax amount at the distance $L_{27}$ falls within the allowable range.

In the example shown in the drawing, the parallax amount curve 1621 is selected that causes the parallax amount for the close subject to be +m, and the distance $L_p$ at which the parallax amount is zero in this parallax amount curve 1621 is extracted. The focus lens position is then changed such that the focal position is at the distance $L_p$. The contrast curve 1611 is the contrast curve occurring at this time. Since the subject is actually at the distance $L_{10}$, the contrast value for this subject decreases by $\Delta e$, as shown in the drawing. The contrast value at this time need only exceed the focus threshold value $E_s$. The image captured after changing the focus lens position in this manner has a slightly decreased contrast value for the main subject, but the image thereof can still be evaluated as being in focus and the parallax amount for the close subject is within the allowable range.

If the contrast value for the distance $L_p$ does not exceed the focus threshold value $E_s$, then the focus lens position correction is not allowed. In other words, if the parallax amount for the close subject in the parallax amount curve 1620 significantly exceeds the allowable parallax amount, then this parallax amount cannot be made to be within the allowable range even when the focus lens position is changed within a range exceeding the focus threshold value $E_s$. In such a case, another technique may also be used in conjunction with the above technique, such as changing the diaphragm value to be a larger value.

When performing the parallax amount adjustment using the focus shift as well, a look-up table may be prepared in advance and used to indicate the relationship between the parallax amount curve and the in-focus subject distance for each diaphragm value. If the subject distribution and the allowable parallax amount are used as input values and the look-up table is referenced, the determining section 236 can extract and determine the distance $L_p$. The control section 201 changes the focus lens position according to the distance $L_p$. The control section 201 determines whether the contrast value obtained as the result of this change exceeds the focus threshold value $E_s$. If the contrast value is determined to exceed the focus threshold value $E_s$, the imaging sequence continues without alteration. If the contrast value is determined to not exceed the focus threshold value $E_s$, the focus lens is returned to the original position and the process transitions to another type of control, such as employing another technique in conjunction with the focus shift. As another option, the determining section 236 may calculate the amount of the decrease in the contrast when the focal position is moved from $L_{10}$ to $L_p$ without having the control section 201 actually move the focus lens, and the control section 201 may determine whether the resulting contrast exceeds the focus threshold value $E_s$. In this case, if a contrast AF method is used, for example, the actual evaluation value acquired previously when the focus adjustment was made for the distance $L_{10}$ can be referenced.

Figure 24A:
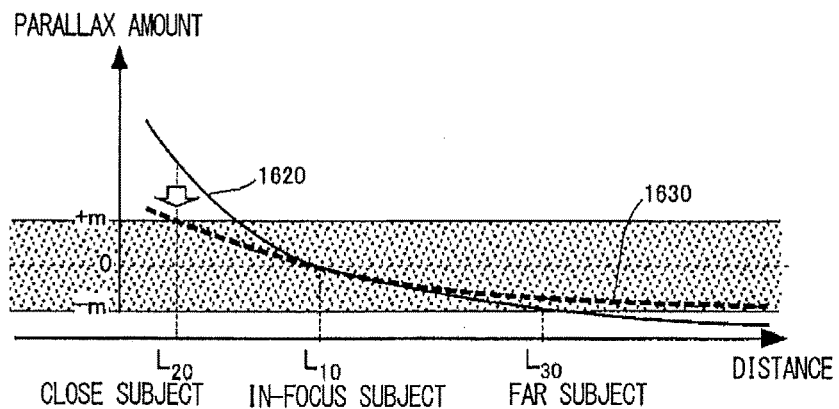
FIG. 24-A shows the basics of a parallax amount adjustment using a stereo adjustment parameter.
Figure 24B:
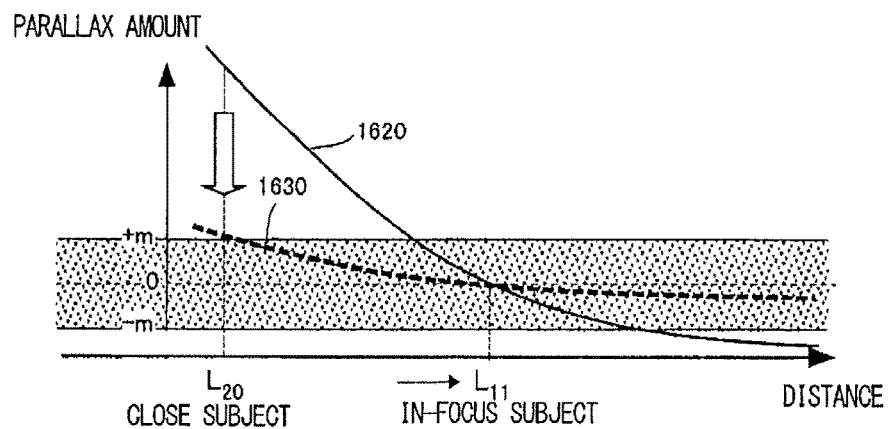
Figure 24C:
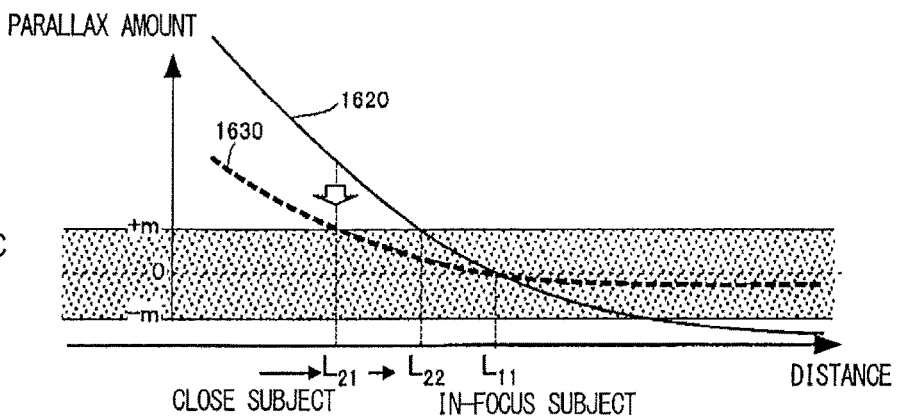

The following describes the change of a stereo adjustment parameter. FIGS. 24-A to 24-C show the basics of a parallax amount adjustment using a stereo adjustment parameter. FIGS. 24-A to 24-C correspond respectively to FIGS. 21-A to 21-C.

When the parallax amount range set in FIG. 24-A is from −m to +m, the value of the parallax amount curve 1620 at the distance $L_{30}$ where the far subject is located is within this parallax amount range, and therefore there is no need to adjust the parallax amount relating to the far subject side. However, the value of the parallax amount curve 1620 at the distance $L_{20}$ where the close subject is located exceeds the parallax amount +m, and therefore the overall parallax amount is adjusted.

In other words, the parallax curve is adjusted such that the parallax amount of the image of the close subject and the parallax amount of the image of the far subject are both within the set parallax amount range. More specifically, the parallax amount curve should be adjusted such that the parallax amount of the subject image that extends furthest beyond the set parallax amount range becomes a limit value of this parallax amount range. In FIG. 24-A, the adjusted parallax amount curve 1630 is the result of the parallax amount curve adjusted in this manner. With this type of adjustment, the images of all subjects forming the same scene are within the set parallax amount range.

In FIG. 24-B as well, in the same manner as in FIG. 24-A, the overall parallax amount is adjusted such that the image of the close subject has a parallax amount of +m. However, the adjustment amount is greater than the adjustment amount used in FIG. 24-A. As a result, the slope of the adjusted parallax amount curve 1630 becomes closer to horizontal, and therefore the parallax amount on the far subject side is further restricted.

In the case of FIG. 24-C, the focal position remains at the distance $L_{11}$, and therefore the parallax amount curve 1620 remains the same as in FIG. 24-B, but since the close subject has been shifted from the distance $L_{20}$ to the distance $L_{21}$, the adjustment amount is less than the adjustment amount in FIG. 24-B. When the close subject moves farther from $L_{21}$ to $L_{22}$, the parallax amount falls within the set parallax amount range without performing an adjustment.

In the manner described above, the adjustment amount for the parallax amount curve 1620 is uniquely determined if the subject distribution in the depth direction within a scene and the position of a subject being focused on can be acquired. The adjustment amount has a one-to-one relationship with the stereo adjustment parameter C, and therefore the determining section 236 can determine the value of the stereo adjustment parameter C if the adjustment conditions are received from the depth information detecting section 235 or the like. Specifically, a look-up table corresponding to FIGS. 24-A to 24-C is prepared in advance, and when each value for the adjustment conditions is set as an input value and the look-up table is referenced, the determining section 236 can extract and determine the value of the stereo adjustment parameter C for this input. The look-up table is constructed using the results of actual experimentation or a simulation performed in advance, for example. As another example, instead of using a look-up table format, a multivariable function in which each value of the adjustment conditions serves as a variable may be prepared in advance.

Figure 25:
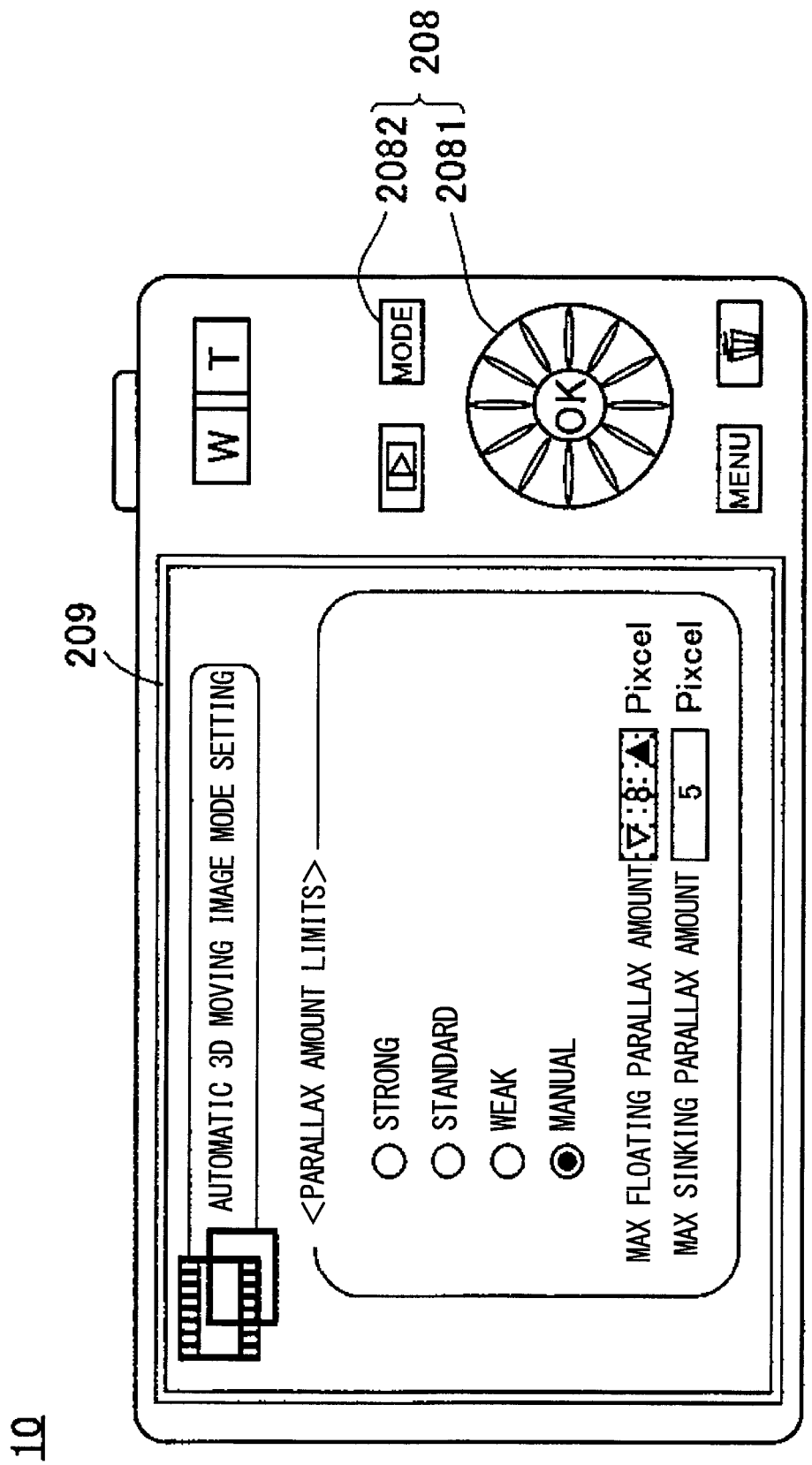
FIG. 25 is a back side view of the digital camera displaying a menu screen for limiting the parallax amount range.

The following describes setting the parallax amount range as the allowable parallax amount range. FIG. 25 is a back side view of the digital camera displaying a menu screen for limiting the parallax amount range.

The parallax amount limitations are set as a minimum value −m and a maximum value +m, as described above. The minimum value and the maximum value may have different absolute values. Here, the parallax amount is represented in pixel units of the parallax image in the adjusted parallax image data.

The parallax amount at which a viewer experiences a sense of unnaturalness and eye strain differs for each viewer. Accordingly, the digital camera 10 is preferably configured such that the settings for the parallax amount limitations can be changed by the image capturer, who is the user of the digital camera 10, during image capturing.

The digital camera 10 is provided with four selections such as shown in the drawing, for example, as the parallax amount range limitation menu. Specifically, these four options include "standard," where a range in which a viewer can usually view images comfortably is preset, "strong," where a range that is wider than the standard range is preset to allow for a greater parallax amount, "weak," where a range that is narrower than the standard range is preset to allow for only a small parallax amount, and "manual," where the image capturer inputs numerical values for the minimum value and maximum value. When "manual" is selected, the image capturer can sequentially set, in pixel units, the "maximum floating amount" as the maximum value and the "maximum sinking amount" as the minimum value. By manipulating the dial button 2081, which is a portion of the manipulating section 208, the image capturer can designate one of these selections.

The digital camera 10 of the present embodiment has, as one type of moving image capturing mode, an automatic 3D moving image mode to continuously generate parallax image data adjusted to have a comfortable parallax amount and connect these pieces of data to generate a moving image file. Prior to image capturing, the image capturer selects this automatic 3D moving image mode by manipulating the mode button 2082, which is a portion of the manipulating section 208.

Figure 26A:
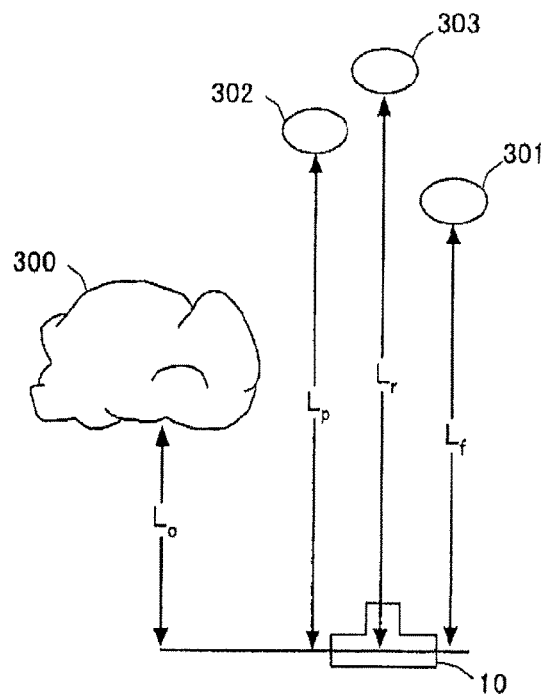
FIG. 26-A is used to describe subject designation.
Figure 26B:
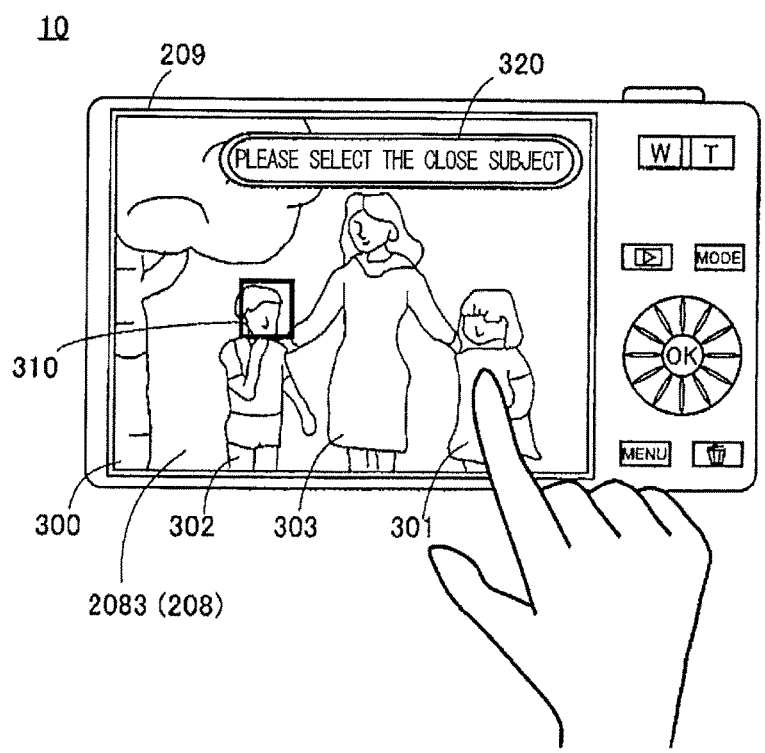

FIGS. 26-A and 26-B are used to describe subject designation. In particular, FIG. 26-A shows a subject distribution in the depth direction from the digital camera 10 in a certain scene and FIG. 26-B is a back side view of the digital camera 10 displaying a live view of this scene.

As shown in FIG. 26-A, the scene is formed by a tree 300 (distance $L_o$), a girl 301 (distance $L_f$), a boy 302 (distance $L_p$), and a woman 303 (distance $L_T$), in the stated order beginning with the closest to the digital camera 10.

As shown in FIG. 26-B, the live view image of this scene is displayed in the display section 209. Here, the boy 302 is the in-focus subject. The AF frame 310, which indicates that the boy 302 is in a focused state, is displayed overlapping the image of the boy 302.

In the description up to this point, the closest subject to the digital camera 10 has been the close subject. However, the subjects forming a scene are sometimes distributed continuously in the depth direction. Furthermore, there are also subjects that are relatively small in the scene and subjects that are not very important in the scene. Accordingly, it is not necessary for the closest subject in the scene to be treated as the close subject. For example, in the scene of FIG. 26-A, the three people are the major subjects and it is assumed that the viewer will pay attention to these three people during viewing. Accordingly, the subject images that are to undergo a parallax amount adjustment are the images of these three people, and the other subject images may be ignored. Therefore, the control section 201 receives instructions from the image capturer concerning which subjects are to undergo the parallax amount adjustment.

The display section 209 displays a title 320, e.g. "please select the close subject," indicating a state for receiving user instructions. In this state, the user touches the subject image that is to be the close subject, e.g. the girl 301 in the drawing. The display section 209 is provided with an overlapping touch panel 2083 as a portion of the manipulating section 208, and the control section 201 acquires the output of the touch panel 2083 and determines which of the subjects is the close subject. In this case, a subject (the tree 300 in the drawing) that is in front of the designated subject is excluded from the detection targets of the subject distribution. These instructions are not limited to the close subject, and the same type of instructions may be received for the far subject.

The depth information detecting section 235 sets the subjects designated by these user instructions (the subjects from the close subject to the far subject) as detection targets of the subject distribution. In a case of capturing a moving image or performing continuous image capturing, when continuously generating the captured image data, the subjects designated at the start of the image capturing are tracked by subject tracking, and the distances $L_f$, $L_p$, and $L_r$ changing over time may be acquired.

The following describes the process flow for the moving image capturing of the digital camera 10. As described above, in order to set the parallax amount between the generated images to be within an allowable parallax amount range, there are cases where the imaging conditions affecting the parallax amount are changed and cases where the stereo adjustment parameters used in the image processing are changed. Both of these methods can be combined, but in the following embodiment examples, these processes are described separately.

First Embodiment Example

Figure 27:
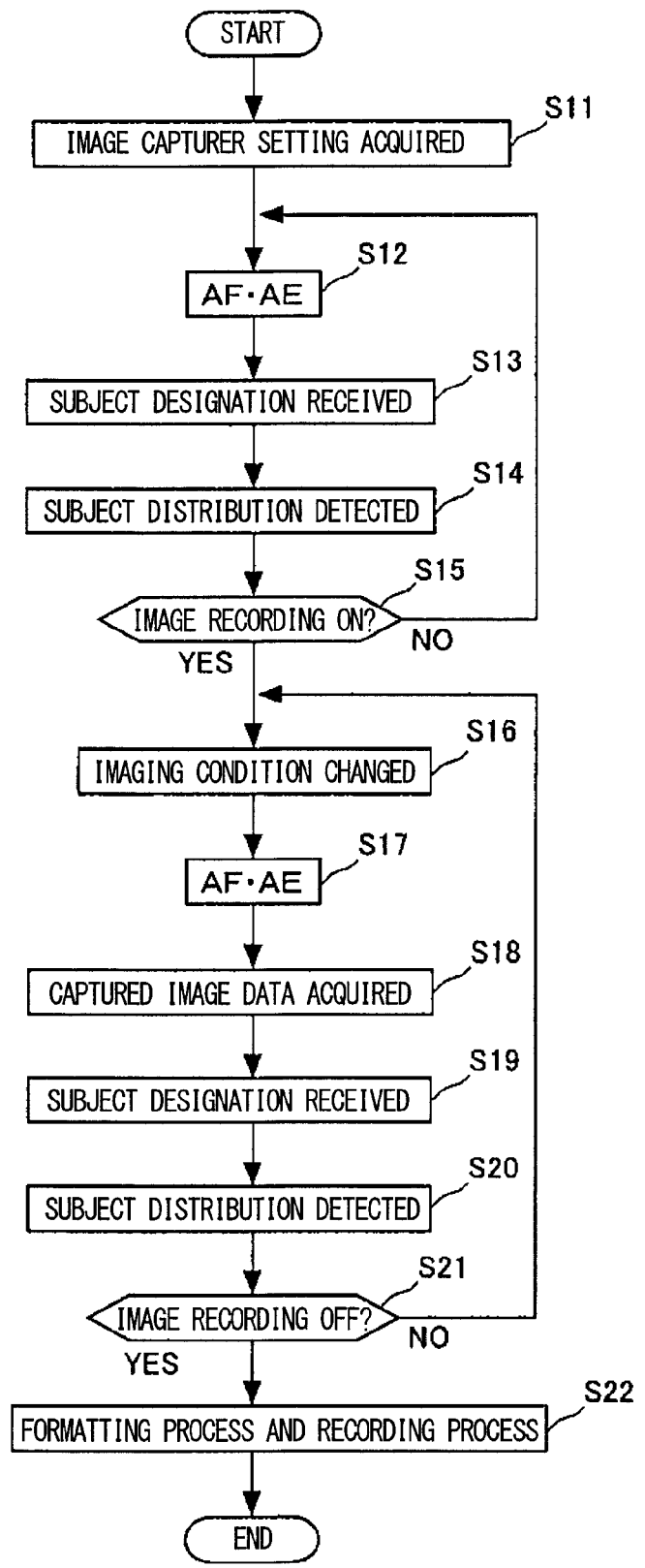
FIG. 27 shows the process flow during the moving image capturing according to the first embodiment example.

As a first embodiment example, a process flow for moving image capturing that involves changing the imaging conditions affecting the parallax amount is described. FIG. 27 shows the process flow during the moving image capturing according to the first embodiment example. The flow in this drawing begins at the point in time when image capturer manipulates the mode button 2082 to initiate the automatic 3D moving image mode. The parallax amount range is set in advance by the image capturer.

When the automatic 3D moving image mode begins, at step S11, the determining section 236 acquires the parallax amount range set by the image capturer from the system memory. At step S12, the control section 201 performs AF and AE. The process then proceeds to step S13 where, as described using FIGS. 26-A and 26-B, for example, the control section 201 receives from the user the designation of target subjects via the touch panel 2083. The process proceeds to step S14, where the depth information detecting section 235 detects the subject distribution in the depth direction from the phase difference information detected during the AF operation of step S12, for example, for the subjects designated at step S13.

At step S15, the control section 201 waits for recording start instructions made by the image capturer pressing down the recording start button. When the recording start instructions are detected (YES in step S15), the control section 201 proceeds to step 16. If instructions are not detected the process returns to step S12. After returning to step S12, tracking of the designated subjects is performed and the processes of steps S13 and S14 may be skipped.

At step S16, the determining section 236 changes the imaging conditions. Specifically, the diaphragm value is changed as described using FIGS. 22-A to 22-C or the focus lens position is changed as described using FIG. 23. As another example, the imaging conditions affecting the parallax amount may be changed such that the parallax amount is within the set parallax amount range. For example, if the imaging lens 20 is a zoom lens, the focal distance can be changed.

The process moves to step S17, where the control section 201 again performs AF and AE according to the changed imaging conditions. At step S18, the control section 201 performs charge accumulation of the image capturing element 100 via the driving section 204 and performs reading, to acquire the captured image data of one frame. The parallax amount between the parallax images in the captured image data acquired here fall within the set parallax amount range.

At step S19, in consideration of a case where the image capturer desires to change the target subjects during the moving image capturing, the control section 201 receives from the user a designation of the target subjects. The process moves to step S20, where the depth information detecting section 235 detects the subject distribution in the depth direction. The process of step S19 may be skipped. In this case, the subject designation of step S13 remains unaltered, and therefore the process of step S20 can be said to be a process that realizes the subject tracking of the target subjects according to the AF and AE processes of step S17.

At step S21, if it is determined that recording stop instructions have not been received from the image capturer, the control section 201 returns to step S16 and processes the next frame. If it is determined that recording stop instructions have been received, the process moves to step S22.

At step S22, the moving image generating section 234 connects the continuously generated pieces of color image data for the left side viewpoint and color image data for the right side viewpoint, and performs a formatting process according to a 3D-compatible moving image format such as Blu-ray(registered trademark) 3D to generate the moving image file. The control section 201 then records the generated moving image file to the memory card 220 via the memory card IF 207, and this process flow is finished. The recording to the memory card 220 may be performed sequentially in synchronization with the generation of the color image data for the left side viewpoint and color image data for the right side viewpoint, and an end-of-file process may be performed in synchronization with the recording stop instructions. Furthermore, the control section 201 is not limited to recording on the memory card 220, and may be configured to output data to an external device via a LAN, for example.

The moving image generating section 234 may cause the calculating section 233 to perform image processing with a value of 1 for the stereo adjustment parameter C in Expressions 1 and 2 described above, to generate high definition color image data for the left side viewpoint and color image data for the right side viewpoint.

Second Embodiment Example

Figure 28:
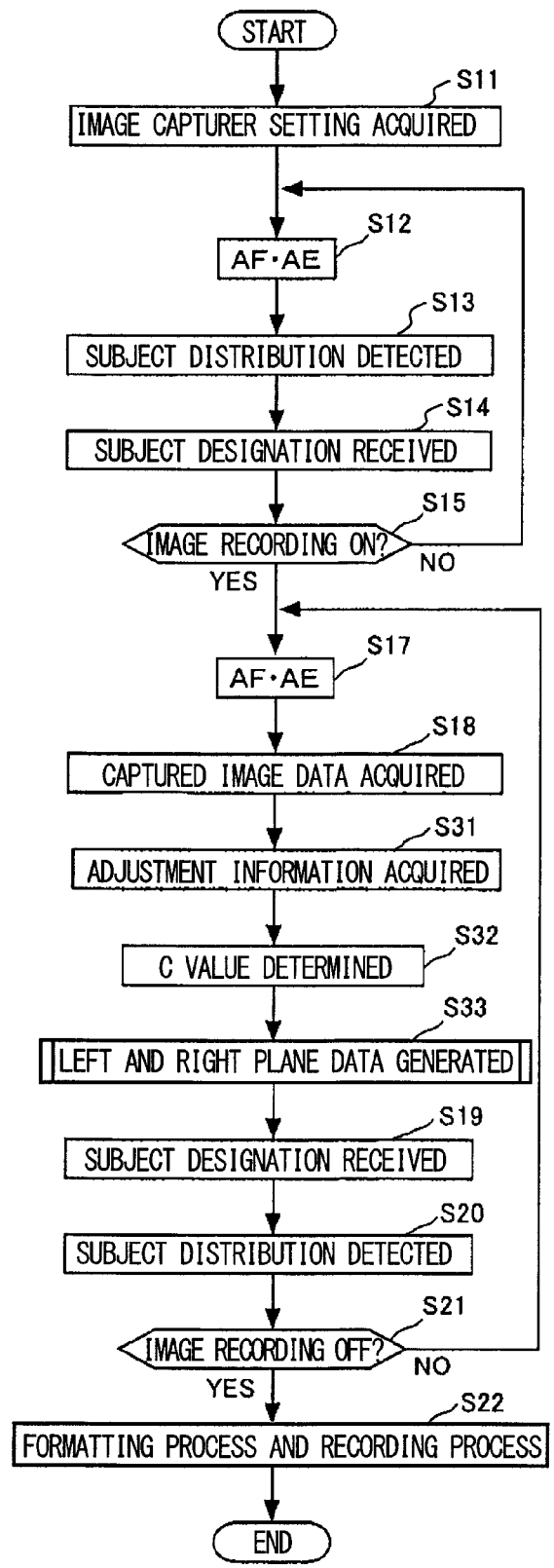
FIG. 28 shows the process flow during the moving image capturing according to the second embodiment example.

As a second embodiment example, a process flow for moving image capturing that involves changing the stereo adjustment parameter used in the image processing is described. FIG. 28 shows the process flow during the moving image capturing according to the second embodiment example. Processes related to the processes shown in the process flow of FIG. 27 are given the same step numbers, such that different processes and additional processes are described while redundant descriptions are omitted.

In this process flow, step S16 from the flow of FIG. 27 is omitted. When the recording ON instructions are received at step S15, the control section 201 performs the AF and AE at step S17 without changing the imaging conditions for parallax amount adjustment. At step S18, the captured image data is acquired. The parallax amount between the parallax images in the captured image data acquired here is not within the set parallax amount range, according to the imaging conditions and the subject distribution.

At step S31, the determining section 236 acquires the adjustment information described using FIGS. 24-A to 24-C, and at step S32 the determining section 236 references the look-up table using the received adjustment information as an argument and determines the value of the stereo adjustment parameter C.

At step S33, the calculating section 233 receives the captured image data and the value of the stereo adjustment parameter C determined by the determining section 236, and generates the color image data of the left side viewpoint (the $RLt_c$ plane data, the $GLt_c$ plane data, and the $BLt_c$ plane data) and the color image data of the right side viewpoint (the $RRt_c$ plane data, the $GRt_c$ plane data, and the $BRt_c$ plane data). The details of this process are described below.

Figure 29:
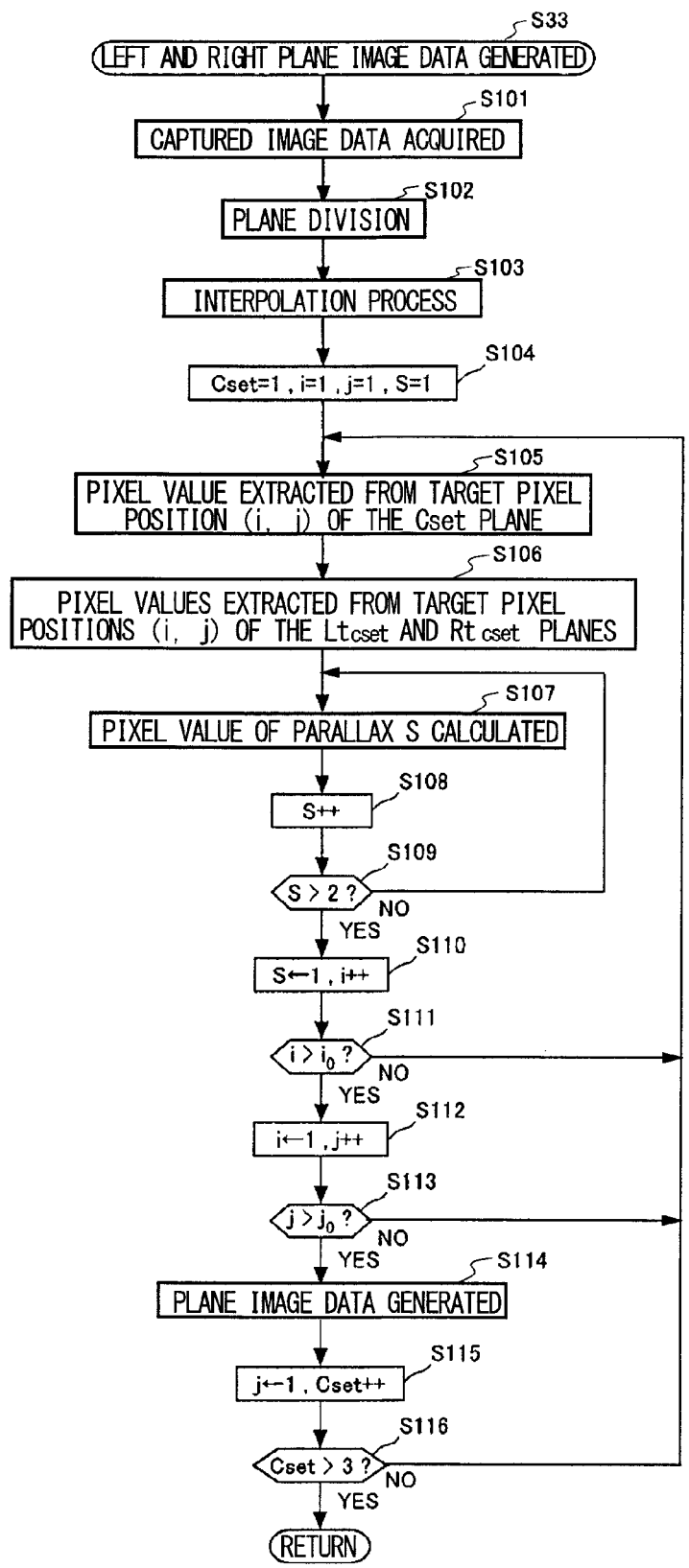
FIG. 29 shows the process flow up to the point of generating the parallax color image data.

FIG. 29 shows the process flow of step S33, up to the point of generating the parallax color image data that is the color image data of the left side viewpoint and the color image data of the right side viewpoint.

At step S101, the calculating section 233 acquires the captured image data. Then, at step S102, as described using FIG. 3, the captured image data is divided into planes of the non-parallax image data and the parallax image data. At step S103, as described using FIG. 3, the calculating section 233 performs the interpolation process to interpolate the empty pixels in each piece of plane data resulting from the division.

At step S104, the calculating section 233 initializes each of the variables. Specifically, first, the color variable Cset is set to 1. The color variable Cset is such that 1=red, 2=green, and 3=blue. Furthermore, the coordinate variables i and j are both set to 1. Yet further, the parallax variable S is set to 1. The parallax variable S is such that 1=left and 2=right.

At step S105, the calculating section 233 extracts the pixel value from the target pixel position (i, j) of the Cset plane. For example, when Cset=1 and the target pixel position is (1, 1), the extracted pixel value is $Rn_{11}$. Furthermore, at step S106, the calculating section 233 extracts the pixel values from the target pixel position (i, j) of the $Lt_{Cset}$ plane data and the $Rt_{Cset}$ plane data. For example, when the target pixel position is (1, 1), the extracted pixel values are $Lt_{Cset11}$ and $Rt_{Cset11}$.

At step S107, the calculating section calculates the pixel value for the target pixel position (i, j) corresponding to the parallax variable S. For example, when Cset=1, S=1, and the target pixel position is (1, 1), $RLt_{C11}$ is calculated. As a specific example, the calculation may be performed according to Expression 1 shown above. Here, the stereo adjustment parameter C is the value determined at step S32.

At step S108, the calculating section 233 increments the parallax variable S. Then, at step S109, it is determined whether the parallax variable S has exceeded 2. If the parallax variable S has not exceeded 2, the process returns to step S107. If the parallax variable S has exceeded 2, the process moves to step S110.

At step S110, the calculating section 233 sets the parallax variable S to 1 and increments the coordinate variable i. Then, at step S111, it is determined whether the coordinate variable i has exceeded $i_0$. If the coordinate variable i has not exceeded $i_0$, the process returns to step S105. If the coordinate variable i has exceeded $i_0$, the process moves to step S112.

At step S112, the calculating section 233 sets the coordinate variable i to 1 and increments the coordinate variable j. Then, at step S113, it is determined whether the coordinate variable j has exceeded $j_0$. If the coordinate variable j has not exceeded $j_0$, the process returns to step S105. If the coordinate variable j has exceeded $j_0$, the process moves to step S114.

Upon reaching step S114, all of the pixel values on the right and left for this Cset have been handled, and therefore the calculating section 233 arranges these pixel values to generate the plane image data. For example, when Cset=1, the $RLt_c$ plane data and $RRt_c$ plane data are generated.

The process moves to step S115, and the calculating section 233 sets the coordinate variable j to 1 and increments the color variable Cset. Then, at step S116, it is determined whether the color variable Cset exceeds 3. If the color variable Cset does not exceed 3, the process returns to step S105. If the color variable Cset exceeds 3, then all of the color image data of the left side viewpoint (the $RLt_c$ plane data, the $GLt_c$ plane data, and the $BLt_c$ plane data) and the color image data of the right side viewpoint (the $RRt_c$ plane data, the $GRt_c$ plane data, and the $BRt_c$ plane data) has been collected, and the flow returns to FIG. 28.

Figure 30:
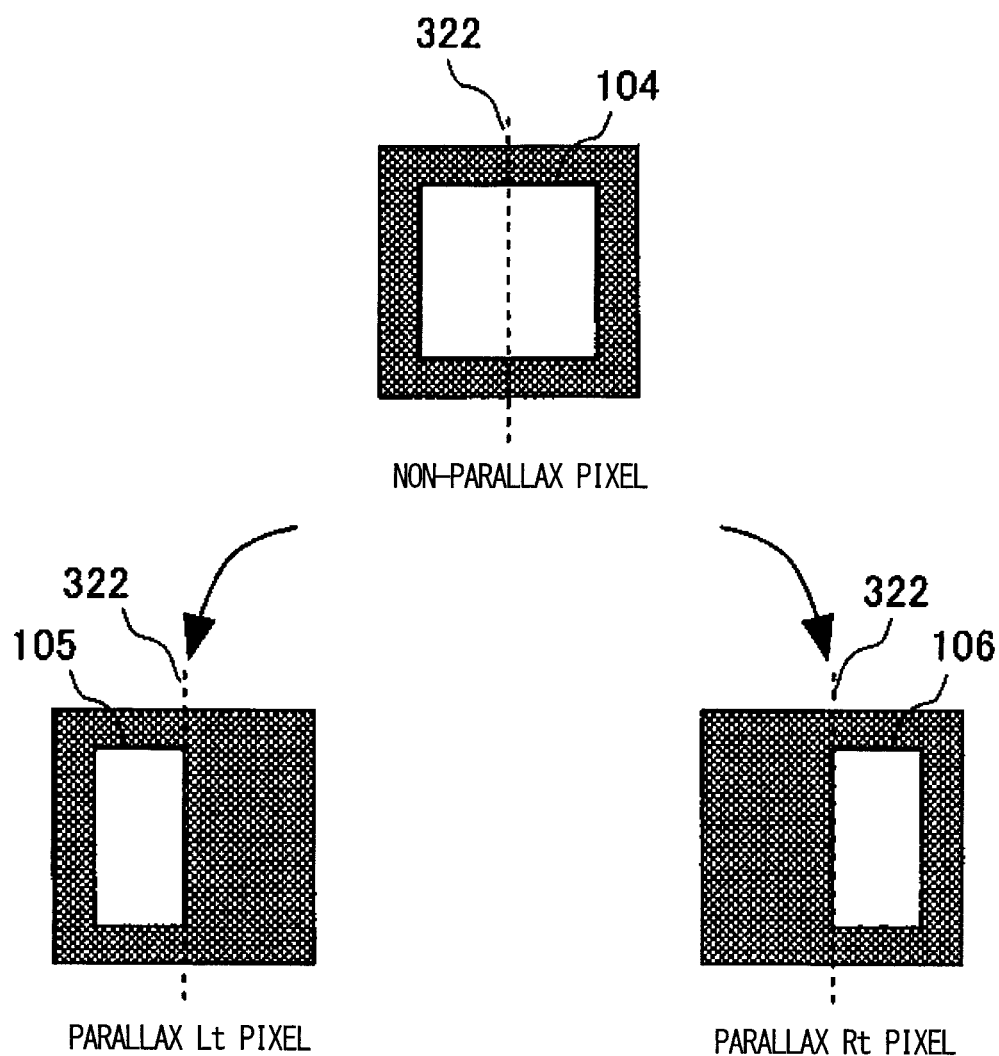
FIG. 30 is used to describe desirable aperture shapes.

The following describes desirable shapes for the apertures of the aperture mask described using FIG. 2. FIG. 30 is used to describe desirable aperture shapes.

The aperture section 105 of the parallax Lt pixel and the aperture section 106 of the parallax Rt pixel are preferably shifted in opposite directions from each other and include the centers of the corresponding pixels. Specifically, the aperture section 105 and the aperture section 106 preferably each contact a virtual center line 322 that passes through the center of the pixel or straddles this center line 322.

In particular, as shown in the drawing, the shape of the aperture section 105 and the shape of the aperture section 106 are preferably respectively identical to a shape obtained by dividing the shape of the aperture section 104 of the non-parallax pixel along the center line 322. In other words, the shape of the aperture section 104 is preferably equivalent to a shape obtained by placing the shape of the aperture section 105 and the shape of the aperture section 106 adjacent to each other.

In the above description, the arithmetic expressions used by the calculating section 233 are Expressions 1 and 2, which use a weighted arithmetic mean, but the arithmetic expressions are not limited to this and various other expressions can be used. For example, when using a weighted geometric mean, Expressions 3 and 4 shown above and expressed in the same manner as Expressions 1 and 2 can be used. In this case, the maintained blur amount is not the blur amount caused found in the output of the non-parallax pixels, but is instead the blur amount found in the output of the parallax pixels.

Furthermore, as other examples of arithmetic expressions, Expressions 5 and 6 shown above and expressed in the same manner as Expressions 1 and 2 can be used. In this case, the terms of the cube root do not change when calculating each of $GLt_{cmn}$, $GRt_{cmn}$, $BLt_{cmn}$, and $BRt_{cmn}$.

Yet further, Expressions 7 and 8 shown above may be adopted. In this case as well, the terms of the cube root do not change when calculating each of $GLt_{cmn}$, $GRt_{cmn}$, $BLt_{cmn}$, and $BRt_{cmn}$.

The following describes the connection with the display apparatus. FIG. 31 is used to describe the connection between the digital camera 10 and a TV monitor 80. The TV monitor 80 is formed by the display section 40 made from liquid crystal, a memory card IF 81 that receives the memory card 220 that is removed from the digital camera 10, and a remote control 82 that is manipulated by a hand of the user, for example. The TV monitor 80 is adapted to display a 3D image. The display format of the 3D image is not particularly limited. For example, the right eye image and the left eye image may be displayed at separate times, or an interlaced format may be used in which the right and left eye images are formed as thin vertical or horizontal stripes. As another example, the right and left eye images may be arranged in a side by side manner in different regions of the screen.

The TV monitor 80 decodes the formatted moving image file that includes the color image data of the left side viewpoint and the color image data of the right side viewpoint, and displays the 3D image in the display section 40. In this case, the TV monitor 80 fulfills the functions of a general display apparatus that displays a standardized moving image file.

However, the TV monitor 80 can also function as an image processing device that realizes at least a portion of the functions of the control section 201 described using FIG. 1 and at least a portion of the functions of the image processing device 205. Specifically, the determining section 236 described in FIG. 1 and the image processing device including the calculating section 233 and the moving image generating section 234 may be incorporated in the TV monitor 80. With this configuration, it is possible to realize functional roles other than the functional roles realized by the combination of the digital camera 10 of the second embodiment example and the TV monitor 80.

Specifically, the digital camera 10 associates the depth information detected by the depth information detecting section 235 with the generated captured image data, without performing the image processing using the stereo adjustment parameter. The TV monitor 80 serves as an image processing device to reference the associated depth information, determine the value of the stereo adjustment parameter C, and perform image processing using the stereo adjustment parameter on the acquired image data. The TV monitor 80 displays in the display section 40 the 3D image whose parallax amount has been adjusted in this manner.

The modification described above may be configured such that during playback on the TV monitor 80 the viewer can input a portion of the adjustment conditions. For example, the viewer can input the parallax amount range by manipulating the remote control 82. The TV monitor 80 acquires the input parallax amount range as an adjustment condition, and the determining section 236 determines the value of the stereo adjustment parameter C according to this parallax amount range. With this configuration, the TV monitor 80 can display a 3D image according to the preferences of each viewer.

In the present embodiment described above, the TV monitor 80 is described as one example of an image processing device, but the image processing device can take on a variety of forms. For example, the image processing device may be a device that includes a display section or is connected to a display section, such as a PC, mobile telephone, or game device.

In the present embodiment described above it is assumed that a moving image is being captured, but the configuration for outputting the parallax image data in which the parallax amount is adjusted based on the detected depth information could obviously also be applied to still image capturing. A still image captured in this way does not cause an extreme parallax between the left and right images, and therefore does not cause a sense of unnaturalness in the viewer.

In the present embodiment described above, the target subjects are received in user instructions, but the control section 201 may automatically select target subjects. For example, the control section 201 can set the target subjects by using a human recognition process and limiting the target subjects to images of people included in the scene.

Each process flow of the present embodiment described above is performed according to a control program for controlling the control section. The control program is recorded in an internal nonvolatile memory and is expanded as needed in a work memory to perform each process. As another example, a control program recorded on a server is transmitted to each apparatus via a network and expanded in a work memory to perform each process. As yet another example, a control program recorded on a server is executed on the server and each apparatus performs the processes according to control signals transmitted thereto via a network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: digital camera, 20: imaging lens, 21: optical axis, 22: diaphragm, 50: eyes, 51: right eye, 52: left eye, 40: display section, 61, 62, 71, 72: subject, 80: TV monitor, 81: memory card IF, 82: remote control, 100: image capturing element, 104, 105, 106: aperture section, 110: basic grid, 201: control section, 202: A/D conversion circuit, 203: memory, 204: driving section, 205: image processing device, 207: memory card IF, 208: manipulating section, 209: display section, 210: LCD drive circuit, 231: adjustment condition acquiring section, 232: adjustment value determining section, 233: calculating section, 234: moving image generating section, 235: depth information detecting section, 236: determining section, 300: tree, 301: girl, 302: boy, 303: woman, 310: AF frame, 320: title, 322: center line, 1610, 1611: contrast curve, 1620, parallax amount curve, 1630: adjusted parallax amount curve, 1804, 1805, 1807, 1808: distribution curve, 1806, 1809: combined distribution curve, 1901: Lt distribution curve, 1902: Rt distribution curve, 1903: 2D distribution curve, 1905: adjusted Lt distribution curve, 1906: adjusted Rt distribution curve, 2081: dial button, 2082: mode button, 2083: touch panel

What is claimed is:

1. An imaging apparatus comprising:
a processor configured to perform operations including
generating, by capturing a single scene, captured image data including reference image data, first parallax image data having a first parallax in one direction relative to a subject image of the reference image data, and second parallax image data having a second parallax in another direction that is opposite the one direction,
acquiring an adjustment condition relating to parallax amount adjustment, and
processing the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax, the processing including
determining an adjustment value based on the adjustment condition,
extracting a reference pixel value at a target pixel position in the reference image data, a first parallax pixel value at the target pixel position in the first parallax image data, and a second parallax pixel value at the target pixel position in the second parallax image data, and
calculating a third parallax pixel value forming the third parallax image data and a fourth parallax pixel value forming the fourth parallax image data by an averaging operation using the reference pixel value, the first parallax pixel value, the second parallax pixel value and the adjustment value.

2. The imaging apparatus according to claim 1, wherein the processing further includes generating a moving image file based on the third parallax image data and the fourth parallax image data by processing the captured image data, which is generated continuously.

3. The imaging apparatus according to claim 1, wherein the processor is further configured to:
output the adjustment condition in association with the captured image data.

4. The imaging apparatus according to claim 3, wherein the outputting includes associating the adjustment condition with a moving image file created from the captured image data, which is generated continuously.

5. The imaging apparatus according to claim 2, wherein the acquiring includes dynamically acquiring the adjustment condition in correspondence with the captured image data, which is generated continuously.

6. The imaging apparatus according to claim 1, wherein the adjustment condition includes a setting condition of an optical system that focuses the subject image.

7. The imaging apparatus according to claim 6, wherein the setting condition includes at least one of diaphragm constriction, focal distance, and focus lens position.

8. The imaging apparatus according to claim 1, wherein the adjustment condition includes a subject state in the single scene.

9. The imaging apparatus according to claim 8, wherein the subject state includes a subject distribution in a depth direction.

10. The imaging apparatus according to claim 1, wherein the adjustment condition includes user instructions designated by a user.

11. The imaging apparatus according to claim 10, wherein the adjustment condition includes a range setting for a parallax amount designated by the user instructions.

12. An imaging apparatus comprising:
a processor configured to perform operations including:
generating, by capturing a single scene, captured image data including reference image data, first parallax image data having a first parallax in one direction relative to a subject image of the reference image data, and second parallax image data having a second parallax in another direction that is opposite the one direction,
acquiring an adjustment condition relating to parallax amount adjustment, and
processing the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax; wherein
the adjustment condition includes a cumulative parallax amount obtained by integrating a parallax amount of each pixel in an entire frame.

13. The imaging apparatus according to claim 1, wherein the processing includes calculating the third parallax pixel value forming the third parallax image data and the fourth parallax pixel value forming the fourth parallax image data by using the arithmetic expressions of:

$$P_3 = 2P_0 \times (C \cdot P_1 + (1-C)P_2)/(P_1+P_2) \text{ and}$$

$$P_4 = 2P_0 \times ((1-C)P_1 + C \cdot P_2)/(P_1+P_2),$$

where $P_0$ is the reference pixel value, $P_1$ is the first parallax pixel value, $P_2$ is the second parallax pixel value, $P_3$ is the third parallax pixel value, $P_4$ is the fourth parallax pixel value, C is the adjustment value, and C is a real number such that $0.5 < C < 1$.

14. The imaging apparatus according to claim 1, wherein the processing includes calculating the third parallax pixel value forming the third parallax image data and the fourth parallax pixel value forming the fourth parallax image data by using the arithmetic expressions of:

$$P_3 = P_0 \times (P_1/P_2)^{(C-0.5)} \text{ and}$$

$$P_4 = P_0 \times (P_2/P_1)^{(C-0.5)},$$

where $P_0$ is the reference pixel value, $P_1$ is the first parallax pixel value, $P_2$ is the second parallax pixel value, $P_3$ is the third parallax pixel value, $P_4$ is the fourth parallax pixel value, C is the adjustment value, and C is a real number such that $0.5 < C < 1$.

15. An image processing device comprising:
a processor configured to perform operations including
obtaining captured image data including reference image data, first parallax image data having a first parallax in one direction relative to a subject image of the reference image data, and second parallax image data having a second parallax in another direction that is opposite the one direction, and an adjustment condition relating to a parallax amount adjustment associated with the captured image data, and
processing the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax, the processing including
determining an adjustment value based on the adjustment condition,
extracting a reference pixel value at a target pixel position in the reference image data, a first parallax pixel value at the target pixel position in the first parallax image data, and a second parallax pixel value at the target pixel position in the second parallax image data, and
calculating a third parallax pixel value forming the third parallax image data and a fourth parallax pixel value forming the fourth parallax image data by an averaging operation using the reference pixel value, the first parallax pixel value, the second parallax pixel value and the adjustment value.

16. The image processing device according to claim 15, wherein
the processing further includes generating a moving image file based on the third parallax image data and the fourth parallax image data by processing the captured image data, which is continuously obtained.

17. The image processing device according to claim 15, wherein
the processing further includes calculating the third parallax pixel value forming the third parallax image data and the fourth parallax pixel value forming the fourth parallax image data by using the arithmetic expressions of:

$$P_3 = 2P_0 \times (C \cdot P_1 + (1-C)P_2)/(P_1+P_2) \text{ and}$$

$$P_4 = 2P_0 \times ((1-C)P_1 + C \cdot P_2)/(P_1+P_2),$$

where $P_0$ is the reference pixel value, $P_1$ is the first parallax pixel value, $P_2$ is the second parallax pixel value, $P_3$ is the third parallax pixel value, $P_4$ is the fourth parallax pixel value, C is the adjustment value, and C is a real number such that 0.5<C<1.

18. The image processing device according to claim 15, wherein
the processing further includes calculating the third parallax pixel value forming the third parallax image data and the fourth parallax pixel value forming the fourth parallax image data by using the arithmetic expressions of:

$$P_3 = P_0 \times (P_1/P_2)^{(C-0.5)} \text{ and}$$

$$P_4 = P_0 \times (P_2/P_1)^{(C-0.5)},$$

where $P_0$ is the reference pixel value, $P_1$ is the first parallax pixel value, $P_2$ is the second parallax pixel value, $P_3$ is the third parallax pixel value, $P_4$ is the fourth parallax pixel value, C is the adjustment value, and C is a real number such that 0.5<C<1.

19. A non-transitory computer readable medium for storing a control program for an imaging apparatus that causes a computer to:
generate, by capturing a single scene, captured image data including reference image data, first parallax image data having a first parallax in one direction relative to a subject image of the reference image data, and second parallax image data having a second parallax in another direction that is opposite the one direction;
acquire an adjustment condition relating to parallax amount adjustment; and
process the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax, the processing including:
determining an adjustment value based on the adjustment condition,
extracting a reference pixel value at a target pixel position in the reference image data, a first parallax pixel value at the target pixel position in the first parallax image data, and a second parallax pixel value at the target pixel position in the second parallax image data, and
calculating a third parallax pixel value forming the third parallax image data and a fourth parallax pixel value forming the fourth parallax image data by an averaging operation using the reference pixel value, the first parallax pixel value, the second parallax pixel value and the adjustment value.

20. The non-transitory computer readable medium according to claim 19, wherein the control program further causes a computer to:
output the adjustment condition in association with the captured image data.

21. A non-transitory computer readable medium for storing a control program for an image processing device that causes a computer to:
obtain captured image data including reference image data, first parallax image data having a first parallax in one direction relative to a subject image of the reference image data, and second parallax image data having a second parallax in another direction that is opposite the one direction, and an adjustment condition relating to a parallax amount adjustment associated with the captured image data; and
process the reference image data, the first parallax image data, and the second parallax image data, based on the adjustment condition, to generate third parallax image data having a third parallax that is in the one direction and different from the first parallax and fourth parallax image data having a fourth parallax that is in the other direction and different from the second parallax, the processing including:
determining an adjustment value based on the adjustment condition,
extracting a reference pixel value at a target pixel position in the reference image data, a first parallax pixel value at the target pixel position in the first parallax image data, and a second parallax pixel value at the target pixel position in the second parallax image data, and
calculating a third parallax pixel value forming the third parallax image data and a fourth parallax pixel value forming the fourth parallax image data by an averaging operation using the reference pixel value, the first parallax pixel value, the second parallax pixel value and the adjustment value.

22. An imaging apparatus comprising:
a processor configured to perform operations including
detecting a subject distribution in a depth direction for a scene,
determining a change condition relating to a parallax amount, based on the subject distribution, and
performing imaging control to generate captured image data including first parallax image data and second parallax image data having a parallax therebetween, based on the change condition, wherein
the determining includes determining an adjustment parameter value for adjusting a parallax amount between images used when the first parallax image data and the second parallax image data are generated, as the change condition,
the performing includes acquiring reference image data, third parallax image data having a third parallax in one direction relative to a subject image of the reference image data, and fourth parallax image data having a fourth parallax in another direction opposite the one direction, and
a first parallax pixel value is calculated to generate the first parallax image data and a second parallax pixel value is calculated to generate the second parallax image data by extracting a reference pixel value at a target pixel position in the reference image data, a third parallax pixel value at the target pixel position in the third parallax image data, and a fourth parallax pixel value at the target pixel position in the fourth parallax image data, and using an averaging operation using the reference pixel value, the first parallax pixel value, the second parallax pixel value and the adjustment parameter value.

23. The imaging apparatus according to claim 22, comprising:
an image capturing element including a first parallax pixel group that receives, from among incident light passing through an optical system, first partial light that is polarized in a first direction relative to an optical axis of the optical system and a second parallax pixel group that receives, from among the incident light passing through the optical system, second partial light that is polarized in a second direction different from the first direction.

24. The imaging apparatus according to claim 22, wherein the detecting includes detecting the subject distribution based on phase difference information for each subject.

25. The imaging apparatus according to claim 22, wherein the processor is further configured to:
receive a designation of a subject by a user, wherein
the detecting includes setting the designated subject to be a detection target in the subject distribution.

26. The imaging apparatus according to claim 22, wherein the determining includes determining a diaphragm value as the change condition.

27. The imaging apparatus according to claim 22, wherein the determining includes determining a correction amount for a focus lens position as the change condition.

28. The imaging apparatus according to claim 22, wherein the first parallax pixel value is calculated to generate the first parallax image data and the second parallax pixel value is calculated to generate the second parallax image data by using the arithmetic expressions of:

$P_1 = 2P_0 \times (C \cdot P_3 + (1-C)P_4)/(P_3+P_4)$ and $P_2 = 2P_0 \times ((1-C)P_3 + C \cdot P_4)/(P_3+P_4)$, where $P_0$ is the reference pixel value, $P_1$ is the first parallax pixel value, $P_2$ is the second parallax pixel value, $P_3$ is the third parallax pixel value, $P_4$ is the fourth parallax pixel value, C is the adjustment parameter value, and C is a real number such that $0.5 < C < 1$.

29. The imaging apparatus according to claim 22, wherein the first parallax pixel value is calculated to generate the first parallax image data and the second parallax pixel value is calculated to generate the second parallax image data by using the arithmetic expressions of:

$P_1 = P_0 \times (P_3/P_4)^{(C-0.5)}$ and $P_2 = P_0 \times (P_4/P_3)^{(C-0.5)}$, where $P_0$ is the reference pixel value, $P_1$ is the first parallax pixel value, $P_2$ is the second parallax pixel value, $P_3$ is the third parallax pixel value, $P_4$ is the fourth parallax pixel value, C is the adjustment parameter value, and C is a real number such that $0.5 < C < 1$.

30. A non-transitory computer readable medium for storing a control program for an imaging apparatus causing a computer to:
detect a subject distribution in a depth direction for a scene;
determine a change condition relating to a parallax amount, based on the subject distribution; and
generate captured image data including first parallax image data and second parallax image data having a parallax therebetween, based on the change condition, wherein
the determining the change condition includes determining an adjustment parameter value for adjusting a parallax amount between images used when the first parallax image data and the second parallax image data are generated, as the change condition,
the generating captured image data includes acquiring reference image data, third parallax image data having a third parallax in one direction relative to a subject image of the reference image data, and fourth parallax image data having a fourth parallax in another direction opposite the one direction,
the generating captured image data further includes calculating a first parallax pixel value to generate the first parallax image data and a second parallax pixel value to generate the second parallax image data by
extracting a reference pixel value at a target pixel position in the reference image data, a third parallax pixel value at the target pixel position in the third parallax image data, and a fourth parallax pixel value at the target pixel position in the fourth parallax image data, and
using an averaging operation using the reference pixel value, the first parallax pixel value, the second parallax pixel value and the adjustment parameter value.

31. The imaging apparatus according to claim 1, wherein the adjustment value is a real number C such that $0.5 < C < 1$.

* * * * *